(12) United States Patent
Yamamoto et al.

(10) Patent No.: US 12,092,835 B2
(45) Date of Patent: Sep. 17, 2024

(54) DISPLAY DEVICE

(71) Applicant: PANASONIC INTELLECTUAL PROPERTY MANAGEMENT CO., LTD., Osaka (JP)

(72) Inventors: Yasutoshi Yamamoto, Osaka (JP); Suguru Ogawa, Osaka (JP); Hiroyasu Makino, Osaka (JP); Makoto Serizawa, Osaka (JP); Yoshiichiro Kashiwagi, Kyoto (JP); Toshiro Nishio, Osaka (JP); Masayuki Kozuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 556 days.

(21) Appl. No.: 17/426,608

(22) PCT Filed: Feb. 27, 2020

(86) PCT No.: PCT/JP2020/008196
§ 371 (c)(1),
(2) Date: Jul. 28, 2021

(87) PCT Pub. No.: WO2021/024525
PCT Pub. Date: Feb. 11, 2021

(65) Prior Publication Data
US 2022/0099981 A1   Mar. 31, 2022

Related U.S. Application Data

(60) Provisional application No. 62/883,575, filed on Aug. 6, 2019.

(51) Int. Cl.
*G02B 27/01* (2006.01)
*G02B 25/00* (2006.01)
(Continued)

(52) U.S. Cl.
CPC ....... *G02B 27/0179* (2013.01); *G02B 25/001* (2013.01); *G02B 27/0172* (2013.01);
(Continued)

(58) Field of Classification Search
None
See application file for complete search history.

(56) References Cited

U.S. PATENT DOCUMENTS 5,347,400 A   9/1994   Hunter
5,880,773 A   3/1999   Suzuki
(Continued)

FOREIGN PATENT DOCUMENTS

CN   205003364 U   1/2016
CN   207440423 U   6/2018
(Continued)

OTHER PUBLICATIONS

Chinese Office Action dated Aug. 30, 2023 issued in the corresponding Chinese Patent Application No. 202080010855.6, with English translation of Search Report.
(Continued)

*Primary Examiner* — Bao-Luan Q Le
*Assistant Examiner* — Danell L Owens
(74) *Attorney, Agent, or Firm* — Rimon P.C.

(57) ABSTRACT

A display device includes: a first closed-bottom lens tube including a first display part on the closed bottom for displaying a first image; a second closed-bottom lens tube including a second display part on the closed bottom for displaying a second image; an adjustment mechanism including a first rod that extends from the first lens tube and a second rod that extends from the second lens tube and is rotatably connected relative to the first rod; and an image maintainer that, in accordance with the angle of rotation of the first and second rods of the adjustment mechanism,
(Continued)

rotates the first and second display parts relative to the first and second lens tubes to bring the horizontal directions of the first and second display parts closer to the arrangement direction of the first and second lens tubes.

2 Claims, 46 Drawing Sheets

(51) Int. Cl.
　　　*G06F 1/16*　　　(2006.01)
　　　*G09G 3/20*　　　(2006.01)
(52) U.S. Cl.
　　　CPC ......... *G02B 27/0176* (2013.01); *G06F 1/163* (2013.01); *G02B 2027/014* (2013.01); *G02B 2027/0154* (2013.01); *G02B 2027/0161* (2013.01); *G02B 2027/0178* (2013.01); *G09G 3/20* (2013.01)

(56) References Cited

U.S. PATENT DOCUMENTS

| | | | |
|---|---|---|---|
| 2004/0257648 | A1 | 12/2004 | Mogamiya |
| 2012/0218301 | A1 | 8/2012 | Miller |
| 2016/0180534 | A1* | 6/2016 | Ernst ................... H04N 5/2628 348/294 |
| 2016/0332075 | A1 | 11/2016 | Hirata et al. |
| 2017/0102549 | A1* | 4/2017 | Lee .................... G02B 27/0176 |
| 2017/0329144 | A1 | 11/2017 | Usami |
| 2018/0167541 | A1 | 6/2018 | Reed et al. |
| 2022/0121032 | A1 | 4/2022 | Serizawa et al. |

FOREIGN PATENT DOCUMENTS

| | | |
|---|---|---|
| CN | 207541338 U | 6/2018 |
| JP | H07-234375 A | 9/1995 |
| JP | H08-136822 A | 5/1996 |
| JP | 2001-108915 A | 4/2001 |
| JP | 2002-116386 A | 4/2002 |
| JP | 2003-287708 A | 10/2003 |
| JP | 2003-337299 A | 11/2003 |
| JP | 2005-010687 A | 1/2005 |
| JP | 2015-504616 A | 2/2015 |
| JP | 2016-090773 A | 5/2016 |
| WO | 2013/049248 A2 | 4/2013 |
| WO | 2018/120751 A1 | 7/2018 |

OTHER PUBLICATIONS

Extended European Search Report dated Oct. 5, 2022 issued in the corresponding European Patent Application No. 20850788.9.
Non-Final Office Action dated Mar. 28, 2022 issued in the corresponding related U.S. Appl. No. 17/426,604.
International Search Report and Written Opinion issued on May 19, 2020 in International Patent Application No. PCT/JP2020/008195; with partial English translation.
International Search Report and Written Opinion issued on May 26, 2020 in International Patent Application No. PCT/JP2020/008196; with partial English translation.
International Search Report and Written Opinion issued on Apr. 21, 2020 in International Patent Application No. PCT/JP2020/008197; with partial English translation.
Extended European Search Report dated Sep. 12, 2022 issued in the corresponding European Patent Application No. 20850235.1.
Extended European Search Report dated Sep. 5, 2022 issued in the corresponding European Patent Application No. 20850236.9.
Non-Final Office Action dated Feb. 14, 2024 issued in the related U.S. Appl. No. 17/426,599.
Japanese Office Action dated Dec. 12, 2023 issued in the corresponding Japanese Patent Application No. 2021-537565.
Japanese Office Action dated Dec. 12, 2023 issued in the corresponding Japanese Patent Application No. 2021-537566.
Japanese Office Action dated Dec. 12, 2023 issued in the corresponding Japanese Patent Application No. 2021-537567.

* cited by examiner

DISPLAY DEVICE

CROSS-REFERENCE OF RELATED APPLICATIONS

This application is the U.S. National Phase under 35 U.S.C. § 371 of International Patent Application No. PCT/JP2020/008196, filed on Feb. 27, 2020, which in turn claims the benefit of U.S. Application No. 62/883,575, filed on Aug. 6, 2019, the entire disclosures of which Applications are incorporated by reference herein.

TECHNICAL FIELD

The present disclosure relates to a display device.

BACKGROUND ART

Recent years have seen extensive development of display devices that are worn on the head, commonly known as head-mounted displays. For example, Patent Literature (PTL) 1 discloses a head-mounted display capable of presenting (i.e., displaying) video of content and video of the outside world. The head-mounted display disclosed in PTL 1 can reduce the sense of unnaturalness felt by the user upon switching between the video of content and the video of the outside world, by adjusting the luminance of at least one of the video of content or the video of the outside world.

CITATION LIST

Patent Literature

[PTL 1] Japanese Unexamined Patent Application Publication No. 2016-090773

SUMMARY OF INVENTION

Technical Problem

However, some display devices, including head-mounted displays, may be incapable of displaying images properly.

The present disclosure has been conceived in view of the above problem, and has an object to provide a display device capable of displaying images properly.

Solution to Problem

In order to achieve the object described above, in one aspect, the display device according to the present disclosure includes: a first lens tube including a closed bottom and a first display part on the closed bottom, the first display part being for displaying a first image; a second lens tube including a closed bottom and a second display part on the closed bottom, the second display part being for displaying a second image; an adjustment mechanism including a first rod that extends from the first lens tube and a second rod that extends from the second lens tube and is rotatably connected relative to the first rod; and an image angle maintainer that, in accordance with an angle of rotation of the first rod and the second rod of the adjustment mechanism, rotates the first display part relative to the first lens tube and rotates the second display part relative to the second lens tube to bring horizontal directions of the first display part and the second display part closer to an arrangement direction of the first lens tube and the second lens tube.

Advantageous Effects of Invention

The present disclosure provides a display device capable of displaying images properly.

DESCRIPTION OF EMBODIMENTS

Figure 1A:
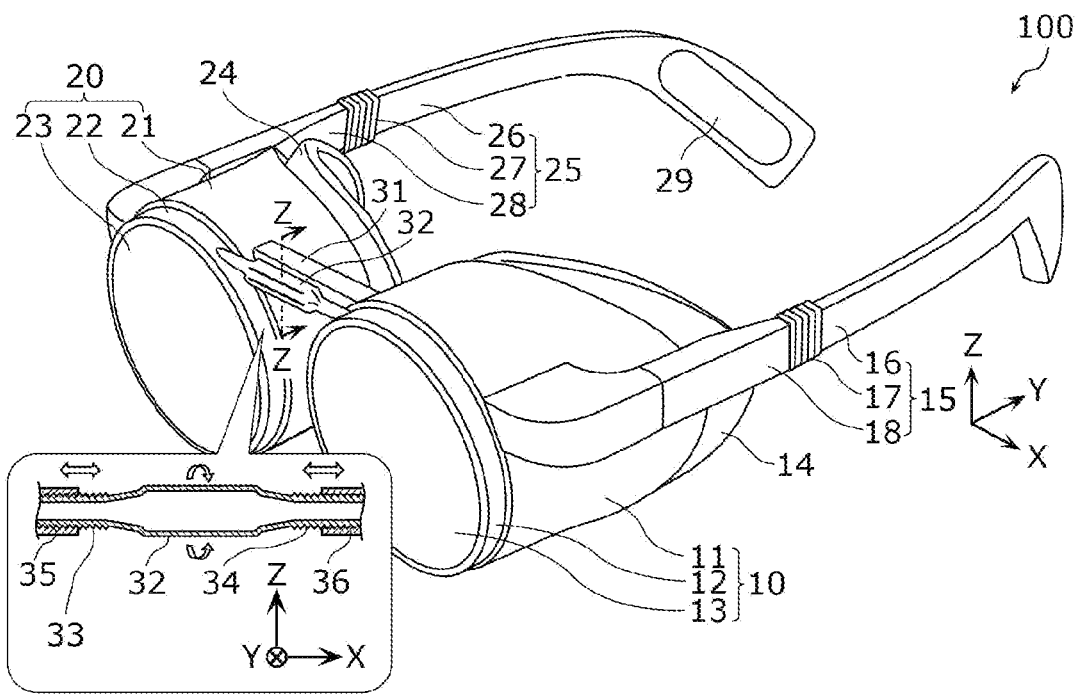
FIG. 1A is a first perspective view of a head-mounted display according to the embodiment.

Underlying Knowledge Forming the Basis of the Present Disclosure

Recent years have seen the development of display devices that a user wears on their head so that the display is arranged in front of their eyes, and allows the user to view an image on a seemingly large screen. Such display devices are referred to as head-mounted displays (HMD). Since these display devices allow the user to view an image on a seemingly large screen through graphical projection perspective techniques, the majority have been developed to high specifications and developed to reproduce high-quality images, which results in them having a large housing. Such large HMDs are not suitable for use in public spaces such as trains, offices, or outdoor spaces due to their portability and weight restrictions, as well as their tendency to attract attention.

In view of this, the present disclosure presents a glasses-style HMD, which is a display device, that utilizes two tubular housings (hereinafter also referred to as lens tubes) that minimally cover the two displays (display devices) provided for the user's left and right eyes, in order to improve the portability of the HMD. Such a glasses-style HMD is aesthetically pleasing; the wearer appears to be wearing large sunglasses to others, which reduces attention from others, allowing the wearer to blend into his or her surroundings.

There are cases in which the user's two pupils and the two lens tubes are misaligned, inhibiting images from being displayed properly. The present disclosure can freely arrange the two lens tubes to align them with the positions of the user's pupils and thus properly display the left and right images by coupling the two lens tubes in a manner that allows for distance therebetween to be adjusted. One possible method of implementing such a coupling that allows for adjustable distance is rotating the lens tubes around a rotational axis positioned away from the lens tubes, but with this method, the displays also rotate along with the lens tubes. In other words, the rotating of the lens tubes causes the displays that are horizontal in a given reference orientation to slant. The present disclosure is capable of handling such slanting as well.

HMDs are wearable display devices that are used while worn tightly by the user so as to keep external light from entering between the displays and the user's eyes as much as possible in order to eliminate adverse effects particularly caused by the external light. In other words, there may be a part of the HMD that contacts the user. The part of the HMD that contacts the user has a tendency to become unsanitary since the user's oil or sweat from their skin gets on this part. Since HMDs are used in areas around the eyes in particular where mucous membranes are plentiful, an unsanitary HMD is not suitable for use since there is a possibility of transmission of disease. Cleaning HMDs can be troublesome since many electronic components are housed inside a small housing. The present disclosure will therefore also discuss a configuration that handles such a problem.

General and specific aspect(s) of the present disclosure may be implemented using a system, a method, an integrated circuit, a computer program, or a computer-readable recording medium such as a CD-ROM, or any combination thereof.

Hereinafter, an embodiment of the present disclosure will be described with reference to the figures.

The following embodiment describes a general or specific example. The numerical values, shapes, materials, elements, the arrangement and connection of the elements, steps, order of the steps, etc., shown in the following embodiment are mere examples, and therefore do not limit the scope of the claims. Therefore, among the elements in the following embodiment, those not recited in any of the independent claims are described as optional elements.

The figures are not necessarily precise illustrations. In the figures, elements that are essentially the same share like reference signs. Accordingly, duplicate description thereof is omitted or simplified.

Moreover, in the present specification, terms that describe a relationship between elements, such as "parallel", terms that describe the shape of an element, such as "rectangular", values, and value ranges are not limited to their precise meanings, but also include variations that fall within an essentially equivalent range, such as a degree of error of approximately a few percent.

In each of the drawings described below, the orthogonal X, Y, and Z axes are used to describe, for example, directionality relative to the parts of the HMD. The X axis directions correspond to the right and left directions relative to the user when the HMD is worn. Specifically, the left direction corresponds to the X axis positive direction. The Y axis directions correspond to the front and back directions relative to the user when the HMD is worn. Specifically, the back direction corresponds to the Y axis positive direction. The Z axis directions correspond to the up and down directions relative to the user when the HMD is worn. Specifically, the up direction corresponds to the Z axis positive direction.

The X axis directions correspond to the directions in which the two lens tubes included in the HMD according to the embodiment are arranged, also referred to as the arrangement direction. This will be described in further detail later. The Y axis directions correspond to the directions in which the axes (central axes) of the lens tubes of the HMD extend. A Plane passing through the central axes of the two lens tubes is also referred to as an arrangement plane of the lens tubes (or simply "arrangement plane"). The arrangement planes are typically planes parallel to the YX plane. A Z axis direction perpendicular to such an arrangement plane may also be referred to as the height direction.

Hereinafter, the left and right directions, front and back directions, up and down directions, central axis directions, arrangement direction, arrangement plane, and height direction described above may be used without notice in the following description, but these terms are used for the sake of convenience in the description, and do not limit the orientation or the like of the HMD when in use.

The majority of components in the HMD according to this embodiment are configured in pairs having left/right symmetry. Accordingly, for some configurations in the following description, there may be cases in which one of the left and right components is described and description of the other is omitted.

Embodiment

Basic Configuration

Figure 1B:
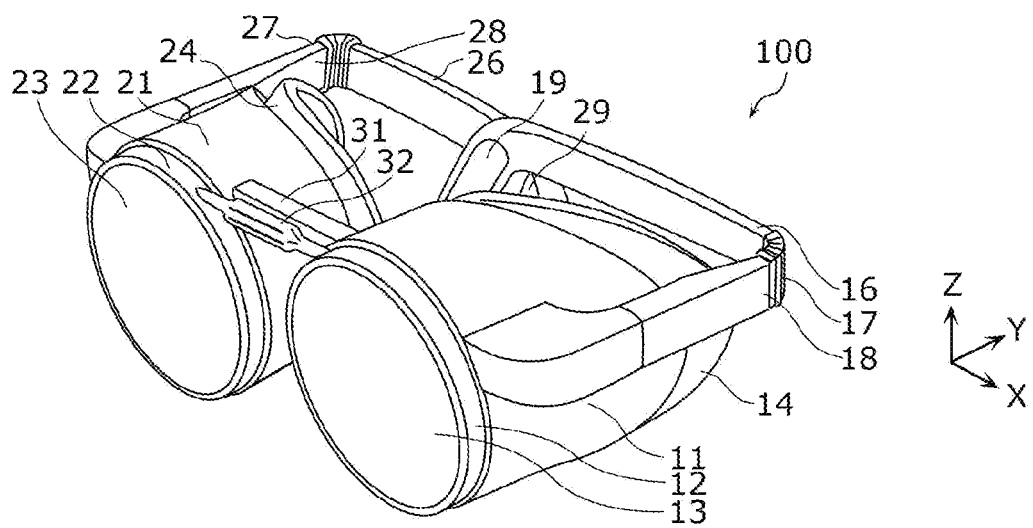
FIG. 1B is a second perspective view of the head-mounted display according to the embodiment.

First, the configuration of the HMD according to the embodiment will be described with reference to FIG. 1A through FIG. 4. FIG. 1A is a first perspective view of the head-mounted display according to the embodiment. FIG. 1B is a second perspective view of the head-mounted display according to the embodiment.

FIG. 1A illustrates a perspective view of the external appearance of HMD 100 according to the embodiment when first arm part 15 and second arm part 25 are extended, and FIG. 1B illustrates a perspective view of the external appearance of HMD 100 according to the embodiment when first arm part 15 and second arm part 25 are folded. As illustrated in FIG. 1A, HMD 100 according to the embodiment includes first lens tube 10, second lens tube 20, adjustment screw 32, first arm part 15, second arm part 25, first eye cup 14, and second eye cup 24.

First lens tube 10 is a monocular display module for displaying an image corresponding to, for example, the left eye of user 99 (see FIG. 3 to be described later). First lens tube 10 is made of a combination of resin and metal materials. First lens tube 10 also includes therewithin a first display part (included in display part 30 to be described later) for displaying first image 101L (see FIG. 8 to be described later) corresponding to one eye (the left eye in this example) of user 99, and first convex lens 40L (see FIG. 13 to be described later) that enlarges the image displayed by the first display part. More specifically, first lens tube 10 is a closed-bottom tube, and includes the first display part on the bottom thereof.

Even more specifically, first lens tube 10 includes first major part 11, first minor part 12, and first panel 13. As illustrated in the figures, first lens tube 10 has a double bottom structure configured of first major part 11, first minor part 12, and first panel 13. As illustrated in the figures, first major part 11, first minor part 12, and first panel 13 are separate components. In the following description, first lens tube 10 is described as a closed-bottom structure having a double bottom, but the HMD according to the present disclosure may be a closed-bottom structure having a single bottom defined by only first major part 11. The structure of the bottom in first lens tube 10 is not particularly limited; the HMD may be configured of a plurality of bottoms that respectively house a plurality of functional components.

The first display part and first convex lens 40L are disposed inside the tubular first major part 11 that opens in the Y axis positive direction. Although first convex lens 40L is illustrated as a single lens in the figures, first convex lens 40L may be configured of a combination of two or more lenses. Stated differently, first convex lens 40L may be a lens unit including a plurality of lenses.

Second lens tube 20 is a monocular display module for displaying an image corresponding to, for example, the right eye of user 99. Second lens tube 20 is made of a combination of resin and metal materials. Second lens tube 20 also includes therewithin a second display part (part of display part 30 to be described later) for displaying second image 101R (see FIG. 8 to be described later) corresponding to one eye (the right eye in this example) of user 99, and second convex lens 40R (see FIG. 13 to be described later) that enlarges the image displayed by the second display part. More specifically, second lens tube 20 is a closed-bottom tube, and includes the second display part on the bottom thereof.

Even more specifically, second lens tube 20 includes second major part 21, second minor part 22, and second panel 23. The second display part and second convex lens 40R are disposed inside the tubular second major part 21 that opens in the Y axis positive direction.

First lens tube 10 and second lens tube 20 are coupled together by adjustment screw 32 and connector bar 31.

Connector bar 31 is a bar-shaped component that extends parallel to the X axis. The outer diameter of connector bar 31 is smaller than the inner diameter of the connection holes formed in the side surfaces of first lens tube 10 and second lens tube 20. Connector bar 31 is made of a hard material such as metal or resin. This configuration allows connector bar 31 to be inserted into the connection holes without requiring any particular fixture. The positional relationship between first lens tube 10 and second lens tube 20 changes depending on the depth of insertion of connector bar 31 into the connection holes. Although first lens tube 10 and second lens tube 20 are exemplified as each including a connection hole, the connection hole may be provided in only one of first lens tube 10 and second lens tube 20. In such cases, one end of connector bar 31 is inserted into the connection hole and the other end on the opposite side is joined to the other of first lens tube 10 and second lens tube 20.

Adjustment screw 32 is a bar-shaped component that forms part of a first adjustment mechanism, extends parallel to the X axis, and is made of a hard material such as metal or resin. As shown in the cross sectional diagram of a cross section taken along the Z-Z line illustrated in the figures (the diagram in the bubble), screw threads are cut into both ends of adjustment screw 32. More specifically, adjustment screw 32 includes, on one end thereof, first screw part 34 configured of first helical ridges, and on the other end thereof, second screw part 33 configured of second helical ridges.

A hole is formed in first lens tube 10 in a location corresponding to adjustment screw 32, and screw hole 36 configured of first helical valleys is formed behind the hole (i.e., on the X axis positive direction side of the hole). With this configuration, the ridges and valleys of first screw part 34 and first screw hole 36 engage along a given length of insertion of adjustment screw 32, and first screw part 34 moves inward and outward relative to first screw hole 36 by rotating adjustment screw 32 around an axis parallel to the X axis. Providing a screw mechanism behind the hole inhibits first screw part 34 from protruding from first lens tube 10 when moving inward and outward, is aesthetically pleasing, and inhibits malfunction of adjustment screw 32 caused by the introduction of a foreign substance.

Similarly, a hole is formed in second lens tube 20 in a location corresponding to adjustment screw 32, and second screw hole 35 configured of second helical valleys is formed behind the hole (i.e., on the X axis negative direction side of the hole). With this configuration, the ridges and valleys of second screw part 33 and second screw hole 35 engage along a given length of insertion of adjustment screw 32, and second screw part 33 moves inward and outward relative to second screw hole 35 by rotating adjustment screw 32 around an axis parallel to the X axis.

The second helical ridges and valleys are wound in the opposite direction of the winding of the first helical ridges and valley. With this configuration, when adjustment screw 32 is rotated in one direction, the inward movement of second screw part 33 into second screw hole 35 and the inward movement of first screw part 34 into first screw hole 36 are coordinated and when adjustment screw 32 is rotated in the other direction, the outward movement of second screw part 33 from second screw hole 35 and the outward movement of first screw part 34 from first screw hole 36 are coordinated. This adjusts the distance between first lens tube 10 and second lens tube 20. In this way, adjustment screw 32 in the first adjustment mechanism is one example of an operable part that adjusts the distance between first lens tube 10 and second lens tube 20.

Note that adjustment screw 32 may be configured to have a central region that is thicker than first screw part 34 and second screw part 33. Here, the "center" of adjustment screw 32 refers to the center along the X axis when the parts of adjustment screw 32 that connect to first lens tube 10 and second lens tube 20 are placed at both ends. In HMD 100 illustrated in FIG. 1A, adjustment screw 32 is configured to have a larger outer diameter in the center than on the X axis ends. This configuration makes it easier for user 99 to operate adjustment screw 33. In the example of the present embodiment, the central region of adjustment screw 32 (i.e., the X axis central region between first lens tube 10 and second lens tube 20) is given a polygonal pillar shape, which further improves operability by user 99.

The provision of first screw hole 36 and first screw part 34 on the connection portion of first lens tube 10 and adjustment screw 32 and the provision of second screw hole 35 and second screw part 33 on the connection portion of second lens tube 20 and adjustment screw 32 in FIG. 1A is merely one example. For example, first screw hole 36, first screw part 34, second screw hole 35, and second screw part 33 may be provided on one of the connection part of first lens tube 10 and adjustment screw 32 and the connection part of second lens tube 20 and adjustment screw 32, and the other of the connection part of first lens tube 10 and adjustment screw 32 and the connection part of second lens tube 20 and adjustment screw 32 may be configured to simply rotatably hold and connect with adjustment screw 32.

Furthermore, which of (i) first lens tube 10 and second lens tube 20 or (ii) adjustment screw 32 is provided with the screw hole and which is provided with the screw part is not particularly limited. For example, a converse configuration of HMD 100 described above in which first lens tube 10 and second lens tube 20 are provided with screw parts and the adjustment mechanism is provided with screw holes may be used.

Adjusting the distance between first lens tube 10 and second lens tube 20 of HMD 100 makes it possible to set the positions of first lens tube 10 and second lens tube 20 to correspond to the interpupillary distance (IPD) of user 99.

Moreover, due to connector bar 31 being inserted in the connection hole, rotation of second lens tube 20 relative to first lens tube 10 around an axis parallel to the X axis when adjusting the distance between first lens tube 10 and second lens tube 20 can be inhibited, whereby the central axes of first lens tube 10 and second lens tube 20 can be maintained parallel.

The front end of first arm part 15 is connected to first lens tube 10 and the rear end engages with, for example, the left ear of user 99. First arm part 15 is made of a combination of metal and resin. First arm part 15 includes first front arm 18 at the front end and first back arm 16 at the rear end that are rotatably connected via a hinge shaft. The hinge shaft is covered by cover 17 that can extend and contract via an accordion mechanism or the like, and protects internal mechanisms, electronic components, etc.

As illustrated in FIG. 1B, this configuration enables first arm part 15 to fold by first back arm 16 rotating and folding relative to first front arm 18 around an axis parallel to the Z axis illustrated in the figure. Moreover, first arm part 15 is only able to fold in the direction toward second arm part 25 to be described later (fold counter clockwise when viewed from the Z axis positive direction side), and is configured so as not to widen in the opposite direction. This makes it easier for first arm part 15 to engage with the ear of user 99.

The front end of second arm part 25 is connected to second lens tube 20 and the rear end engages with, for example, the right ear of user 99. Second arm part 25 is made of a combination of metal and resin. Second arm part 25 includes second front arm 28 at the front end and second back arm 26 at the rear end that are rotatably connected via a hinge shaft. The hinge shaft is covered by cover 27 that can extend and contract via an accordion mechanism or the like, and protects internal mechanisms, electronic components, etc.

As illustrated in FIG. 1B, this configuration enables second arm part 25 to fold by second back arm 26 rotating and folding relative to second front arm 28 around an axis parallel to the Z axis illustrated in the figure. Moreover, second arm part 25 is only able to fold in the direction toward first arm part 15 described above (fold clockwise when viewed from the Z axis positive direction side), and is configured so as not to widen in the opposite direction. This makes it easier for second arm part 25 to engage with the ear of user 99.

As illustrated in FIG. 1A, the rear ends of first arm part 15 and second arm part 25 curve toward one another. Stated differently, the arm parts curve inward toward the inner space of HMD 100 where the head of user 99 goes. This causes first arm part 15 and second arm part 25 to put an inward and forward pressure on the rear part of the head of user 99, which pulls first lens tube 10 and second lens tube 20 closer to and presses them against the head of user 99. With this configuration, first arm part 15 and second arm part 25 inhibit HMD 100 from falling off when worn, improving wearability.

First arm part 15 further includes, on the inner surface of the rear end, first cushion 19 (see FIG. 1B) that presses against the rear part of the head of user 99. Similarly, second arm part 25 further includes, on the inner surface of the rear end, second cushion 29 (see FIG. 1A and FIG. 1B) that presses against the rear part of the head of user 99. These cushions are formed by adhering or applying a material that is elastic, which differs from the hard material that first arm part 15 and second arm part 25 are made of. Providing these cushions allow first arm part 15 and second arm part 25 to mitigate the unpleasant feeling felt by user 99 from the pressure of the arm parts.

First eye cup 14 is a tubular component interposed between first lens tube 10 and the head of user 99. First eye cup 14 is detachably attached to first lens tube 10. For example, when HMD 100 is used by a plurality of users 99, it is possible to inhibit indirect contact between users 99 via first lens tube 10 simply by changing out first eye cup 14. Moreover, since it is possible to remove and clean first eye cup 14, which is a main component that user 99 comes into contact with, it is possible to keep HMD 100 sanitary without having to clean the entire HMD 100.

Similarly, second eye cup 24 is a tubular component interposed between second lens tube 20 and the head of user 99. Second eye cup 24 is detachably attached to second lens tube 20. For example, when HMD 100 is used by a plurality of users 99, it is possible to inhibit indirect contact between users 99 via second lens tube 20 simply by changing out second eye cup 24. Moreover, since it is possible to remove and clean second eye cup 24, which is a main component that user 99 comes into contact with, it is possible to keep HMD 100 sanitary without having to clean the entire HMD 100.

First eye cup 14 is attached to first lens tube 10 by being inserted, in the Y axis negative direction, into first lens tube 10 from the open side of first major part 11. Similarly, second eye cup 24 is attached to second lens tube 20 by being inserted, in the Y axis negative direction, into second lens tube 20 from the open side of second major part 21. First eye cup 14 and second eye cup 24 will be further described in greater detail later.

Figure 2:
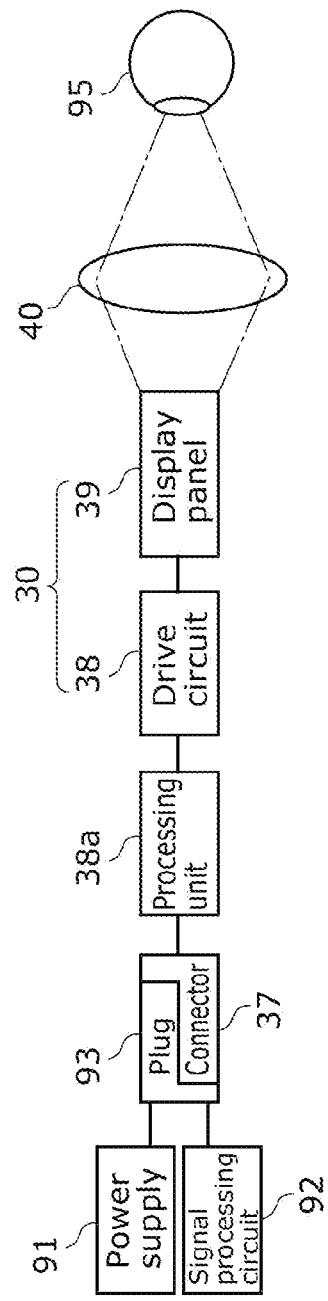
FIG. 2 is a block diagram illustrating, for example, the head-mounted display according to the embodiment.

FIG. 2 is a block diagram illustrating, for example, the head-mounted display according to the embodiment. FIG. 3 is an external view illustrating the head-mounted display according to the embodiment when worn. FIG. 4 is a wiring diagram of, for example, signal wires in the head-mounted display according to the embodiment. In addition to HMD 100, FIG. 2 illustrates some external devices and eye 95 of the user. Note that in FIG. 2, elements provided in pairs having left/right symmetry, namely first drive circuit 38L and second drive circuit 38R, first display panel 39L and second display panel 39R, and first convex lens 40L and second convex lens 40 are illustrated as drive circuit 38, display panel 39, and convex lens 40 for simplicity.

In HMD 100, power supply 91 and signal processing circuit 92 are connected via connector 37 and plug 93. Power supply 91 and signal processing circuit 92 are external devices connected to HMD 100.

Power supply 91 is a device that supplies power for HMD 100 to carry out various operations. For example, power supply 91 is an alternating current (AC)-direct current (DC) converter that converts household alternating current power to generate direct current power of a voltage necessary for HMD 100 to operate. Power supply 91 may be, for example, a battery that discharges stored power as direct current power, or a solar cell that supplies power generated using solar energy. Power supply 91 may be provided internally in HMD 100 as a battery, and, alternatively, may be attached to an external surface of HMD 100 as a solar cell. HMD 100 may be supplied with power via wireless transmission, without the use of plug 93 and connector 37.

Signal processing circuit 92 is a device that supplies image information to HMD 100 via communication. The image information indicates an image to be displayed. Signal processing circuit 92 supplies the image information as a digital signal, but may supply the image information as an analog signal. Signal processing circuit 92 may also cause HMD 100 to store the image information and display the image offline when plug 93 and connector 37 are disconnected. When online, that is, in a state in which the connection of plug 93 and connector 37 is maintained, signal processing circuit 92 may supply image information generated in real time one by one to HMD 100 and cause HMD 100 to display the image information generated in real time. Such image information may be supplied using wireless communication.

Figure 3:
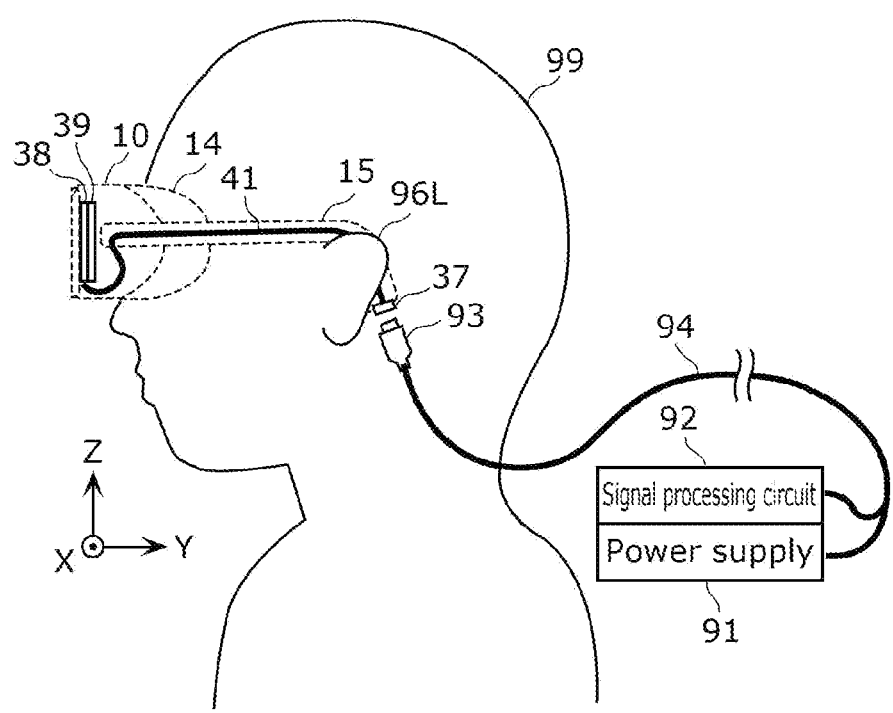
FIG. 3 is an external view illustrating the head-mounted display according to the embodiment when worn.
Figure 4:
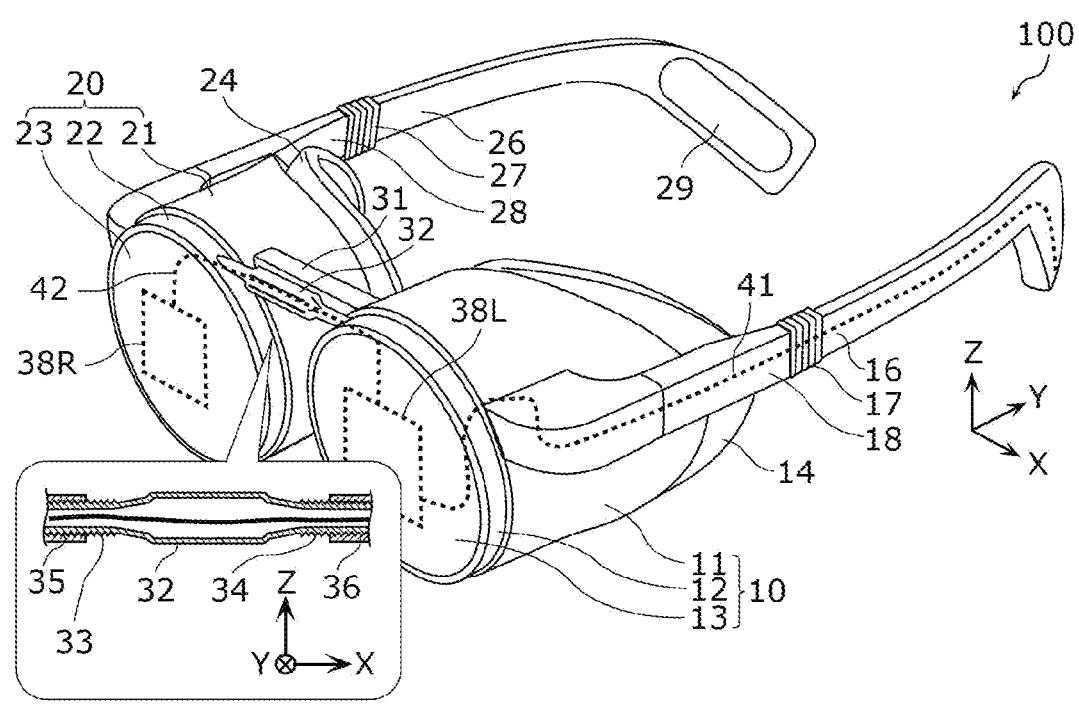
FIG. 4 is a wiring diagram of, for example, signal wires in the head-mounted display according to the embodiment.

As illustrated in FIG. 3, first arm part 15 includes connector 37, which is for performing at least one of the communication or the power supply described above, in a position behind ear 96L of user 99 when HMD 100 is worn. Providing connector 37 in a position behind ear 96L of user 99 inhibits cable 94 connected via plug 93 from entering the field of view of user 99 and moves the center of gravity of HMD 100 back. Accordingly, arranging connector 37 in this way improves the wearability of HMD 100.

The power and image information supplied from an external device or devices are transmitted to drive circuit 38 via internal wiring 41. More specifically, the image information is transmitted to drive circuit 38 via processing unit 38a as illustrated in FIG. 2. Processing unit 38a is a processing device that processes the image information to be displayed on display part 30 of HMD 100 to convert the image information into an analog signal, and performs various image adjustment processes. Processing unit 38a is implemented as a processor, memory, and a program for performing image processes stored in the memory. The processes performed by processing unit 38a, such as the image adjustment processes, will be described in greater detail later.

As illustrated in FIG. 4, the image information supplied to first drive circuit 38L disposed inside first lens tube 10 via internal wiring 41 in first arm part 15 is subsequently supplied to second drive circuit 38R disposed inside second lens tube 20 via distribution wiring 42. For example, as the cross sectional diagram of adjustment screw 32 in FIG. 4 illustrates, distribution wiring 42 connects first drive circuit 38L and second drive circuit 38R through a hollow space in adjustment screw 32. Forming at least one of adjustment screw 32 or connector bar 31 using a hollow component connects the internal spaces in first lens tube 10 and second lens tube 20. Note that the image information may be supplied to second drive circuit 38R from first drive circuit 38L by wireless communication.

An image is displayed on display part 30 based on the image information that reaches drive circuit 38 in this way as an analog signal. More specifically, display panel 39 is driven by drive circuit 38, whereby light indicating an image is emitted. The light is collected by convex lens 40 and viewed by eye 95 of user 99.

Drive circuit 38 is a circuit device for driving display panel 39. Display panel 39 is a device such as a liquid crystal panel, an organic electroluminescent (EL) panel, or a micro light-emitting diode (LED) panel. Note that other than display part 30 that uses the above-described drive circuit 38 and display panel 39, a retinal laser projector, for example, may be used.

Adjustment Mechanism

Hereinafter, examples of the adjustment mechanism capable of adjusting the distance between first lens tube 10 second lens tube 20 that differ from the first adjustment mechanism described in the basic configuration section above will be given with reference to FIG. 5 through FIG. 7.

Figure 5:
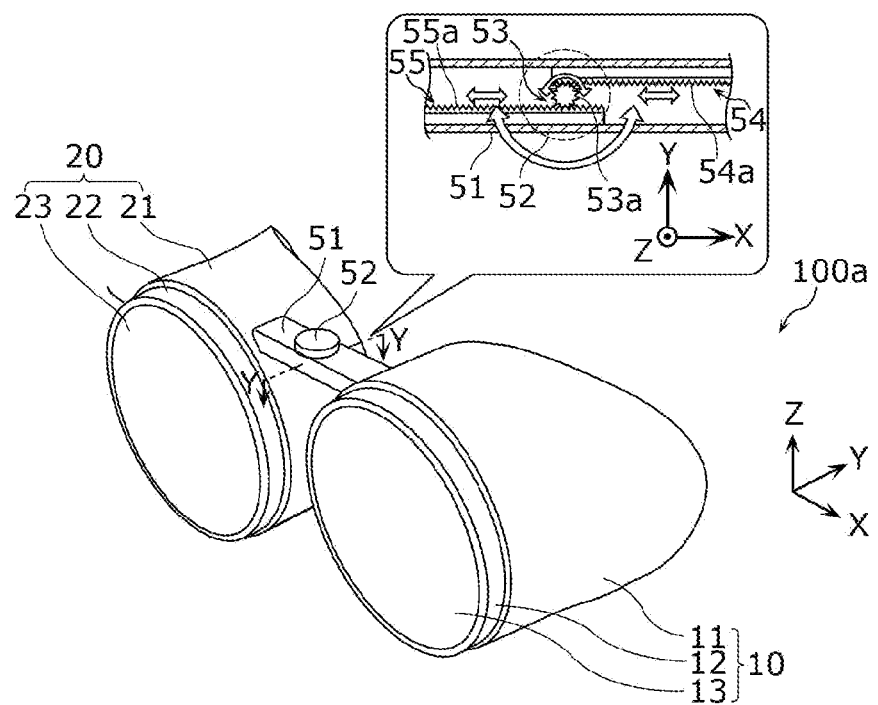
FIG. 5 illustrates a second example of an adjustment mechanism of the head-mounted display according to the embodiment.

FIG. 5 illustrates a second example of the adjustment mechanism of the head-mounted display according to the embodiment. FIG. 5 illustrates a configuration related to a second adjustment mechanism included in HMD 100a according to the embodiment. In particular, FIG. 5 illustrates a cross sectional diagram related to the second adjustment mechanism in the bubble. The cross sectional diagram is of a cross section taken along the Y-Y line illustrated in FIG. 5. Since FIG. 5 is provided for describing the second adjustment mechanism that adjusts the distance between first lens tube 10 and second lens tube 20, illustrations of configurations other than the second adjustment mechanism, first lens tube 10, and second lens tube 20 are omitted in FIG. 5.

As illustrated in FIG. 5, the second adjustment mechanism is made of a combination of hard materials such as metal and resin. The second adjustment mechanism includes first rack 54, second rack 55, pinion gear 53, adjustment dial 52, and case 51. First rack 54 extends along the X axis, has one end connected to first lens tube 10, and includes teeth 54a that project in the Y axis negative direction. Second rack 55 extends along the X axis, has one end connected to second lens tube 20, and includes teeth 55a that project in the Y axis positive direction.

Pinion gear 53 protrudes radially in an XY plane, includes outer teeth 53a that engage with teeth 54a and teeth 55a, and is interposed between first rack 54 and second rack 55 in the Y axis directions.

Case 51 holds first rack 54 and second rack 55 so as to be slidable along the X axis while maintaining the above-described positional relationships between first rack 54, second rack 55, and pinion gear 53. Case 51 also holds pinion gear 53 so as to be rotatable around an axis parallel to the Z axis in an orientation that allows outer teeth 53a to be engaged with teeth 54a and teeth 55a.

Adjustment dial 52 is connected to pinion gear 53 by a shaft (not illustrated) that extends along the rotational axis of pinion gear 53, and rotates along with pinion gear 53 around the axis of the shaft. In other words, rotating adjustment dial 52 causes pinion gear 53 to rotate in the same direction. When pinion gear 53 rotates, teeth 54a and 55a engaged with outer teeth 53a cause first rack 54 and second rack 55 to slide so as to be fed in directions dependent on the direction of rotation.

More specifically, when adjustment dial 52 is rotated clockwise from the perspective of the Z axis positive direction side, pinion gear 53 rotates clockwise via the shaft, first rack 54 slides in the X axis positive direction and second rack 55 slides in the X axis negative direction simultaneously. When adjustment dial 52 is rotated counter clockwise from the perspective of the Z axis positive direction side, pinion gear 53 rotates counter clockwise via the shaft, first rack 54 slides in the X axis negative direction and second rack 55 slides in the X axis positive direction simultaneously.

The sliding of first rack 54 and second rack 55 causes first lens tube 10 and second lens tube 20 connected to the ends thereof to move along the X axis, thereby adjusting the distance between first lens tube 10 and second lens tube 20. In the second adjustment mechanism, pinion gear 53 or adjustment dial 52 that rotates pinion gear 53 corresponds to the operable part.

Note that first rack 54 or second rack 55 may be provided on one of first lens tube 10 and second lens tube 20, and one end of case 51 may be connected to the other of first lens tube 10 and second lens tube 20. In other words, the distance between first lens tube 10 and second lens tube 20 may be adjusted by the one of first lens tube 10 and first lens tube 10 that is connected to first rack 54 or second rack 55 being caused to move in a sliding manner by pinion gear 53 relative to the other of first lens tube 10 and second lens tube 20.

Figure 6:
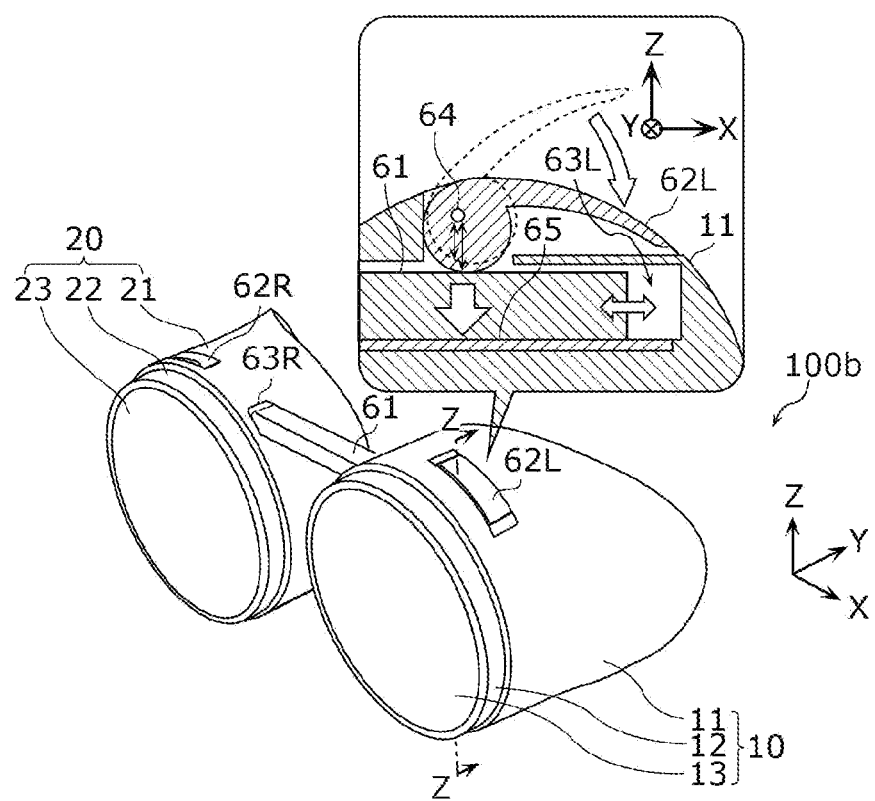
FIG. 6 illustrates a third example of the adjustment mechanism of the head-mounted display according to the embodiment.

FIG. 6 illustrates a third example of the adjustment mechanism of the head-mounted display according to the embodiment. FIG. 6 illustrates a configuration related to a third adjustment mechanism included in HMD 100b according to the embodiment. In particular, FIG. 6 illustrates a cross sectional diagram related to the third adjustment mechanism in the bubble. The cross sectional diagram is of a cross section taken along the Z-Z line illustrated in FIG. 6. Similar to FIG. 5, illustrations of configurations other than the third adjustment mechanism, first lens tube 10, and second lens tube 20 are omitted in FIG. 6.

As illustrated in FIG. 6, the third adjustment mechanism is made of a combination of hard materials such as metal and resin. The third adjustment mechanism includes first adjustment hole 63L, second adjustment hole 63R, adjustment bar 61, first cam lock lever 62L, second cam lock lever 62R, and anti-slip component 65. First adjustment hole 63L is a hole formed along the X axis on the side surface of first lens tube 10, and has an inner diameter that is larger than the outer diameter of adjustment bar 61 to be described later. Second adjustment hole 63R is a hole formed along the X axis on the side surface of second lens tube 20, and has an inner diameter that is larger than the outer diameter of adjustment bar 61 to be described later.

Adjustment bar 61 is a bar-shaped component that extends along the X axis. Adjustment bar 61 is insertable into first adjustment hole 63L and second adjustment hole 63R as a result of the above-described relationship with the inner diameters of first adjustment hole 63L and second adjustment hole 63R. More specifically, one end of adjustment bar 61 is inserted into first adjustment hole 63L, and the other end of adjustment bar 61 is inserted into second adjustment hole 63R. The other end of adjustment bar 61 may be directly fixedly connected to the side surface of second lens tube 20. In such cases, second adjustment hole 63R need not be provided.

As illustrated, first cam lock lever 62L includes a cam mechanism that eccentrically rotates around the axis of rotation of eccentric shaft 64 that extends parallel to the Y axis. With this cam mechanism, depending on the angle of rotation, first cam lock lever 62L presses in the Z axis negative direction against the one end of adjustment bar 61 inserted into first adjustment hole 63L. In such a state, adjustment bar 61 is pressed against the Z axis negative side surface in first adjustment hole 63L. The Z axis negative side surface in first adjustment hole 63L is provided with anti-slip component 65, and adjustment bar 61 is fixed while inserted a given depth in first adjustment hole 63L. In other words, first cam lock lever 62L is one example of a lock part. Note that the anti-slip component is made using a material having a high friction coefficient relative to the material of the Z axis negative side surface of adjustment bar 61 (i.e., the surface that contacts anti-slip component 65).

The distance between first lens tube 10 and second lens tube 20 is adjusted by releasing first cam lock lever 62L locked as described above and changing the relative positions of adjustment bar 61 and first adjustment hole 63L. The same applies to second adjustment hole 63R; the distance between first lens tube 10 and second lens tube 20 is adjusted by releasing locked second cam lock lever 62R and changing the relative positions of adjustment bar 61 and second adjustment hole 63R. In the third adjustment mechanism, the distance between first lens tube 10 and second lens tube 20 is adjusted mainly by adjustment bar 61. Accordingly, adjustment bar 61 can be regarded as the operable part.

Although FIG. 6 illustrates an example in which first lens tube 10 and second lens tube 20 are respectively provided with first adjustment hole 63L and second adjustment hole 63R, a configuration is acceptable in which only one of first adjustment hole 63L and second adjustment hole 63R is provided, and only the one of first cam lock lever 62L and second cam lock lever 62R that corresponds to the provided adjustment hole is provided. In such cases, the end of adjustment bar 61 at which the other of adjustment hole 63L and second adjustment hole 63R and the other of first cam lock lever 62L and second cam lock lever 62R are not provided is connected to first lens tube 10 or second lens tube 20 via a simple adhesion or welding technique.

Figure 7:
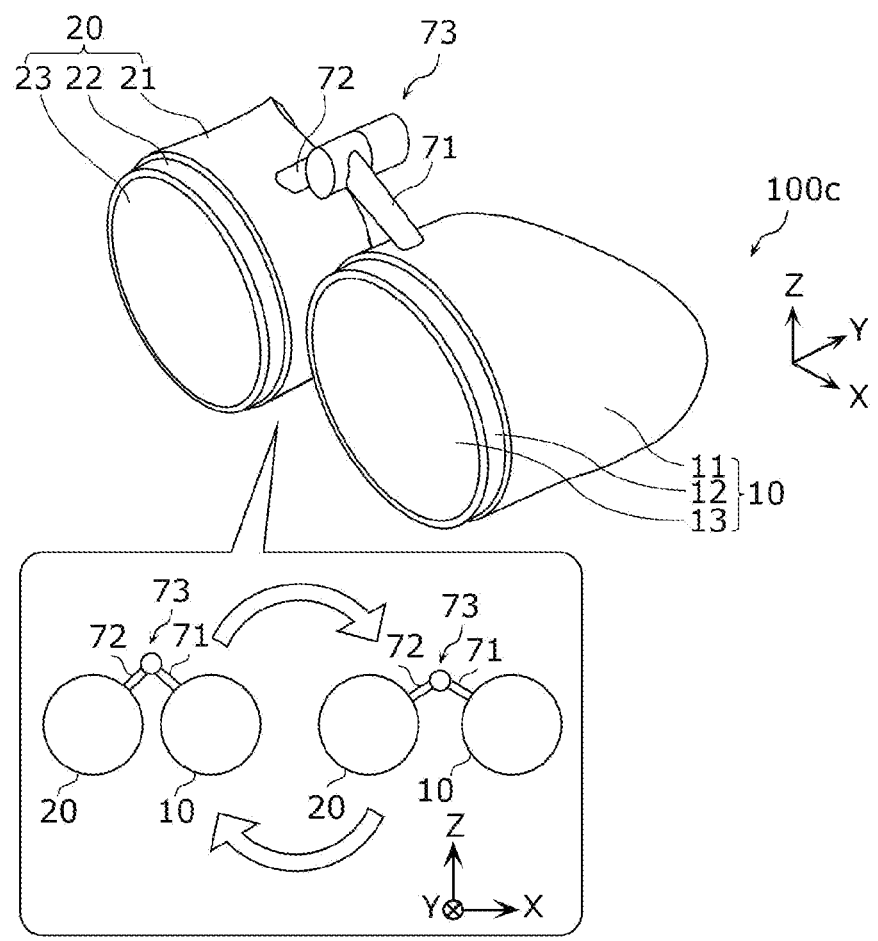
FIG. 7 illustrates a fourth example of the adjustment mechanism of the head-mounted display according to the embodiment.

FIG. 7 illustrates a fourth example of the adjustment mechanism of the head-mounted display according to the embodiment. FIG. 7 illustrates a configuration related to a fourth adjustment mechanism included in HMD 100c according to the embodiment. In particular, in the bubble, FIG. 7 illustrates front views related to the fourth adjustment mechanism when HMD 100C is viewed from the Y axis negative direction side. Similar to FIG. 5, illustrations of configurations other than the fourth adjustment mechanism, first lens tube 10, and second lens tube 20 are omitted in FIG. 7.

As illustrated in FIG. 7, the fourth adjustment mechanism is made of a combination of hard materials such as metal and resin. The fourth adjustment mechanism includes first rod 71, second rod 72, and rotation shaft part 73.

One end of the bar-shaped first rod 71 is connected to first lens tube 10 and the other end extends in a direction away from first lens tube 10 in an XZ plane. The other end of first rod 71 is connected to rotation shaft part 73 to be described later.

One end of the bar-shaped second rod 72 is connected to second lens tube 20 and the other end extends in a direction away from second lens tube 20 in a plane parallel to the XZ plane. The other end of second rod 72 is connected to rotation shaft part 73 to be described later.

Rotation shaft part 73 is a connection mechanism that rotatably connects the other end of first rod 71 and the other end of second rod 72 so as to be rotatable around an axis parallel to the Y axis. First rod 71 rotates relative to second rod 72 via rotation shaft part 73 in a plane parallel to the XZ plane. Since the lengths of first rod 71 and second rod 72 cause the axis of rotation to become eccentric and thus deviate to a position away from first lens tube 10 and second lens tube 20, the distance between first lens tube 10 and second lens tube 20 is adjusted according to the angle of rotation of first rod 71 and second rod 72. For example, in the illustration, the smaller the angle of rotation is, the shorter the distance between first lens tube 10 and second lens tube 20 is, and as the angle formed between first rod 71 and second rod 72 approaches 180 degrees by rotation, the distance between first lens tube 10 and second lens tube 20 increases. In the fourth adjustment mechanism, the distance between first lens tube 10 and second lens tube 20 is adjusted by operating first rod 71 and second rod 72 so as to around rotation shaft part 73. Accordingly, first rod 71 and second rod 72 can be regarded as the operable part.

Image Angle Maintainer

Figure 8:
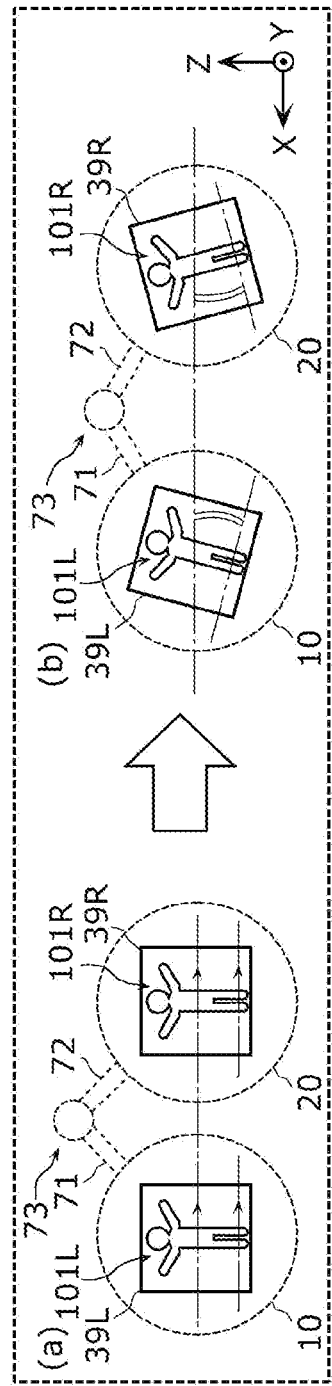
FIG. 8 is a first figure for illustrating a problem that occurs when the head-mounted display is rotated.

FIG. 8 is a first figure for illustrating a problem that occurs when the head-mounted display is rotated. FIG. 8 illustrates first image 101L displayed on first display panel 39L and second image 101R displayed on second display panel 39R as viewed from the Y axis positive direction side. In FIG. 8, (a) illustrates an HMD according to a comparative example in the standard orientation (i.e., an HMD that does not include the image angle maintainer to be described hereinafter).

With the HMD illustrated in (a) in FIG. 8, first image 101L and image 101R are in a state in which the up and down directions of the HMD and the vertical directions of the images match. In FIG. 8, (b) illustrates the HMD according to the comparative example when the distance between first lens tube 10 and second lens tube 20 has been adjusted by first rod 71, second rod 72, and rotation shaft part 73 described above. As illustrated in (b) in FIG. 8, the angles of first display panel 39L and second display panel 39R rotate along with the rotation of first lens tube 10 and second lens tube 20, and thus there are cases in which the images cannot be viewed correctly.

HMD 100c according to this embodiment includes an image angle maintainer that, in accordance with the angle of rotation of first rod 71 and second rod 72, rotates first display panel 39L relative to first lens tube 10 and rotates second display panel 39R relative to second lens tube 20 in a direction of rotation opposite that of first display panel 39L.

Here, the whole first display part may be rotated so that first drive circuit 38L also rotates along with first display panel 39L. First convex lens 40L may also be rotated. In such cases, an inner tube may be provided that rotates relative to first lens tube 10 and holds first display panel 39L and first convex lens 40L so that the positions of elements on the optical axis do not change. There may be instances in which a freeform lens is used as first convex lens 40L, and in such cases, when first display panel 39L is rotated relative to first convex lens 40L, the image appears distorted when viewed through first convex lens 40L, so the above configuration is useful in such cases. The above also applies to second lens tube 20.

Figure 9A:
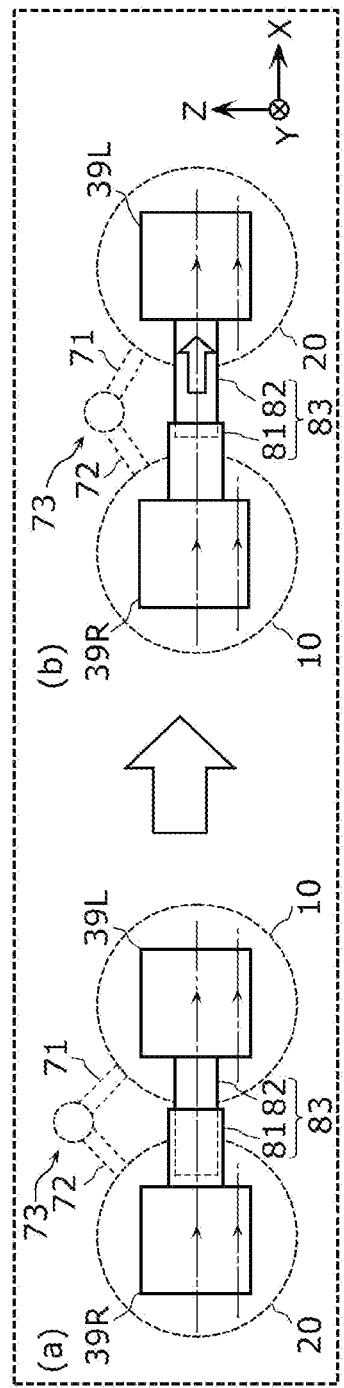
FIG. 9A is a first figure for illustrating an image angle maintainer in the head-mounted display according to the embodiment.
Figure 9B:
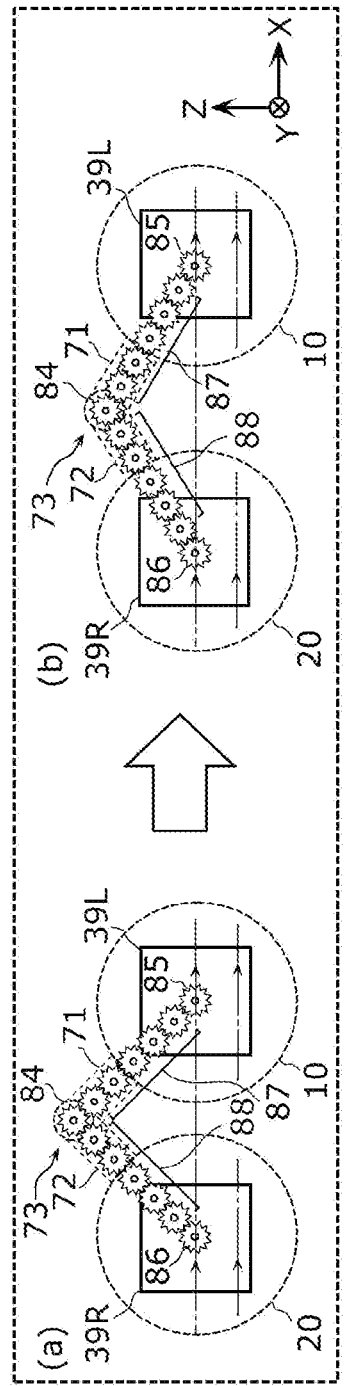
FIG. 9B is a second figure for illustrating the image angle maintainer in the head-mounted display according to the embodiment.
Figure 9C:
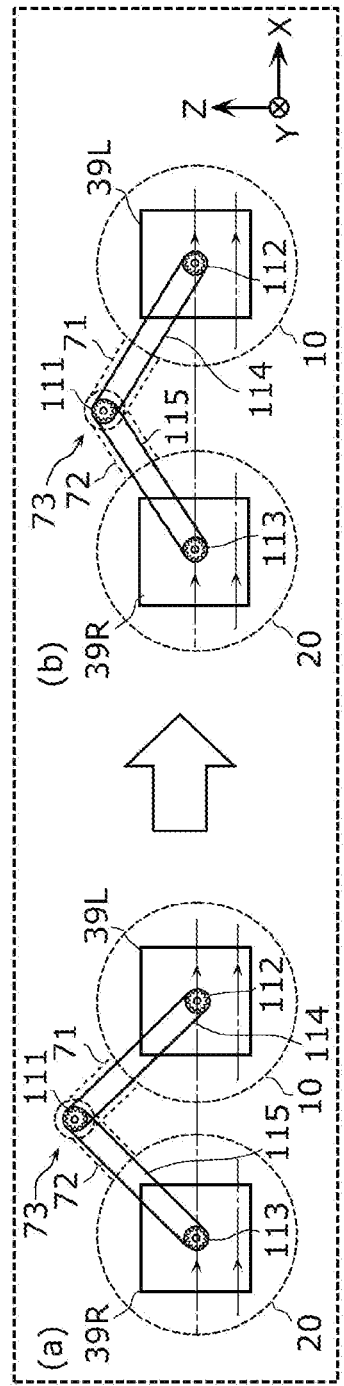
FIG. 9C is a third figure for illustrating the image angle maintainer in the head-mounted display according to the embodiment.

Hereinafter, the image angle maintainer will be described in greater detail with reference to FIG. 9A through FIG. 9C. FIG. 9A is a first figure for illustrating the image angle maintainer in the head-mounted display according to the embodiment. FIG. 9A through FIG. 9C illustrate HMD 100c from the perspective of the Y axis negative direction side, and elements other than first display panel 39L, second display panel 39R, and the image angle maintainer are illustrated using dashed lines to indicate transparency.

In HMD 100c illustrated in FIG. 9A, first display panel 39L is provided so as to be rotatable around the central axis of first lens tube 10, and second display panel 39R is provided so as to be rotatable around the central axis of second lens tube 20. This rotation of first display panel 39L and second display panel 39R also applies to FIG. 9B and FIG. 9C to be described later.

The image angle maintainer included in HMD 100c illustrated in FIG. 9A is implemented as expandable rod 83 including outer tube 81 and inner tube 82. Regardless of the distance between first lens tube 10 and second lens tube 20 adjusted as a result of inner tube 82 inserted in outer tube 81 expanding and collapsing into the outer tube in directions parallel to the X axis (expanding and collapsing directions), both ends of expandable rod 83 can be respectively connected to first display panel 39L and second display panel 39R.

More specifically, one end of expandable rod 83 is connected to first display panel 39L while inserted through a hole provided in the side surface of first lens tube 10, and the other end of expandable rod 83 is connected to second display panel 39R while inserted through a hole provided in the side surface of second lens tube 20.

Connecting first display panel 39L and second display panel 39R via the expandable rod in this manner makes it possible to maintain the points of connection at constant positions relative to the axis of expansion along which expandable rod 83 expands and collapses. In other words, the end of expandable rod 83 on the inner tube 82 side is connected to first display panel 39L in a manner that fixes the angle of first display panel 39L relative to the axis of expansion, and the end of expandable rod 83 on the outer tube 81 side is connected to second display panel 39R in a manner that fixes the angle of second display panel 39R relative to the axis of expansion. First lens tube 10 and second lens tube 20 rotate around rotation shaft part 73 which adjusts the distance therebetween while the angles of first display panel 39L and second display panel 39R are fixed by the expandable rod 83. With this operation, the horizontal directions of first display panel 39L and second display panel 39R are approximately parallel to the arrangement direction of first lens tube 10 and second lens tube 20.

FIG. 9B is a second figure for illustrating the image angle maintainer in the head-mounted display according to the embodiment. The image angle maintainer included in HMD 100c illustrated in FIG. 9B includes fixed gear 84, first rotary gear 85, first transfer gears 87, second rotary gear 86 and second transfer gears. Fixed gear 84 is provided on rotation shaft part 73 for obtaining a driving force in the rotation of first display panel 39L and second display panel 39R.

Fixed gear 84 is independent from the rotation of first rod 71 and second rod 72. Stated differently, fixed gear 84 does not rotate along with the rotation of first rod 71 and second rod 72. As a result of the angle of fixed gear 84 being maintained, when viewed from the perspective of first rod 71, fixed gear 84 relatively rotates in accordance with the amount of rotation of first rod 71. Accordingly, fixed gear 84 rotates relatively when also viewed from the perspective of first display panel 39L that rotates as first lens tube 10 rotates with first rod 71. Here, since fixed gear 84 maintains its orientation, fixed gear 84 relatively rotates in the opposite direction of the rotation of first rod 71.

First rotary gear 85 rotates along with first display panel 39L. In other words, by rotating first rotary gear 85, first display panel 39L rotates in the same direction as first rotary gear 85.

First transfer gears 87 are for transferring the relative rotation of fixed gear 84 described above. Here, first transfer gears 87 need to transfer the relative rotation of fixed gear 84 to first rotary gear 85 while maintaining the direction of the rotation. Accordingly, an odd number of at least one of first transfer gears 87 are provided. As a result of first rotary gear 85 rotating while the direction of rotation is maintained by first transfer gears 87, first display panel 39L rotates an amount dependent on the angle of rotation of first rod 71, in a direction opposite the direction of rotation of first rod 71.

The same applies to second rod 72 as well—as a result of the angle of fixed gear 84 being maintained, when viewed from the perspective of second rod 72, fixed gear 84 relatively rotates in accordance with the amount of rotation of second rod 72. Accordingly, fixed gear 84 rotates relatively when also viewed from the perspective of second display panel 39R that rotates as second lens tube 20 rotates with second rod 72. Here, since fixed gear 84 maintains its orientation, fixed gear 84 relatively rotates in the opposite direction of the rotation of second rod 72. Note that the relative rotation of fixed gear 84 when viewed from the perspective of second display panel 39R is a rotation in the opposite direction when viewed from the perspective of first display panel 39L. In other words, first display panel 39L and second display panel 39R rotate in opposite directions.

Second rotary gear 86 rotates along with second display panel 39R. In other words, by rotating second rotary gear 86, second display panel 39R rotates in the same direction as second rotary gear 86.

Second transfer gears 88 are for transferring the relative rotation of fixed gear 84 described above. Here, second transfer gears 88 need to transfer the relative rotation of fixed gear 84 to second rotary gear 86 while maintaining the direction of the rotation. Accordingly, an odd number of at least one of second transfer gears 88 are provided. As a result of second rotary gear 86 rotating while the direction of rotation is maintained by second transfer gears 88, second display panel 39R rotates an amount dependent on the angle of rotation of second rod 72, in a direction opposite the direction of rotation of second rod 72. With this operation, the horizontal directions of first display panel 39L and second display panel 39R are approximately parallel to the arrangement direction of first lens tube 10 and second lens tube 20.

Relative to the rotation of first rod 71 relative to second rod 72, first display panel 39L rotates half the amount and rotates in the opposite direction. Relative to the rotation of second rod 72 relative to first rod 71, second display panel 39R rotates half the amount and rotates in the opposite direction. Here, the number of first transfer gears 87 and the number of second transfer gears 88 are the same. Moreover, the gear ratio between fixed gear 84 and first rotary gear 85 is 1:1, and the gear ratio between fixed gear 84 and second rotary gear 86 is 1:1.

FIG. 9C is a third figure for illustrating the image angle maintainer in the head-mounted display according to the embodiment. The image angle maintainer included in HMD 100c illustrated in FIG. 9C includes stator 111, first rotor 112, second rotor 113, first belt 114, and second belt 115.

The operations performed by this configuration are the same as described with reference to FIG. 9B. In other words, stator 111 operates in the same manner as fixed gear 84, first rotor 112 operates in the same manner as first rotary gear 85, second rotor 113 operates in the same manner as second rotary gear 86, first belt 114 operates in the same manner as first transfer gears 87, and second belt 115 operates in the same manner as second transfer gears 88. With this, relative to the rotation of first rod 71 relative to second rod 72, first display panel 39L rotates half the amount and rotates in the opposite direction. Relative to the rotation of second rod 72 relative to first rod 71, second display panel 39R rotates half the amount and rotates in the opposite direction. With this operation, the horizontal directions of first display panel 39L and second display panel 39R are approximately parallel to the arrangement direction of first lens tube 10 and second lens tube 20.

Angle Detector

In HMD 100c according to the embodiment to be described below with reference to FIG. 10A through FIG. 10C, the image displayed on first display panel 39L and the image displayed on second display panel 39R are rotated in accordance with the angle of rotation of first rod 71 and second rod 72. This configuration produces an HMD 100c that achieves the same advantageous effects as those achieved by HMD 100c that includes the image angle maintainer illustrated in FIG. 9A through FIG. 9C described above.

More specifically, the inclusion of an angle detector that detects the angle of rotation of first rod 71 and second rod 72 makes it possible to rotate displayed images based on the angle of rotation of first rod 71 and second rod 72 detected by the angle detector, thereby enabling user 99 to correctly view the images.

Figure 10A:
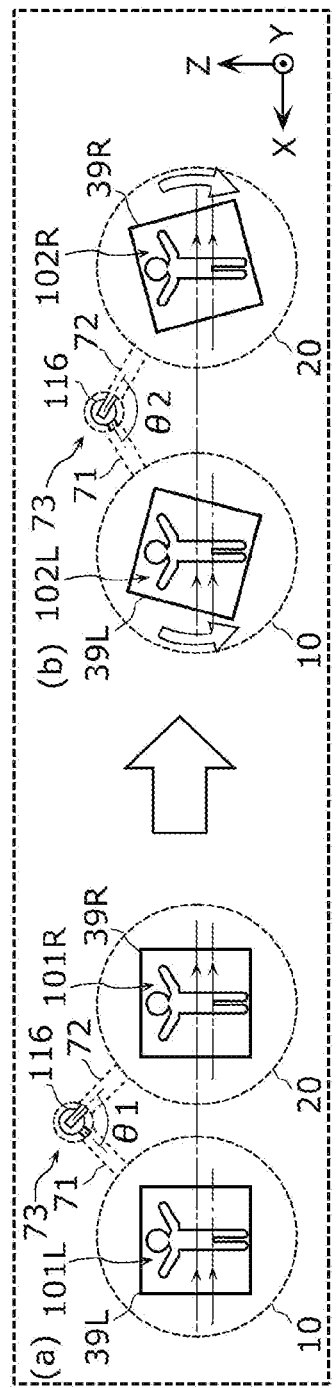
FIG. 10A is a first figure for illustrating an angle detector in the head-mounted display according to the embodiment.

FIG. 10A is a first figure for illustrating the angle detector in the head-mounted display according to the embodiment. FIG. 10A through FIG. 10C illustrate HMD 100c from the perspective of the Y axis positive direction side, and elements other than first display panel 39L, second display panel 39R, and the angle detector are illustrated using dashed lines to indicate transparency. In each of FIG. 10A through FIG. 10C, images of a person are depicted as first image 101L on first display panel 39L and second image 101R on second display panel 39R in the drawing denoted by (a).

The angle detector included in HMD 100c illustrated in FIG. 10A detects the angle of rotation of first rod 71 and second rod 72 based on the resistance value, measured by a resistance meter or the like, of resistance element 116 that is included in rotation shaft part 73 and whose resistance value changes according to the angle of rotation of first rod 71 and second rod 72.

More specifically, resistance element 116 is implemented as a variable resistor. A variable resistor is an electronic component whose resistance value changes according to an amount of rotation of a knob relative to the base. In other words, by fixedly disposing the base relative to first rod 71 and fixedly disposing the knob relative to second rod 72, the knob rotates relative to the base in conjunction with the rotation of first rod 71 and second rod 72. Then, the amount of rotation of the knob relative to the base, that is to say, the amount of rotation (angle of rotation) of second rod 72 relative to first rod 71 is detected by measuring the resistance value. The amount of rotation is an amount of difference calculated by subtracting reference orientation θ1 from θ2 illustrated in FIG. 10A.

Image outputter 38b (see FIG. 36A to be described later) (1) performs a first process of generating first rotated image 102L by changing the display angle of first image 101L corresponding to one eye of user 99 and (2) performs a second process of generating second rotated image 102R by changing the display angle of second image 101R corresponding to the other eye of user 99. In the generation of these rotated images, image outputter 38b performs coordinate conversion processing that overwrites the luminance value of each pixel with a luminance value of a coordinate-converted position, by performing address conversion on the input image, and generates the rotated images that display the luminance values of the pixels at the converted coordinates. The amount of rotation of the images is half the amount of difference. Regarding the direction of rotation of the images, the image displayed on first display panel 39L is rotated in the opposite direction that first rod 71 rotates relative to second rod 72, and the image displayed on second display panel 39R is rotated in the opposite direction that second rod 72 rotates relative to first rod 71. With this process, the images are rotated such that the horizontal directions of first image 101L and second image 101R are approximately parallel to the arrangement direction of first lens tube 10 and second lens tube 20.

Figure 10B:
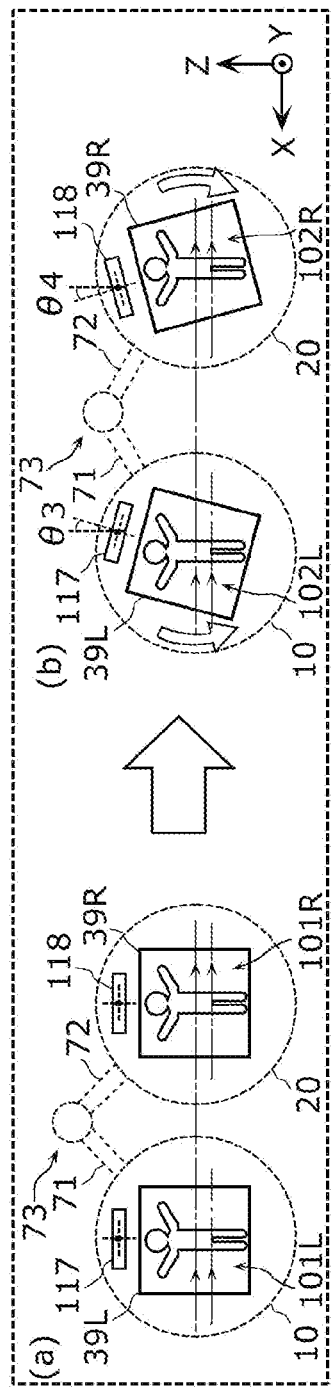
FIG. 10B is a second figure for illustrating the angle detector in the head-mounted display according to the embodiment.

FIG. 10B is a second figure for illustrating the angle detector in the head-mounted display according to the embodiment. The angle detector included in HMD 100c illustrated in FIG. 10B includes first gyrosensor 117 and second gyrosensor 118.

First gyrosensor 117 is provided in or on first lens tube 10, detects how much it is tilting, and outputs amount of tilt 83. Second gyrosensor 118 is provided in or on second lens tube 20, detects how much it is tilting, and outputs amount of tilt 84. The amount of rotation of first rod 71 and second rod 72 is obtained by adding the absolute values of the output 83 and 84. Since subsequent image processes are the same as the processes described above with reference to FIG. 10A, repeated description thereof will be omitted.

Figure 10C:
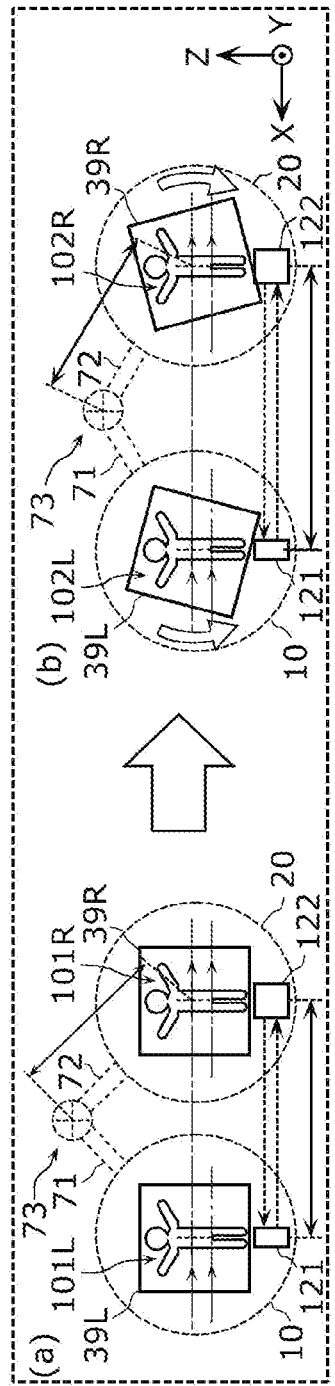
FIG. 10C is a third figure for illustrating the angle detector in the head-mounted display according to the embodiment.

FIG. 10C is a third figure for illustrating the angle detector in the head-mounted display according to the embodiment. The angle detector included in HMD 100c illustrated in FIG. 10C obtains the distance between first lens tube 10 and second lens tube 20 from first measurement device 121 and second measurement device 122. For example, first measurement device 121 and second measurement device 122 measure the distance between first lens tube 10 and second lens tube 20 and output the result of the measurement. Note that this configuration can be implemented so long as one of first measurement device 121 and second measurement device 122 is provided. Accordingly, both first measurement device 121 and second measurement device 122 need not be provided.

The angle of rotation can be calculated by a trigonometric function using the distance between first lens tube 10 and second lens tube 20 and the distance between the center of rotation shaft part 73 and the center of first lens tube 10. In other words, the angle detector calculates half the angle formed between first rod 71 and second rod 72 by the inverse sine function from the distance between the center of rotation shaft part 73 and the center of first lens tube 10 relative to half the distance between first lens tube 10 and second lens tube 20. The angle detector performs the same calculation before and after a rotation to detect the angle corresponding to the angle of rotation changed by the rotation. Since subsequent image processes are the same as the processes described above with reference to FIG. 10A, repeated description thereof will be omitted.

Figure 11:
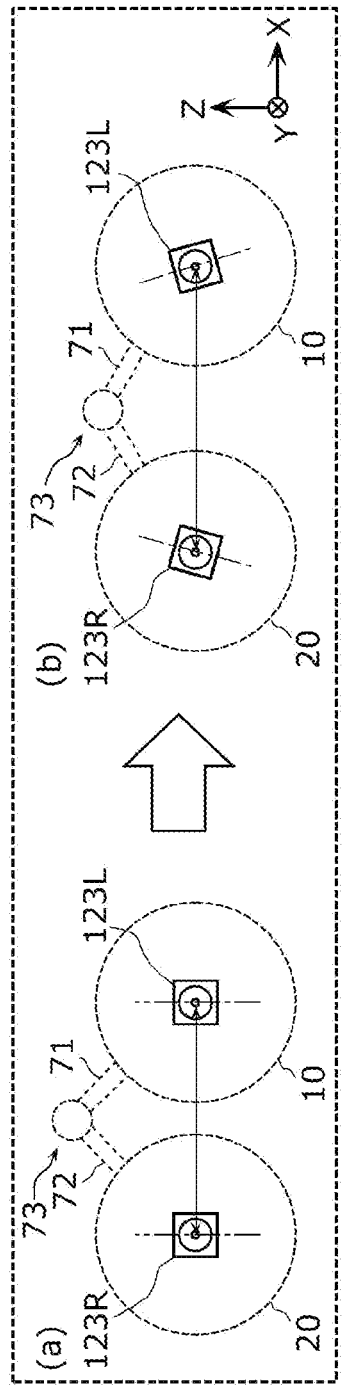
FIG. 11 is a second figure for illustrating a problem that occurs when the head-mounted display is rotated.
Figure 12:
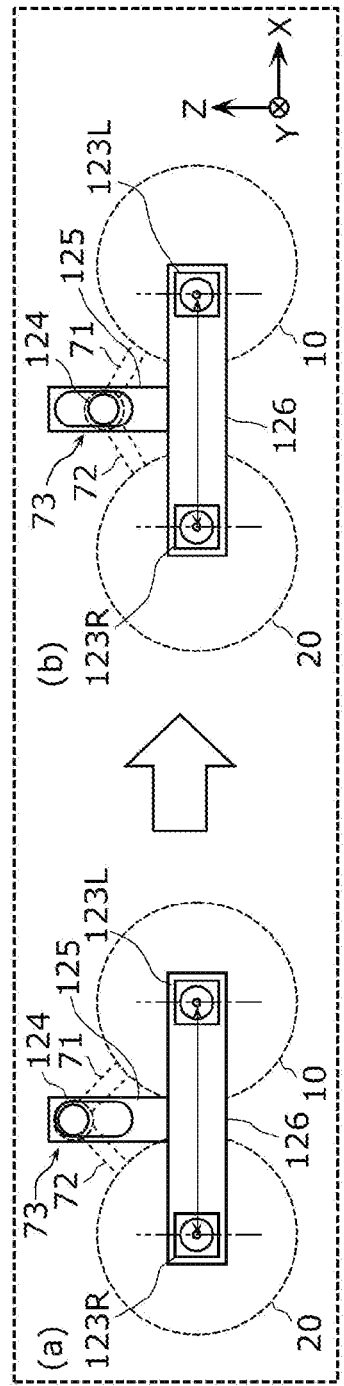
FIG. 12 is for illustrating a camera holding mechanism included in the head-mounted display according to the embodiment.

Next, another problem caused by the rotation of first rod 71 and second rod 72 and how the problem is handled will be described with reference to FIG. 11 and FIG. 12. FIG. 11 is a second figure for illustrating a problem that occurs when the head-mounted display is rotated. FIG. 12 is for illustrating a camera holding mechanism included in the head-mounted display according to the embodiment.

FIG. 11 and FIG. 12 illustrate HMD 100c from the perspective of the Y axis negative direction side, and elements other than first camera 123L, second camera 123R, and the camera holding mechanism are illustrated using dashed lines to indicate transparency. First camera 123L is provided inside first minor part 12 and captures images in a forward direction through first panel 13. Second camera 123R is provided inside second minor part 22 and captures images in a forward direction through second panel 23. First panel 13 and second panel 23 may be half mirrors. This allows for the cameras to be hidden when viewed from the outside and thus images can be captured without drawing attention from people in the surrounding area.

Figure 17:
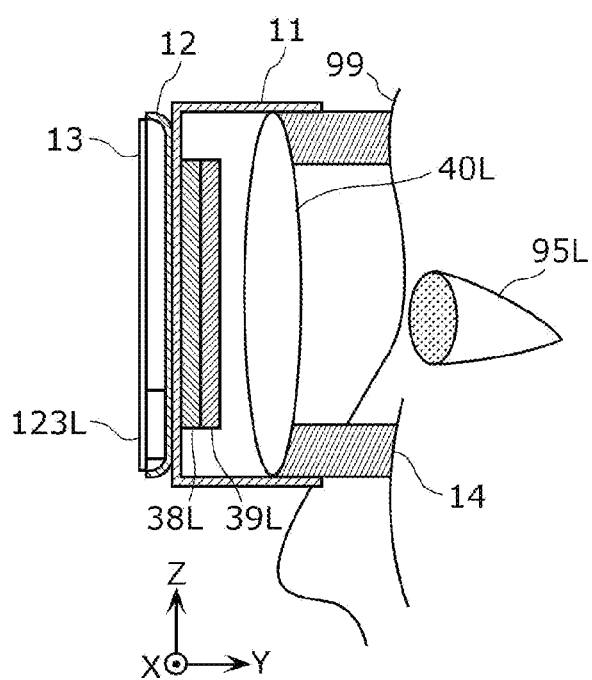
FIG. 17 is a first cross sectional diagram of the head-mounted display according to the embodiment when worn.

Although first camera 123L and second camera 123R are positioned in the central regions of first lens tube 10 and second lens tube 20 along the Z axis in the examples in FIG. 11 and FIG. 12, the positions of first camera 123L and second camera 123R are not limited to this example. First camera 123L and second camera 123R may be fixedly provided to first lens tube 10 and second lens tube 20 so as to capture images in the Y axis negative direction. For example, as illustrated in FIG. 17 to be described later, first camera 123L and second camera 123R may be disposed in the spaces formed inside first minor part 12 and second major part 22, on the Z axis negative side ends of the spaces, and, alternatively, may be disposed on the Z axis positive side ends of the spaces, which is not illustrated in FIG. 17. More preferably, first camera 123L and second camera 123R are positioned in the central regions of first lens tube 10 and second lens tube 20 along the Z axis, in front of eyes 95 of user 99.

First camera 123L that captures images in a direction parallel to the central axis of first lens tube 10 and opposite the direction in which first lens tube 10 opens (i.e., in the forward direction) is provided in or on first lens tube 10. Second camera 123R that captures images in a direction parallel to the central axis of second lens tube 20 and opposite the direction in which second lens tube 20 opens (i.e., in the forward direction) is provided in or on second lens tube 20. First camera 123L and second camera 123R are used in a video see-through mode that displays video captured outside of HMD 100c as images. If the orientations of first camera 123L and second camera 123R are not maintained as illustrated in FIG. 11 when first lens tube 10 and second lens tube 20 rotate, video cannot be displayed suitably.

There are instances in which first camera 123L and second camera 123R are used to measure the distance from HMD 100c to an object captured by the cameras. Since the distance is measured using triangulation, the distance between first camera 123L and second camera 123R needs to be known in advance.

For example, for the former, just like with the rotation of the images described above, it is possible to rotate the video captured by an amount dependent on the angle of rotation, and for the latter, it is possible to separately measure the distance between the first lens tube 10 and second lens tube 20 and correct the distances.

HMD 100c according to this embodiment includes a camera holding mechanism separate from the camera holding mechanism described above. This camera holding mechanism holds first camera 123L and second camera 123R so as to maintain the distance therebetween at a given distance, and fixes the orientations of first camera 123L and second camera 123R. More specifically, as illustrated in FIG. 12, this camera holding mechanism includes fixing panel 126 that fixes the orientations of and distance between first camera 123L and second camera 123R, holding panel 125 that maintains the position of fixing panel 126 with rotation shaft part 73 as a reference, and shaft support 124 that maintains the position of holding panel 125 relative to rotation shaft part 73 at a given position.

Shaft support 124 is provided on rotation shaft part 73, and fixes the X axis position of holding panel 125 relative to the rotation shaft part. However, shaft support 124 is capable of moving along the Z axis in an elongated hole provided in holding panel 125. In other words, X axis movement of holding panel 125 is fixed relative to rotation shaft part 73, and holding panel 125 can freely move along the Z axis. Moreover, the positional relationship between holding panel 125 and fixing panel 126 is fixed.

First camera 123L and second camera 123R can freely move along the X axis in first lens tube 10 and second lens tube 20, and can freely rotate relative to first lens tube 10 and second lens tube 20. With this, the X axis positions and angles of first camera 123L and second camera 123R are fixed by holding panel 125 and fixing panel 126. Accordingly, HMD 100c can suitably capture and display video, and measure the distance to an object correctly displayed.

Note that since first camera 123L and second camera 123R are respectively provided on first minor part 12 and second minor part 22, fixing panel 126 is fixed to holding panel 125 in a location further in the Y axis negative direction than first major part 11 and second major part 21, and in a location further in the Y axis positive direction than first panel 13 and second panel 23.

As described above, this camera holding mechanism is provided for the purpose of adjusting the distance between first camera 123L and second camera 123R. In other words, this camera holding mechanism is useful in not only HMD 100c in which first camera and second camera rotate with the rotational movement of other parts, but also in any of the HMDs capable of adjusting the distance between first lens tube 10 and second lens tube 20 in accordance with the IPD of user 99. Accordingly, HMD 100, HMD 100*a*, and HMD 100*b* may be implemented to include the same camera holding mechanism as described above.

Figure 13:
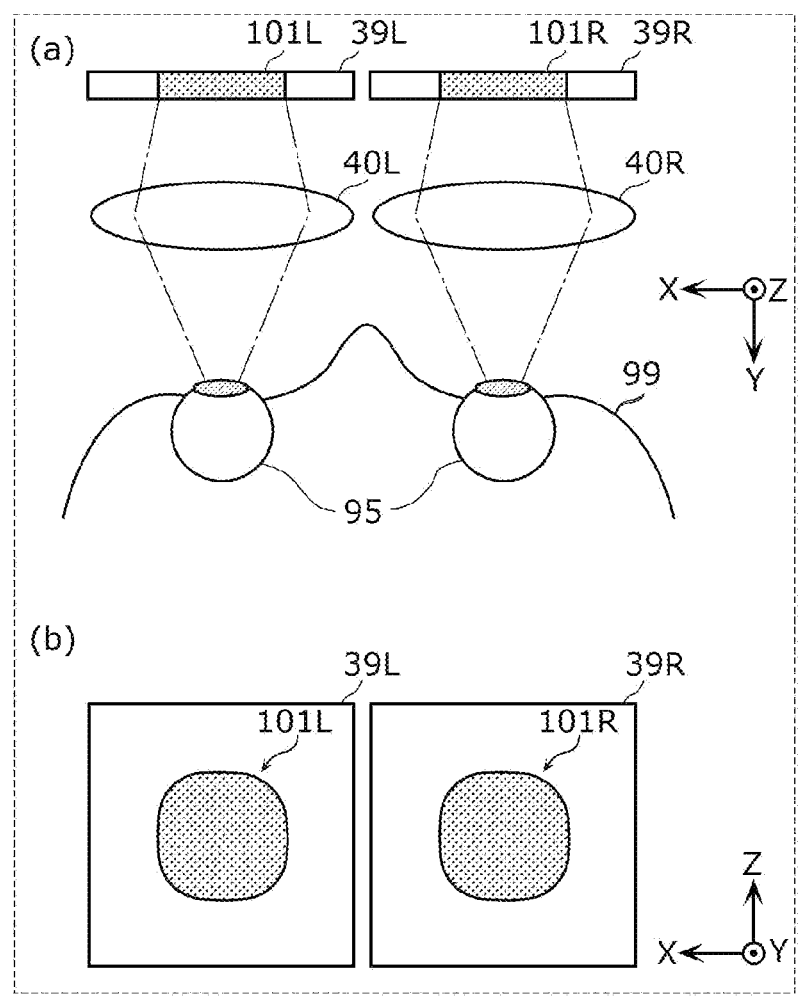
FIG. 13 is a first figure for illustrating one example of image adjustment performed by the head-mounted display according to the embodiment.
Figure 14:
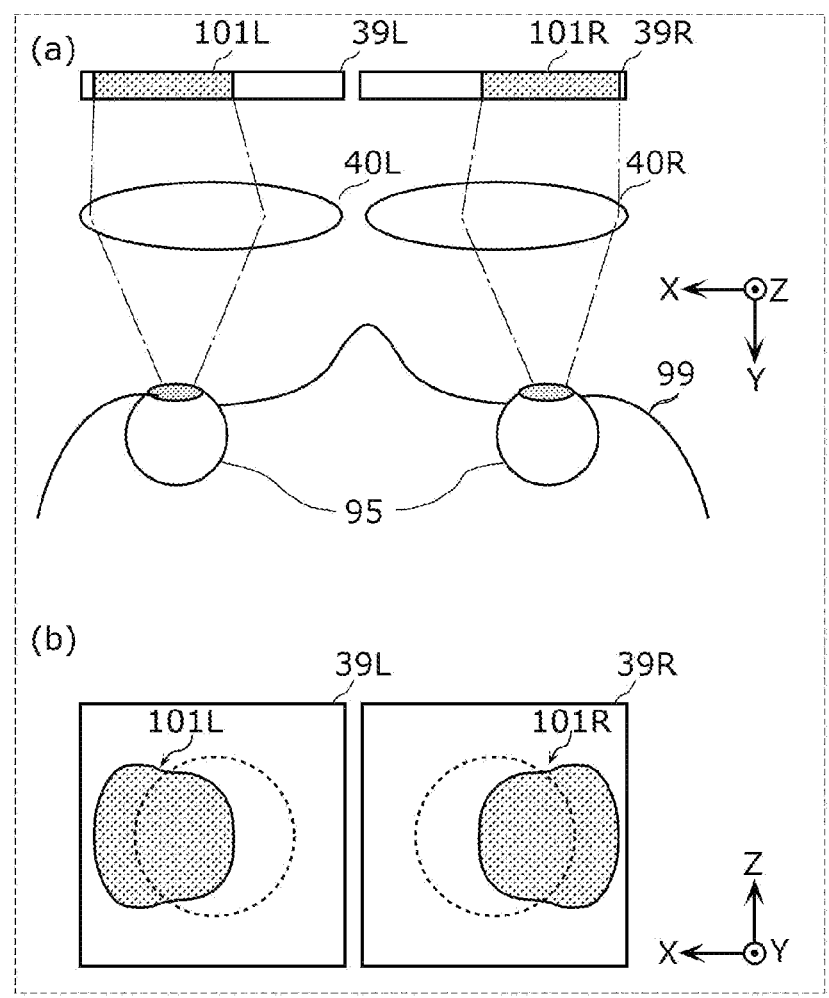
FIG. 14 is a second figure for illustrating one example of image adjustment performed by the head-mounted display according to the embodiment.

Next, image processing according to the IPD of user 99 will be described with reference to FIG. 13 and FIG. 14. FIG. 13 is a first figure for illustrating one example of image adjustment performed by the head-mounted display according to the embodiment. FIG. 14 is a second figure for illustrating one example of image adjustment performed by the head-mounted display according to the embodiment. In FIG. 13 and FIG. 14, (a) illustrates the configuration of part of the HMD when viewed from above user 99, and (b) illustrates first display panel 39L and second display panel 39R from the perspective of user 99.

FIG. 13 illustrates a case in which the IPD of user 99 matches the distance between the centers of first convex lens 40L and second convex lens 40R. FIG. 14 illustrates a case in which display positions of images displayed on the display surfaces of first display panel 39L and second display panel 39R have been adjusted to match the IPD of user 99. As illustrated in FIG. 13, when the IPD of user 99 matches the distance between the centers of first convex lens 40L and second convex lens 40R, first image 101L and image 101R are displayed in the centers of first display panel 39L and second display panel 39R, respectively. Moreover, images displayed like in (b) in FIG. 13 are deformed into rounded images by passing through the convex lenses to generate the correct images.

In contrast, in the example illustrated in FIG. 14, the display positions of images on first display panel 39L and second display panel 39R have been adjusted to match the IPD of user 99. Here, the refraction of first convex lens 40L and second convex lens 40R produces distortion that increases outward. Accordingly, with HMD 100 illustrated in FIG. 14, deformation to cancel the distortion is applied to the images before being displayed on first display panel 39L and second display panel 39R. In particular, as illustrated in (b) in FIG. 14, the part of the displayed image in the region of the convex lens outside the dashed-line circle, which corresponds to the periphery of the convex lens where distortion is readily observed, is greatly deformed in accordance with the great amount of distortion. This distortion is applied by image outputter 38*b*.

In other words, image outputter 38*b* performs distortion correction processing of correcting the lens distortion of first convex lens 40L according to the position of image 101L displayed on first display panel 39L relative to the center of first display panel 39L and correcting the lens distortion of second convex lens 40R according to the position of image 101R displayed on second display panel 39R relative to the center of second display panel 39R. In the distortion correction processing, image outputter 38*b* adjusts, in accordance with the position of image 101L relative to the center of first display panel 39L, image 101R to be displayed on second display panel 39R so as to be symmetrical on the Z axis and antisymmetrical on the X axis relative to the center of second display panel 39R.

Figure 15:
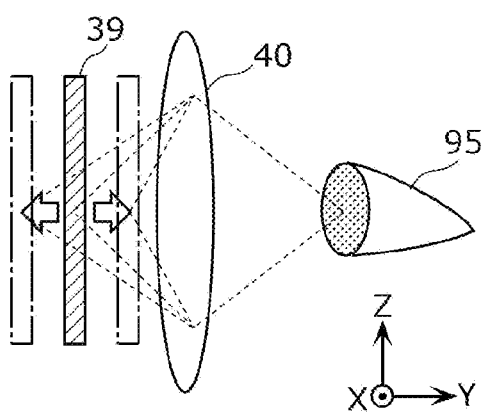
FIG. 15 is a first figure for illustrating focal correction performed by the head-mounted display according to the embodiment.
Figure 16A:
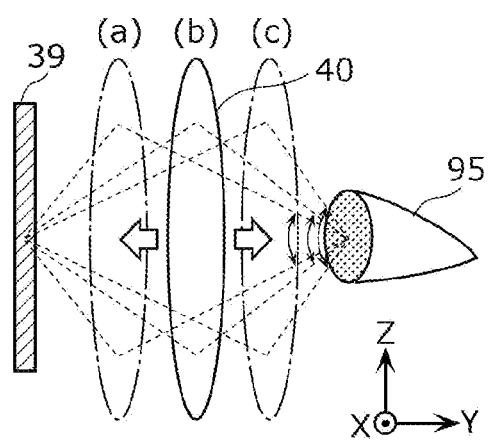
FIG. 16A is a second figure for illustrating focal correction performed by the head-mounted display according to the embodiment.
Figure 16B:
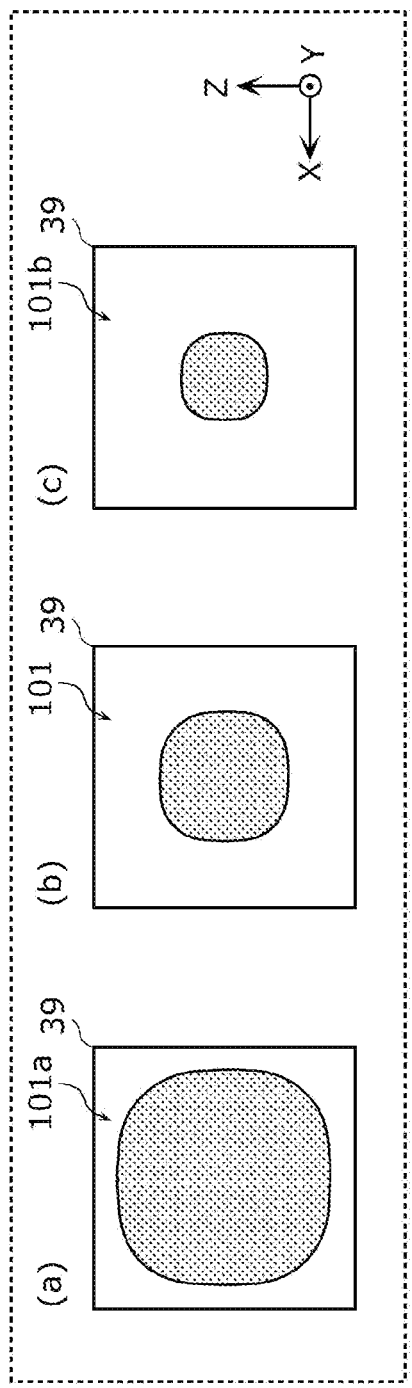
FIG. 16B is for illustrating image zoom processing that accompanies focal correction performed by the head-mounted display according to the embodiment.

FIG. 15 is a first figure for illustrating focal correction performed by the head-mounted display according to the embodiment. FIG. 16A is a second figure for illustrating focal correction performed by the head-mounted display according to the embodiment. FIG. 16B is for illustrating image zoom processing that accompanies the focal correction performed by the head-mounted display according to the embodiment.

In HMD 100 according to this embodiment, focal correction is performed by adjusting, in accordance with material about user 99, the distance between first convex lens 40L and first display panel 39L and the distance between second convex lens 40R and second display panel 39R. For example, as illustrated in FIG. 15, HMD 100 displays an image that matches the focal point of user 99 by adjusting the Y axis position of display panel 39 (i.e., one of first display panel 39L and second display panel 39R).

Moreover, for example, as illustrated in FIG. 16A, HMD 100 adjusts the focal point of user 99 to the position of display panel 39 by adjusting the Y axis position of convex lens 40 (i.e., one of first convex lens 40L and second convex lens 40R). Here, the angle of view (black arrows in the figure) changes as the distance between convex lens 40 and eye 95 changes. Image outputter 38*b* performs zoom processing that enlarges or shrinks the display size of the image to be displayed on display panel 39 to a size dependent on the angle of view.

For example, when the angle of view decreases like in (a) in FIG. 16A, image outputter 38*b* generates and displays an enlarged image 101*a* as shown in (a) in FIG. 16B. Since (b) in FIG. 16A and (b) in FIG. 16B illustrate the display of a normal image 101 corresponding to a normal angle of view, description will be omitted. For example, when the angle of view increases like in (c) in FIG. 16A, image outputter 38*b* generates and displays a shrunk image 101*b* as shown in (c) in FIG. 16B.

Eye Cup

Next, the configuration of the eye cup according to this embodiment will be described with reference to FIG. 17 through FIG. 26. FIG. 17 is a first cross sectional diagram of the head-mounted display according to the embodiment when worn. FIG. 17 illustrates a cross sectional diagram in the YZ plane passing through first lens tube 10, and user 99. As illustrated in FIG. 17, first eye cup 14 inhibits direct contact between user 99 and first lens tube 10. First eye cup 14 is configured to cover one eye of the user, and as the cross sectional diagram shows, first eye cup 14 is interposed between user 99 and first lens tube 10 at two visual points on the brow side and the cheek side.

In this way, first eye cup 14 is configured to fill in the space between user 99 and first lens tube 10. First eye cup 14 is made using a material that is capable of elastically deforming, such as silicon rubber, and has a light blocking characteristic. First eye cup 14 may be made using a sponge-like resin material. As a result of first eye cup 14 having a light blocking characteristic and being configured to fill in the space between user 99 and first lens tube 10, HMD 100 inhibits a reduction in visibility resulting from light emitted for the purpose of showing user 99 an image and external light mixing.

Figure 18A:
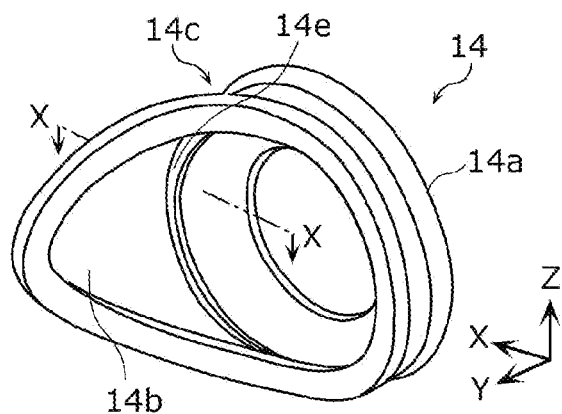
FIG. 18A is a first perspective view of an eye cup of the head-mounted display according to the embodiment.
Figure 18B:
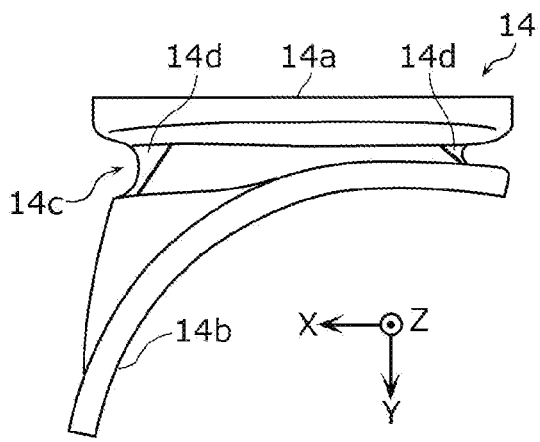
FIG. 18B is a top view of the eye cup of the head-mounted display according to the embodiment.
Figure 18C:
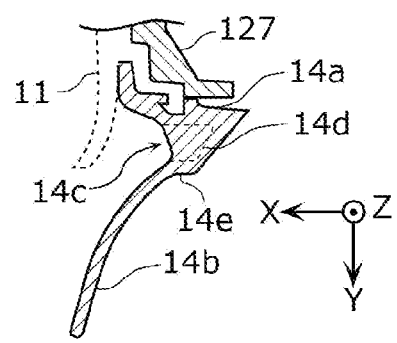
FIG. 18C is a cross sectional diagram of the eye cup taken along line X-X in FIG. 18A.

FIG. 18A is a first perspective view of the eye cup of the head-mounted display according to the embodiment. FIG. 18B is a top view of the eye cup of the head-mounted display according to the embodiment. FIG. 18C is a cross sectional diagram of the eye cup taken along line X-X in FIG. 18A.

As illustrated in FIG. 18A through FIG. 18C, first eye cup 14 according to this embodiment includes tubular first insertion part 14*a* that is inserted in, in particular, first major part 11 of first lens tube 10, and curved-sheet-shaped first cup part 14*b* that extends outward from the open end of first major part 11 (i.e., extends in the Y axis positive direction) and is sized to reach the head of user 99 when user 99 is wearing HMD 100. First cup part 14*b* curves along the curve of user 99 from the surrounding area of eye 95 to the side of the head. A surface is formed on the contact end of first cup part 14b that contacts user 99 so as to increase the surface area of contact. Here, first cup part 14b continuously covers the space between the above-described curved contact end that follows the curve of the head of user 99 and the connection end that is connected to first insertion part 14a. With this configuration, first cup part 14b functions to connect the separated first lens tube 10 and the head of user 99 to block external light from entering the field of view of user 99.

First narrow part 14c is formed between first insertion part 14a and first cup part 14b and has a smaller outer circumference than the outer circumference of first insertion part 14a and the outer circumference of first cup part 14b. Stated differently, first narrow part 14c is a thin-walled portion that is formed around the entire circumference of the outer surface of first eye cup 14. The formation of first narrow part 14c gives first eye cup 14 flexibility in the up, down, left, and right directions. Here, the flexibility of first eye cup 14 in the up and down directions is useful as it improves wearability for user 99 without affecting the left/right parallax of HMD 100, but there are instances where the flexibility of first eye cup 14 in the left and right directions affects the left/right parallax of HMD 100.

In view of this, first eye cup 14 includes first thick part 14d at an intersection of first narrow part 14c and a line parallel to the arrangement direction that passes through the center of the narrow part in the height direction (i.e., at an intersection of first narrow part first narrow 14c and the arrangement plane) that expands outward beyond the outer circumference. First thick part 14d is integrally formed with first eye cup 14 so as to fill in first narrow part 14c in the arrangement plane. First thick part 14d has a tapered shape so as to widen in diameter in the Y axis negative direction of first lens tube 10. With this, first cup part 14b presses first thick part 14d at the smaller diameter end in the Y axis negative direction, and the force exerted by the pressing is supported by the other larger diameter end. In other words, the fulcrum is small and definite, and first thick part 14d functions to facilitate deflection of first cup part 14b in a direction away from the fulcrum. As a result, first cup part 14b can easily deflect in the up and down directions.

First thick part 14d supports first cup part 14b from the first insertion part 14a side so as to oppose left and right deflection of first eye cup 14. In order to further strengthen the support of first cup part 14b, first cup part 14b includes first plate part 14e that is connected to the first cup part and extends outward beyond first thick part 14d in an XZ plane that intersects the central axis of first lens tube 10. This forms a structure like a seesaw whereby the deflection of first eye cup 14 is supported by first plate part 14e, whereby deflection in the left and right directions is strongly inhibited and deflection in the up and down directions can easily occur in a state in which the shape of first cup part 14b is maintained.

Moreover, as illustrated in FIG. 18C, first major part 11 and first insertion part 14a are connected (or fitted) by the engagement of a recessed and protruded structure. This configuration will be described with reference to FIG. 19A through FIG. 19C. First support ring 127 illustrated in FIG. 18C will also be described later.

Figure 19A:
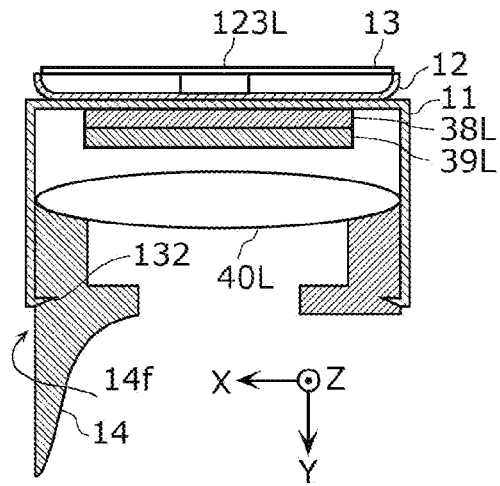
FIG. 19A is a first cross sectional diagram of a fitting mechanism of the eye cup of the head-mounted display according to the embodiment.
Figure 19B:
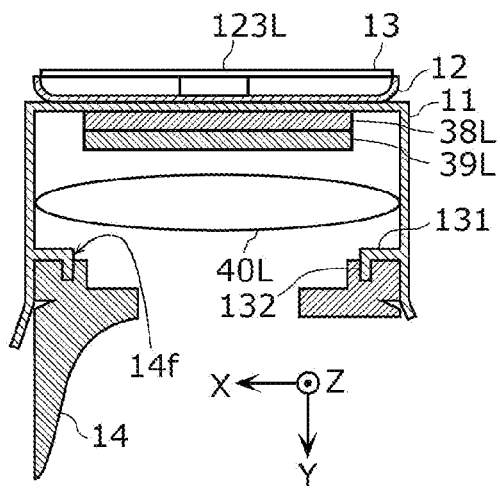
FIG. 19B is a second cross sectional diagram of the fitting mechanism of the eye cup of the head-mounted display according to the embodiment.
Figure 19C:
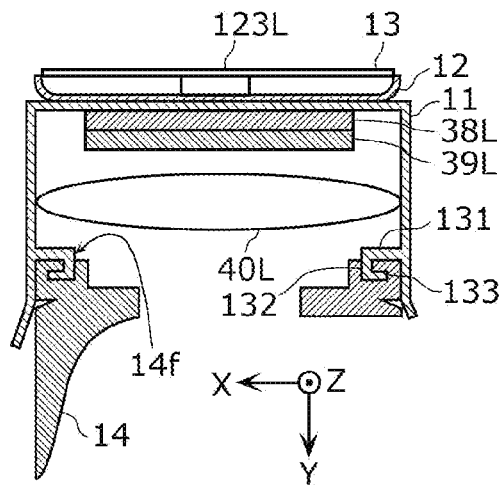
FIG. 19C is a third cross sectional diagram of the fitting mechanism of the eye cup of the head-mounted display according to the embodiment.

FIG. 19A is a first cross sectional diagram of the fitting mechanism of the eye cup of the head-mounted display according to the embodiment. FIG. 19B is a second cross sectional diagram of the fitting mechanism of the eye cup of the head-mounted display according to the embodiment. FIG. 19C is a third cross sectional diagram of the fitting mechanism of the eye cup of the head-mounted display according to the embodiment.

FIG. 19A through FIG. 19C illustrate cross sectional diagrams taken in the XY plane of first lens tube 10 and first eye cup 14 from the perspective of the Z axis positive direction side. In FIG. 19A, first major part 11 includes first protruding part 132 that is formed on the inner surface and protrudes inward. Moreover, when fitted, first eye cup 14 forms first recessed part 14f at a location on first insertion part 14a that corresponds to first protruding part 132. First eye cup 14 is inhibited from falling off from first major part 11 by first recessed part 14f and first protruding part engaging when inserted so that first recessed part 14f covers the first protruding part.

As illustrated in FIG. 19B, first protruding part 132 may be formed on the distal end of first extension part 131 that extends from the inner surface of first major part 11 toward the central axis. Since the direction in which first protruding part 132 protrudes is parallel to the Y axis, first eye cup 14 is easily fitted.

However, with only first protruding part 132 illustrated in FIG. 19B, although the fitting of first eye cup 14 becomes easier, the possibility that first eye cup 14 will fall off increases. In view of this, as illustrated in FIG. 19C, first protruding part 132 may include first projecting part 133 that extends from the tip end of first protruding part 132 toward the inner surface of first major part 11. With this configuration, first eye cup 14 that can easily fall off in the Y axis direction in the structure illustrated in FIG. 19B is latched by first projecting part 133 in this variation, which inhibits first eye cup 14 from falling off.

Figure 20:
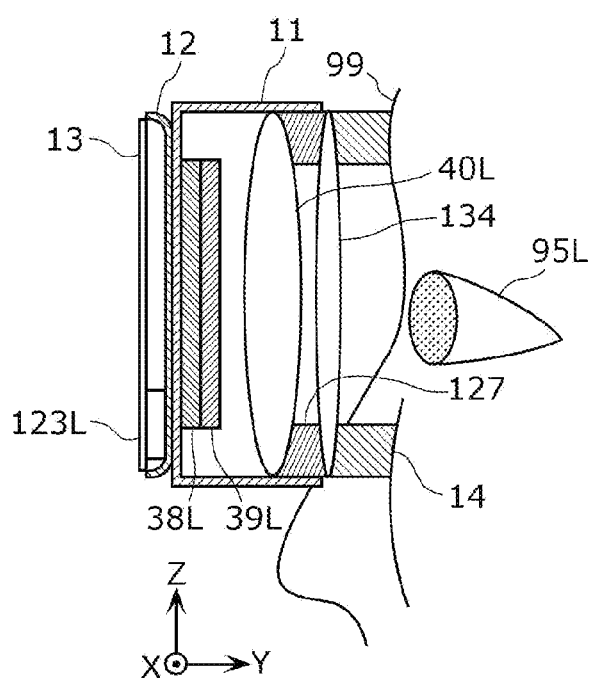
FIG. 20 is a second cross sectional diagram of the head-mounted display according to the embodiment when worn.

First correction lens 134 that adjusts the focal length of first convex lens 40L may be provided between first eye cup 14 and first convex lens 40L. FIG. 20 is a second cross sectional diagram of the head-mounted display according to the embodiment when worn.

As illustrated in FIG. 20, when implementing the configuration described above, first eye cup 14 is used to fix first correction lens 134 in place. More specifically, first support ring 127 is provided on first major part, at a location that is closer to the bottom of first major part 11 than first insertion part 14a is and closer to the opening of first major part 11 than first convex lens 40L is. First support ring 127 is fixed to the inner surface of first major part 11, and is not removable like first eye cup 14 is.

When first eye cup 14 is fitted as described above in a state in which first correction lens 134 is disposed closer to the opening than first support ring 127 is, first correction lens 134 is sandwiched by first support ring 127 and first insertion part 14a of first eye cup 14. This results in first correction lens 134 being attached inside of first lens tube 10.

First correction lens 134 can be detached from first major part 11 by detaching first eye cup 14. Accordingly, even when a single HMD 100 is used by both a user 99 that does not need first correction lens 134 and a user 99 that needs the first correction lens, first correction lens 134 can be selectively placed in or removed when exchanging or removing and cleaning first eye cup 14.

Figure 21:
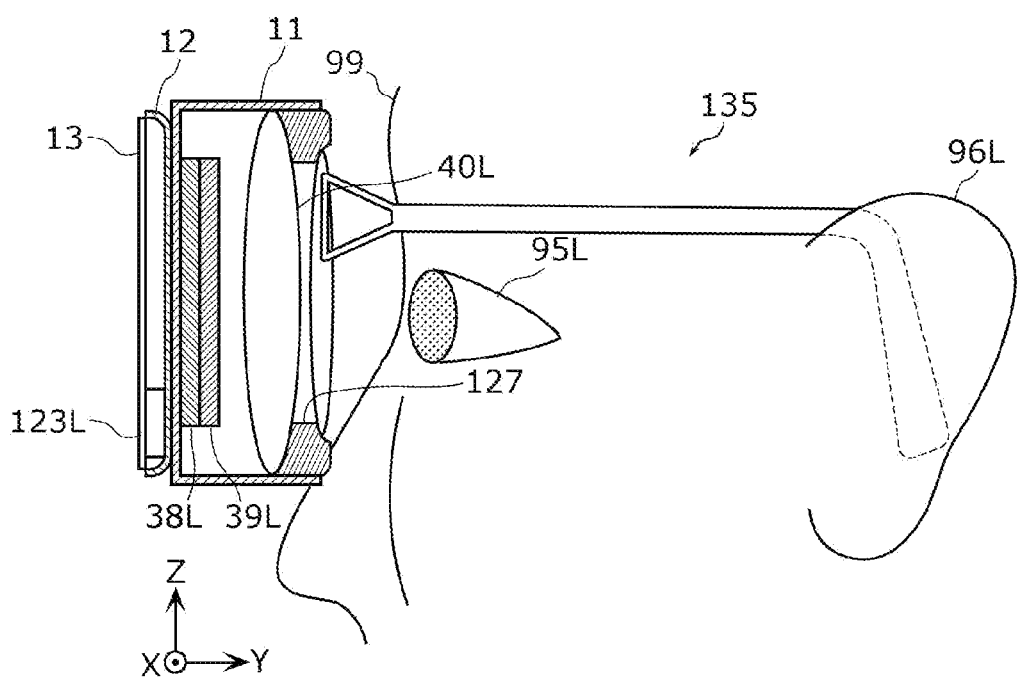
FIG. 21 is a third cross sectional diagram of the head-mounted display according to the embodiment when worn.

FIG. 21 is a third cross sectional diagram of the head-mounted display according to the embodiment when worn. As illustrated in FIG. 21, in a state in which first eye cup 14 is removed, HMD 100 can be worn while user 99 is wearing a corrective device such as glasses 135, on top of glasses 135 or the like. For example, glasses 135 are pressed against by first support ring 127 and a second support ring not illustrated in the figure and held so as not to contact first convex lens 40L and second convex lens 40R.

Figure 22:
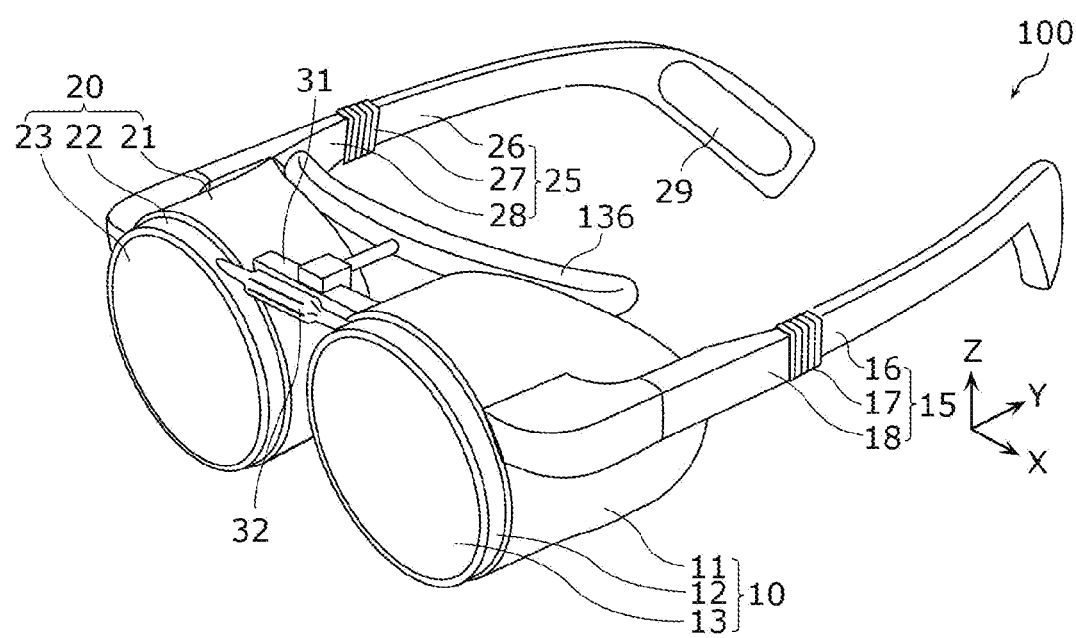
FIG. 22 is a perspective view illustrating the head-mounted display according to the embodiment fitted with a pad.

FIG. 22 is a perspective view illustrating the head-mounted display according to the embodiment fitted with a pad. As illustrated in FIG. 22, HMD 100 is provided with pad 136 when first eye cup 14 is removed from HMD 100 and HMD 100 is to be used by a user 99 who does not wear glasses 135 or the like. Pad 136 can be fitted to the top portion of HMD 100 in the height direction, and is interposed between HMD 100 and the brow of user 99. Pad 136 is made using, for example, the same silicon rubber that is used for first eye cup 14. FIG. 22 illustrates an example in which pad 136 is attached to connector bar 31.

Like first eye cup 14 and second eye cup 24, pad 136 also has the advantage of being able to keep HMD 100 sanitary, by inhibiting direct contact by being interposed between the brow of user 99 and first and second lens tubes 10 and 20.

However, unlike first eye cup 14 and the second eye cup, since pad 136 does not cover eyes 95 of user 99, it is difficult to block the peripheral vision of user 99. For example, when images captured by first camera 123L and second camera 123R are displayed using first display panel 39L and second display panel 39R, if first eye cups 14 are fitted, user 99 only takes in visual information corresponding to the angle of view of the camera. This is because the peripheral vision is blocked; stated differently, there are instances in which objects approaching user 99 from the side cannot be visually detected by user 99. For example, when fitted in instances like described above, pad 136 is favorable because the peripheral vision is not blocked.

Figure 23A:
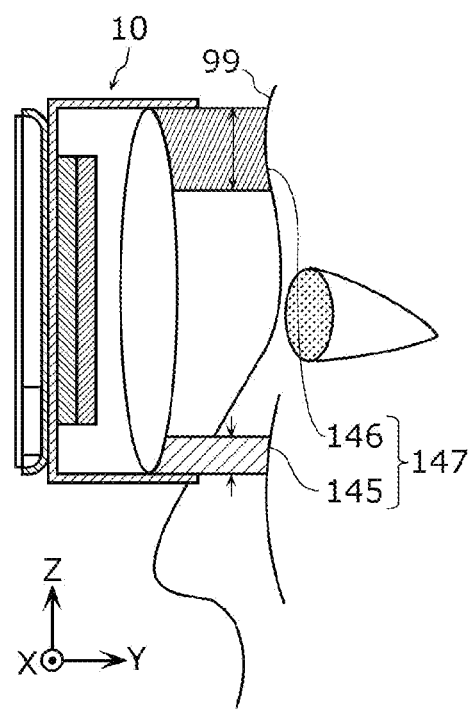
FIG. 23A is a fourth cross sectional diagram of the head-mounted display according to the embodiment when worn.
Figure 23B:
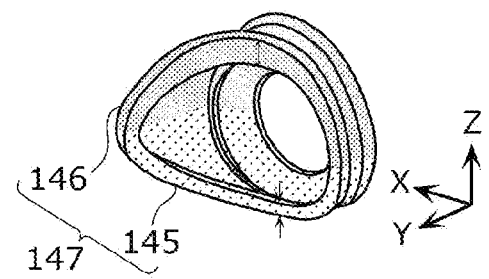
FIG. 23B is a second perspective view of the eye cup of the head-mounted display according to the embodiment.

The eye cup may have a dual structure in which the configuration of the top and the configuration of the bottom are different. FIG. 23A is a fourth cross sectional diagram of the head-mounted display according to the embodiment when worn. FIG. 23B is a second perspective view of the eye cup of the head-mounted display according to the embodiment.

As illustrated in FIG. 23A and FIG. 23B, first eye cup 147 that is fitted in place of first eye cup 14 is configured of first upper cup part 146 disposed on the top and first lower cup part 145 disposed on the bottom. As indicated by the arrows in the figures, first upper cup part 146 is thicker than first lower cup part 145. With this configuration, first upper cup part 146 has a larger surface area of contact with the head of user 99 than first lower cup part 145. Moreover, first upper cup part 146 is made using a harder material than first lower cup part 145. For example, the material used for first upper cup part 146 is silicon rubber. For example, the material used for first lower cup part 145 is a sponge-like resin material. However, the eye cup may be formed using a single material, and two different hardnesses may be achieved by altering the filling density of the material.

Using first eye cup 147 configured in this way makes it possible to focus the pressing force exerted onto the head of user 99 when HMD 100 is worn at first upper cup part 146. First upper cup part 146 corresponds to the brow of user 99 and the first lower cup part corresponds to the cheek of user 99. Impression or marks from wearing HMD 100 are more visible on the cheeks than on the brow. Pressure on the cheeks is uncomfortable to user 99, and furthermore, since the cheeks are relatively soft, it is difficult to stabilize HMD 100. First eye cup 147 can focus the pressure exerted when HMD 100 is worn at first upper cup part 146 to overcome these problems.

Close-contact Mechanism

Figure 24A:
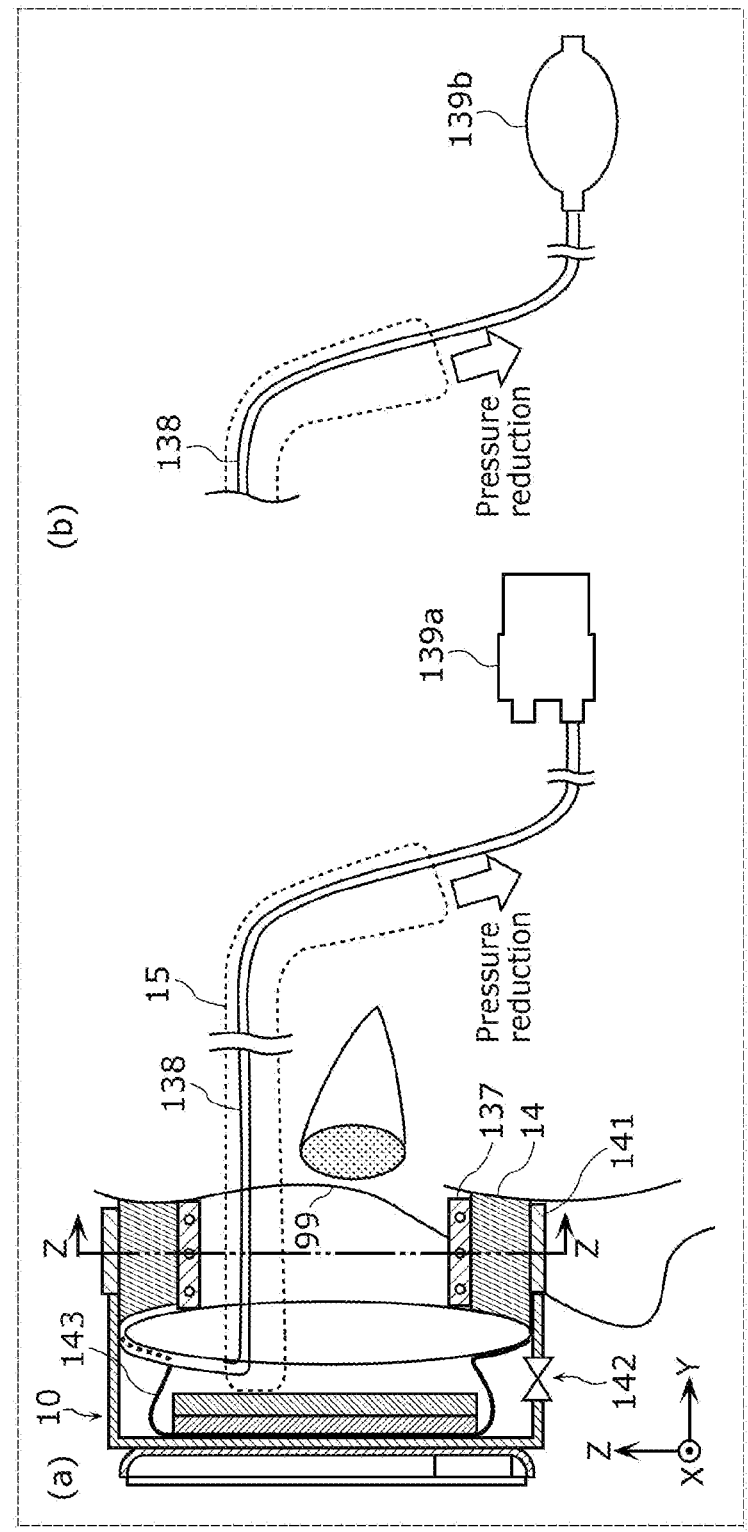
FIG. 24A is a fifth cross sectional diagram of the head-mounted display according to the embodiment when worn.
Figure 24B:
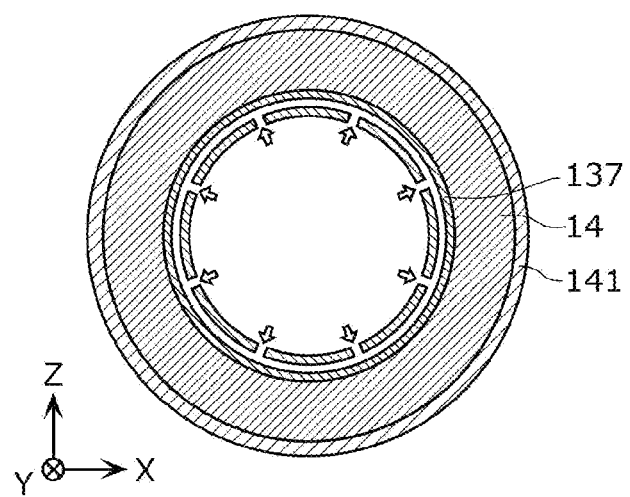
FIG. 24B is a cross sectional diagram of the eye cup taken along line Z-Z in FIG. 24A.

Next, a close-contact mechanism that improves the fit of HMD 100 using first eye cup 14 will be described. FIG. 24A is a fifth cross sectional diagram of the head-mounted display according to the embodiment when worn. FIG. 24B is a cross sectional diagram of the eye cup taken along line Z-Z in FIG. 24A.

HMD 100 according to this embodiment negatively pressurizes the space formed between first eye cup 14, first convex lens 40L, and eye 95L of user 99 to bring first lens tube 10 into close contact with the head of user 99 by suction. Accordingly, as illustrated in (a) in FIG. 24A, HMD 100 includes: pressure reduction port part 137 located inside the space; pressure reduction tube 138 that is, for example, located inside first arm part 15 and in fluid communication with pressure reduction port part 137; and electric pump 139a. As illustrated in (b) in FIG. 24A, hand pump 139b may be used instead of electric pump 139a to achieve an equivalent configuration.

When electric pump 139a is driven, air is pulled out through pressure reduction tube 138. As illustrated in FIG. 24B, pressure reduction port part 137 includes openings in fluid communication with the space formed between first eye cup 14, first convex lens 40L, and eye 95L of user 99. The air in the space is pulled out through the openings. This forms a negative pressure space, which suctions HMD 100 to the head of user 99.

First major part 11 is provided with pressure valve 142 to prevent excessive negative pressure. Pressure valve 142 allows HMD 100 to be suctioned at a suitable negative pressure, and forms a flow of air from pressure valve 142 to the negative pressure space, and from the negative pressure space to the electric pump.

Evaporated moisture from sweat from the head of user 99 begins to fill the space that is approximately air tight due to the suction of HMD 100. Since the moisture can fog first convex lens 40L, it is necessary to inhibit the moisture in order to display images properly. For example, the air flow described above exchanges out the air containing the evaporated moisture and reduces fogging.

Moreover, for example, HMD 100 includes cooling device 141 that cools the negative pressure air from outside first eye cup 14. For example, cooling device 141 is implemented using a Peltier device.

Moreover, for example, HMD 100 includes heating device 143 that heats first convex lens 40L. For example, heating device 143 is implemented using a heating pipe, and transfers heat generated by first display panel 39L and first drive circuit 38L and the like along the pipe to first convex lens 40L.

Figure 25A:
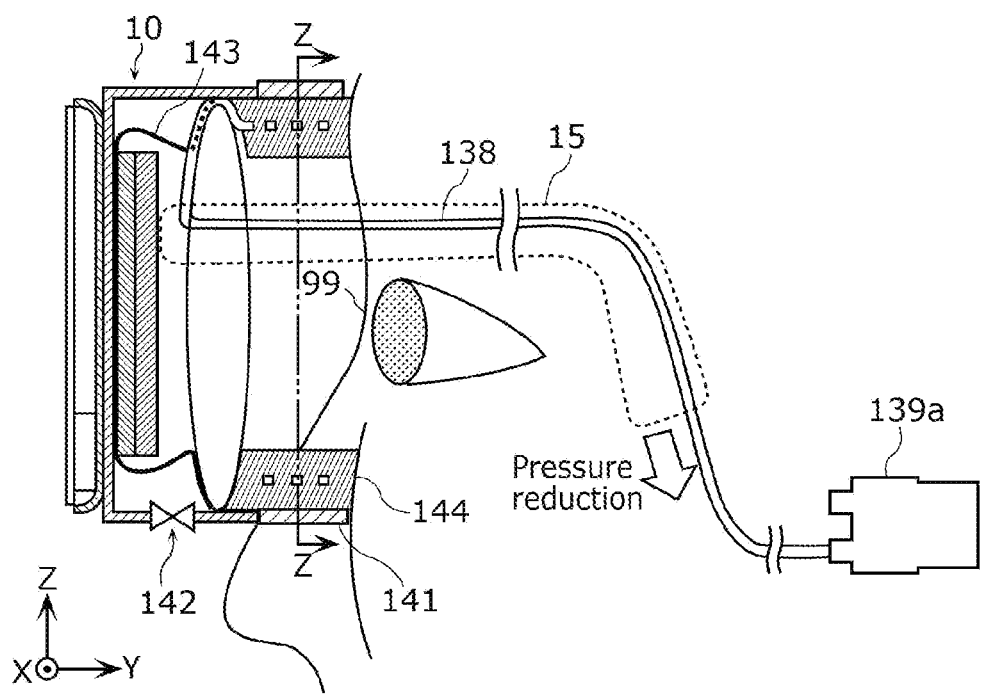
FIG. 25A is a sixth cross sectional diagram of the head-mounted display according to the embodiment when worn.
Figure 25B:
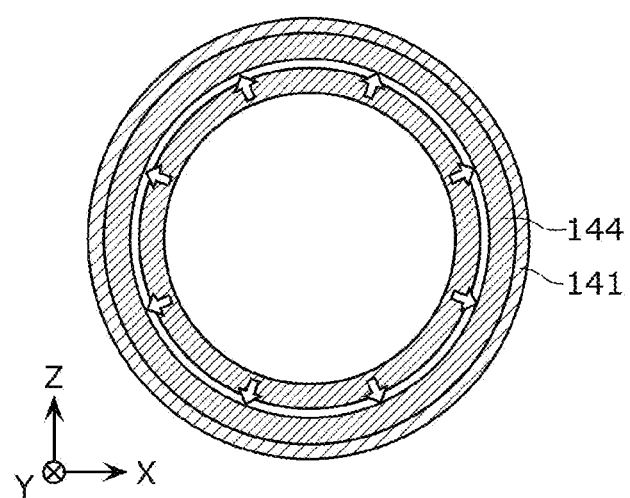
FIG. 25B is a cross sectional diagram of the eye cup taken along line Z-Z in FIG. 25A.

Moreover, if first eye cup 14 is made of a material that absorbs moisture, vaporized moisture in the air is absorbed by first eye cup 14. FIG. 25A is a sixth cross sectional diagram of the head-mounted display according to the embodiment when worn. FIG. 25B is a cross sectional diagram of the eye cup taken along line Z-Z in FIG. 25A.

First eye cup 144 illustrated in FIG. 25A and FIG. 25B is made of the same material as the above-described absorbent first eye cup 14, and thus absorbs vaporized moisture in the air. Unlike the configuration described with reference to FIG. 24A and FIG. 24B, pressure reduction tube 138 in this configuration is in fluid communication with first eye cup 144. A tube forming a loop along the tubular shape of first eye cup 144 is formed in first eye cup 144, and pressure reduction tube 138 pulls air from the entire circumference of first eye cup 144. Absorbed moisture can be pulled along with the air, whereby the absorbency of first eye cup 144 can be maintained for a long period of time.

Figure 26:
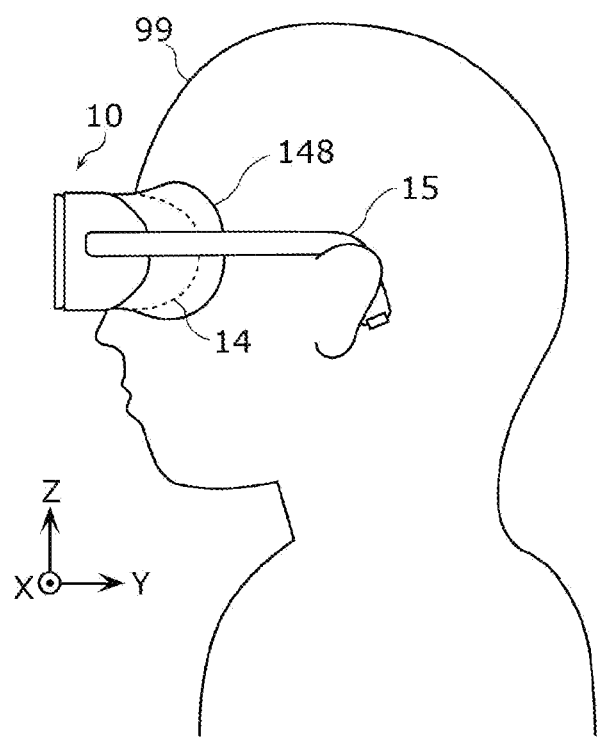
FIG. 26 is an external view illustrating the eye cup when the head-mounted display according to the embodiment is worn.

When HMD 100 is configured to be brought into close contact with user 99 by suction like in FIG. 24A through FIG. 25B, the suctioning effect can be further increased by increasing the surface area of contact between the eye cup and the head of user 99. FIG. 26 is an external view illustrating the eye cup when the head-mounted display according to the embodiment is worn.

As illustrated in FIG. 26, by using first eye cup 148 including a larger first cup part than the first cup part that is included in first eye cup 14, more of the head of user 99 can be covered, thereby increasing the surface area of contact between first eye cup 148 and the head of user 99.

Nose Piece Part

Figure 27A:
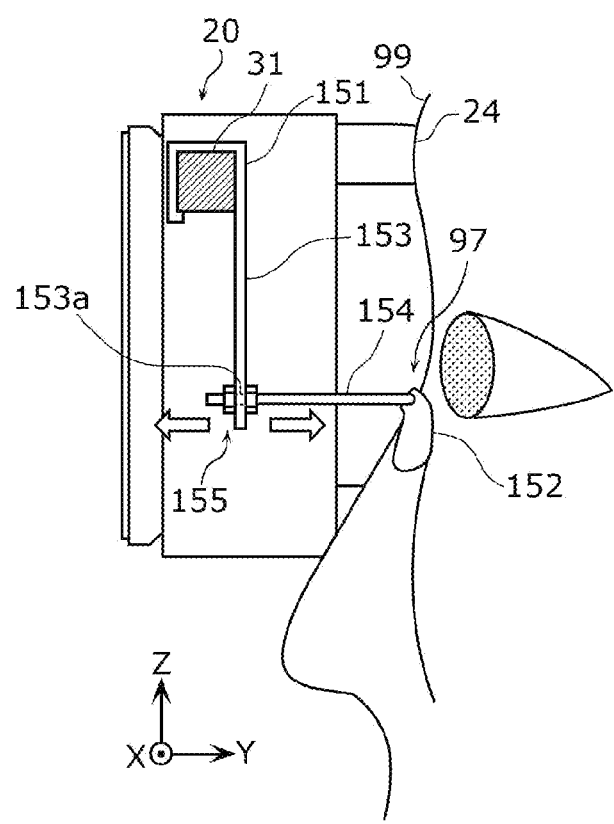
FIG. 27A is a first figure for illustrating a nose piece part in the head-mounted display according to the embodiment.
Figure 27B:
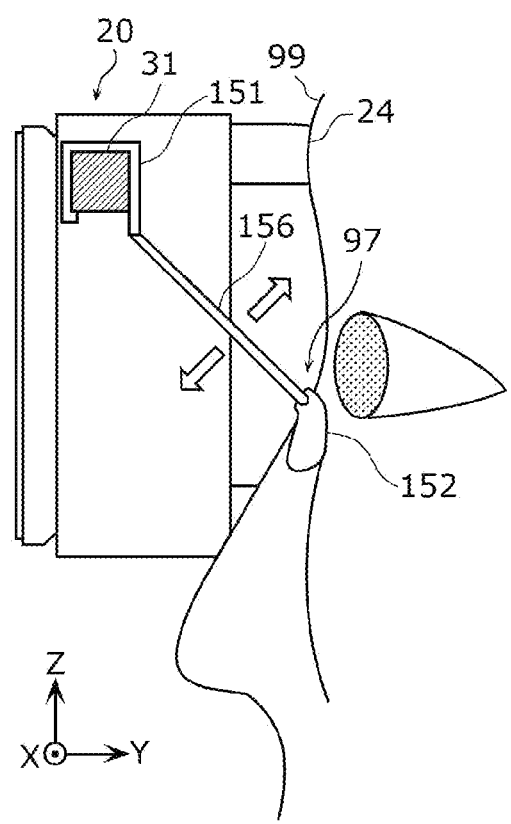
FIG. 27B is a second figure for illustrating the nose piece part in the head-mounted display according to the embodiment.
Figure 28:
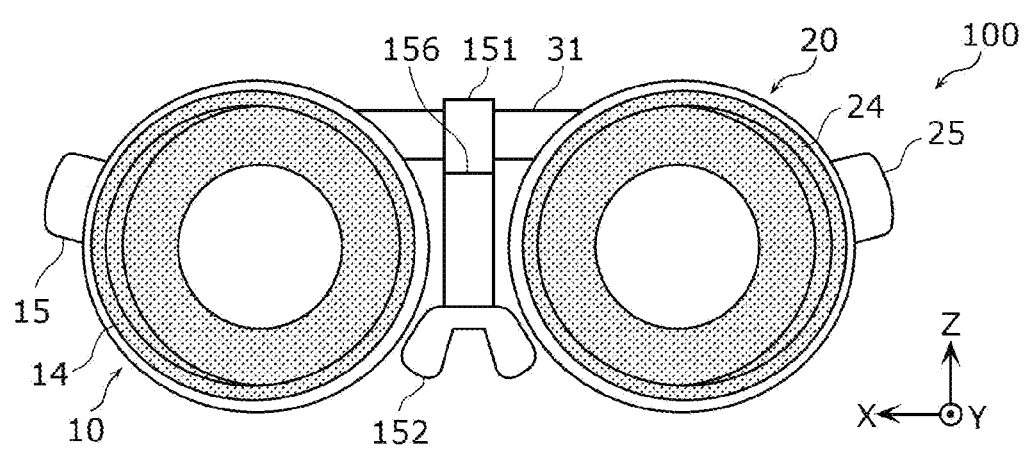
FIG. 28 is a third figure for illustrating the nose piece part in the head-mounted display according to the embodiment.

HMD 100 according to this embodiment includes a nose piece part that supports HMD 100 on the nasal root of user 99 to keep HMD 100 from slipping. FIG. 27A is a first figure for illustrating the nose piece part in the head-mounted display according to the embodiment. FIG. 27B is a second figure for illustrating the nose piece part in the head-mounted display according to the embodiment. FIG. 28 is a third figure for illustrating the nose piece part in the head-mounted display according to the embodiment.

As illustrated in FIG. 27A through FIG. 28, the nose piece part includes nose pad 152, mounting part 151, and a coupling part. Nose pad 152 is a component having a curved surface that contacts the nasal root of user 99, and reduces how heavy HMD 100 feels by dispersing the load of HMD 100 placed on the nasal root.

Mounting part 151 is a component that is mounted to an element located close the center of gravity of HMD 100 between first lens tube 10 and second lens tube 20, such as connector bar 31, adjustment mechanism 32, case 51, adjustment bar 61, expandable rod 83, and/or fixing panel 126. The shape of mounting part 151 is designed according to the shape of the element or elements to which it is to be attached.

The coupling part is a component that couples nose pad 152 and mounting part 151 at a given distance and a given angle that are defined by the position of the nasal root of user 99. For example, as illustrated in FIG. 27A, the coupling part includes: plate component 153 that is coupled to mounting part 151 and includes coupling hole 153a; rod component 154 that has a leading end coupled to nose pad 152 and is inserted through coupling hole 153a; and fixing component 155 that fixes the length of rod component 154 that is inserted into coupling hole 153a.

User 99 selects a plate component 153 in which coupling hole 153a is formed in an appropriate Z axis position, and fixes rod component 154 at an appropriate insertion length using fixing component 155 to adjust the position of nose pad 152 in a YZ plane.

Moreover, as illustrated in FIG. 27B and FIG. 28, the coupling part may be a plate-shaped deformable component 156 that is formed using a material capable of plastic deformation by an outside force. Examples of suitable materials for such a coupling part include a metal or composite metal such as iron, aluminum, tin, and stainless steel, as well as a resin capable of plastic deformation. Here, "deformation" excludes ruptures, breaks, and fractures and the like, and refers to a change in shape that allows for the positional relationship between mounting part 151 and nose pad 152 to be maintained even after deforming.

Arm Part

Next, the configuration of an arm part according to this embodiment will be described. First arm part 15 and second arm part 25 have the same basic configurations as described above, and are components whose ends in the Y axis positive direction engage on the ears of the user.

The arm part may be a component that is exchangeable for another arm part suitable for user 99 or suitable for the application of HMD 100. In other words, first arm part 15 and second arm part 25 are attachable and detachable, and are exchangeable by attaching or detaching another arm part. Although the attachment mechanism of first arm part 15 and second arm part 25 is not illustrated in the figures in particular, any sort of mechanism may be implemented, such as a mechanism where a part fits in a hole, engagement that takes into account direction of gravitational force, magnetic coupling, coupling via some other attachment component, etc. When connector 37 and internal wiring 41 described above provided in and/or on first arm part 15, when first lens tube 10 and first arm part 15 are connected, in the area of the connection, there are a plurality of points of connection so that internal wiring 41 and the wiring provided in first lens tube 10 are connected.

Figure 29:
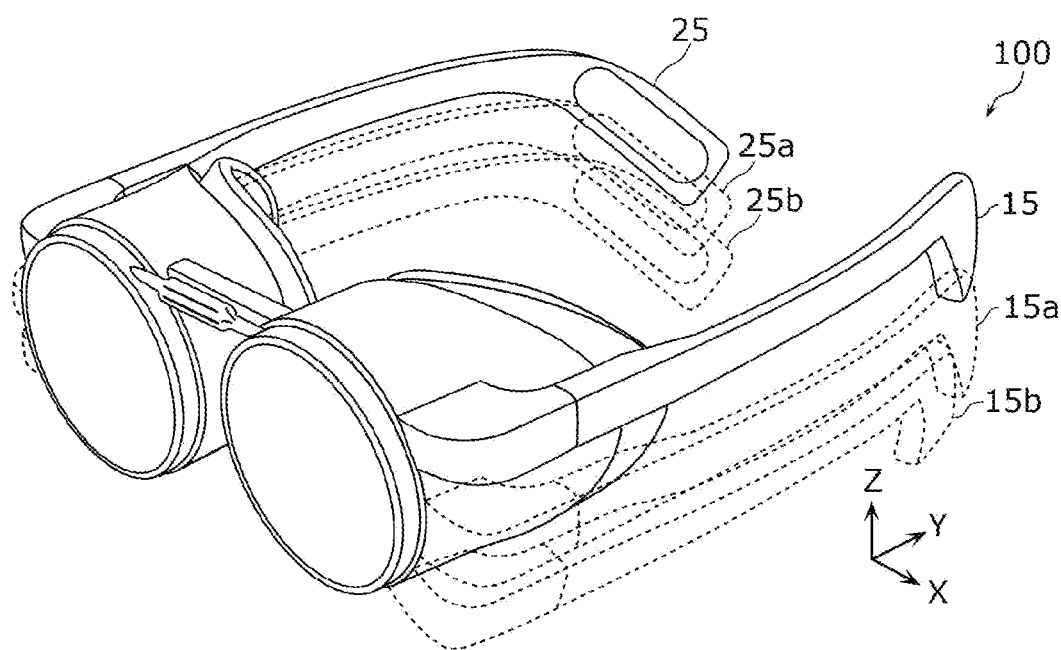
FIG. 29 is a first perspective view illustrating arm parts of the head-mounted display according to the embodiment.

FIG. 29 is a first perspective view illustrating the arm parts of the head-mounted display according to the embodiment. For example, as illustrated in FIG. 29, the Z axis positions of first lens tube 10 and second lens tube 20 relative to first arm part 15 and second arm part 25 may be adjustable via the positional relationship between the eyes and ears of user 99. FIG. 29 illustrates first arm part 15 and second arm part 25 which are in the standard positions, first arm part 15a and second arm part 25a which are connected below the standard positions, and first arm part 15b and second arm part 25b which are connected even further below.

Figure 30:
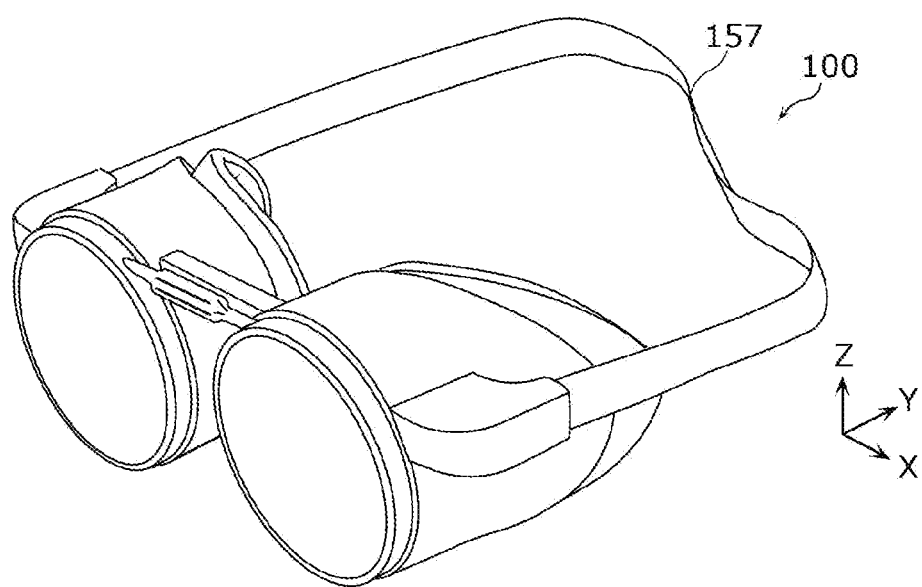
FIG. 30 is a perspective view illustrating an elastic band of the head-mounted display according to the embodiment.

FIG. 30 is a perspective view illustrating an elastic band of the head-mounted display according to the embodiment. For example, when there is a chance that HMD 100 may fall off user 99 with only the engagement of the arm parts on the ears alone, such as when HMD 100 is expected to be used in situations that involve intense movement, elastic band 157 may be fitted in place of the arm parts, as illustrated in FIG. 30.

Figure 31:
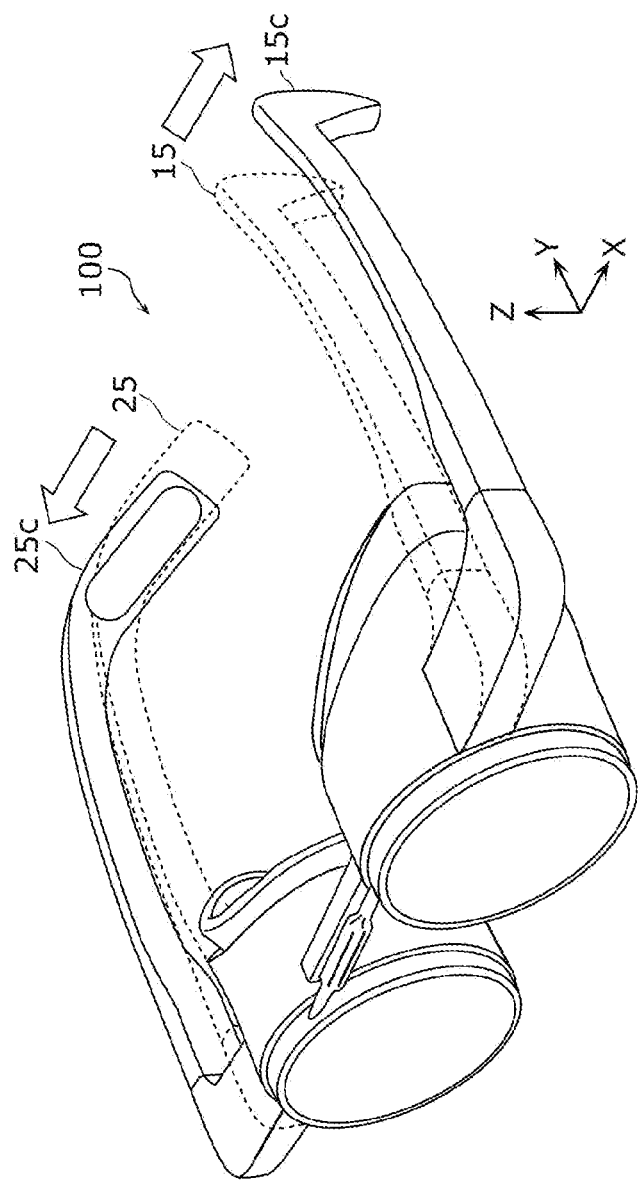
FIG. 31 is a second perspective view illustrating arm parts of the head-mounted display according to the embodiment.

FIG. 31 is a second perspective view illustrating the arm parts of the head-mounted display according to the embodiment. For example, when HMD 100 is used by a user 99 whose head is larger than first arm part 15 and second arm part 25 can accommodate, first arm part 15c and second arm part 25c that widen along the X axis may be fitted, as illustrated in FIG. 31.

Figure 32:
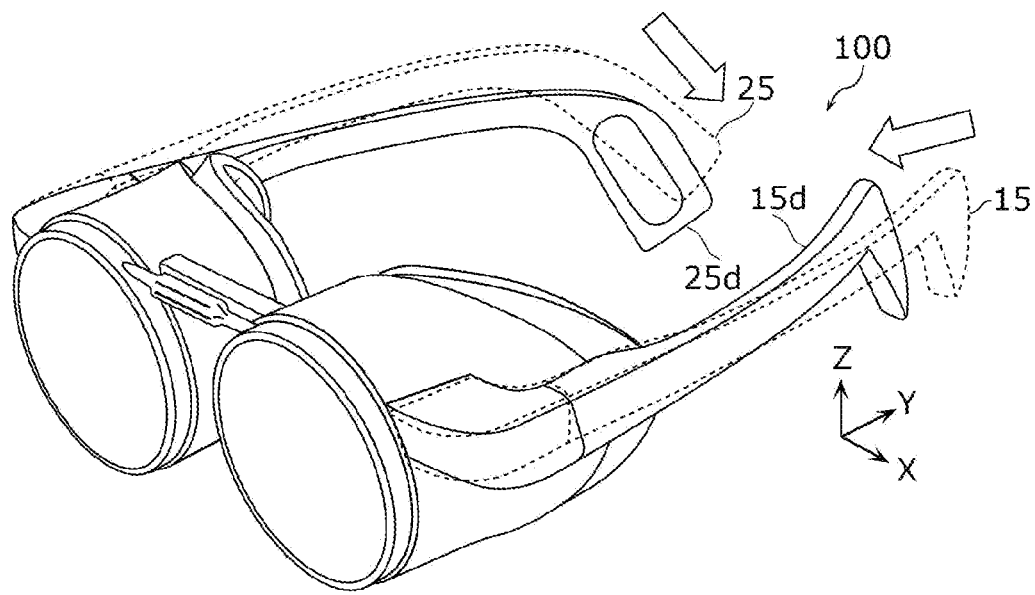
FIG. 32 is a third perspective view illustrating arm parts of the head-mounted display according to the embodiment.

FIG. 32 is a third perspective view illustrating the arm parts of the head-mounted display according to the embodiment. For example, converse to the configuration in FIG. 31, when HMD 100 is used by a user 99 whose head is smaller than first arm part 15 and second arm part 25 can accommodate, first arm part 15d and second arm part 25d that are more sharply curved may be fitted, as illustrated in FIG. 32.

Figure 33:
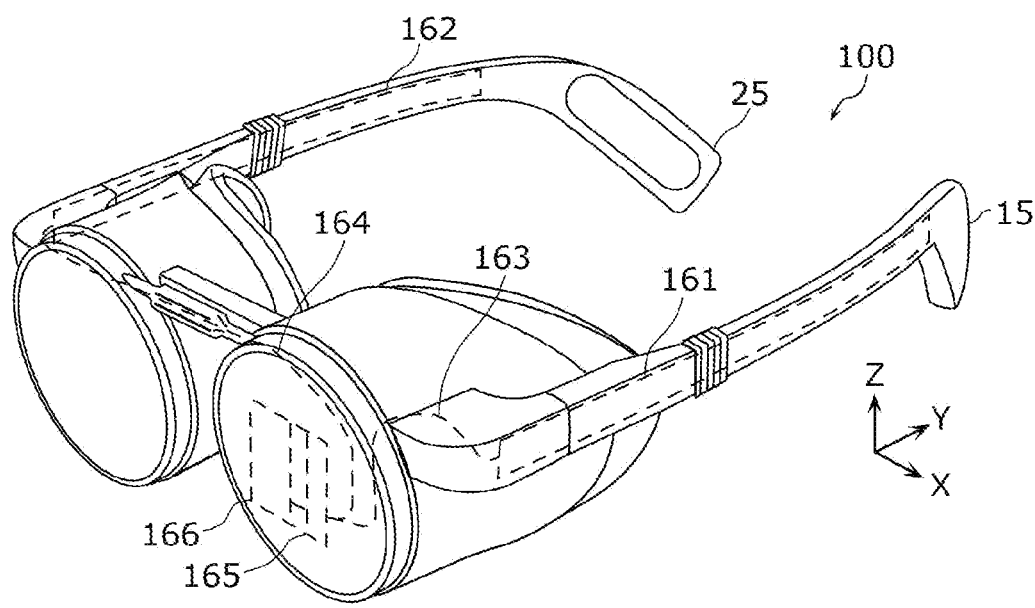
FIG. 33 is a perspective view illustrating a communication module in the head-mounted display according to the embodiment.

FIG. 33 is a perspective view illustrating a communication module in the head-mounted display according to the embodiment. As illustrated in FIG. 33, some elements of a communication module related to wireless communication performed by HMD 100 are provided in first arm part 15 and second arm part 25. Specifically, the communication module includes first antenna 161, second antenna 162, first wiring 163, second wiring 164, receiver 165, and signal processing processor 166. Among these elements, first antenna 161 is provided inside first arm part 15, and second antenna 162 is provided inside second arm part 25.

Providing the elongated first antenna 161 and second antenna 162 in the elongated first arm part 15 and second arm part 25 is both aesthetically pleasing and inhibits a reduction in the size of the elements. Radio waves detected by first antenna 161 are received by receiver 165 via first wiring 163, and converted into data by signal processing processor 166. Similarly, radio waves detected by second antenna 162 are received by receiver 165 via second wiring 164, and converted into data by signal processing processor 166. Note that the frequency of the signals received by first antenna 161 and second antenna 162 may be different. In other words, the length of first antenna 161 and the length of second antenna 162 may differ.

Figure 34:
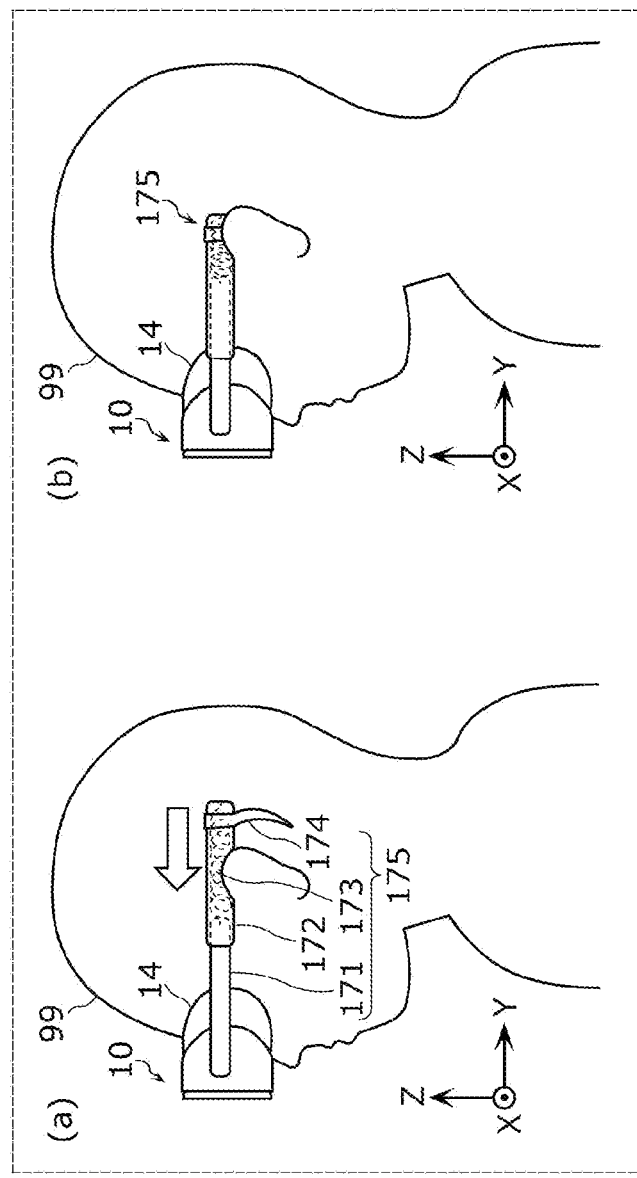
FIG. 34 is an external view of an arm part of the head-mounted display according to the embodiment when worn.

FIG. 34 is an external view of the arm part of the head-mounted display according to the embodiment when worn. As illustrated in FIG. 34, for example, arm part 175 may, in addition to function as an arm part, be connected to the head-mounted display to inhibit the head-mounted display from falling off. Arm part 175 includes front part 171, rear part 172, return spring 173, and ear hook 174. Front part 171 is formed so as to be able to slide into tubular rear part 172, and front part 171 and rear part 172 are pulled together by return spring 173. Ear hook 174 is provided on rear part 172. Front part 171 connected to first lens tube 10 simultaneously pulls rear part 172 forward and pulls ear hook 174 forward via return spring 173. Since this causes ear hook 174 to engage with the ear of user 99, HMD 100 can be stably worn via a suitable amount of bias. Note that arm part 175 configured in the same manner is also connected on the second lens tube side.

Figure 35:
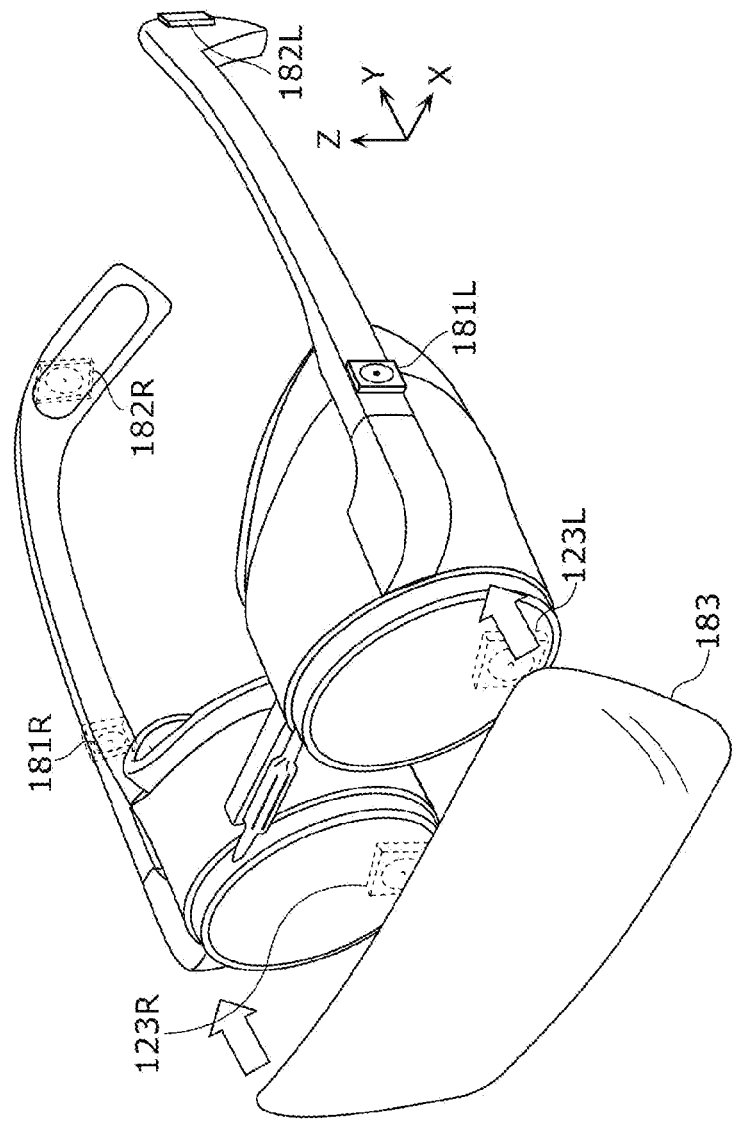
FIG. 35 is a perspective view illustrating a camera unit of the head-mounted display according to the embodiment.

FIG. 35 is a perspective view illustrating a camera unit of the head-mounted display according to the embodiment. As illustrated in FIG. 35, HMD 100 includes, in addition to first camera 123L and second camera 123R, first side camera 181L, second side camera 181R, first rear camera 182L, and second rear camera 182R.

For example, when using HMD 100 in the video see-through mode described above, images captured in lateral directions by first side camera 181L and second side camera 181R are displayed, and images captured in a rearward direction by first rear camera 182L and second rear camera 182R are displayed. Depending on the situation, as illustrated in the figure, shade 183 may be attached that, for example, blocks or attenuates part of the light incident on first camera 123L and second camera 123R.

Image Outputter

Images are viewed by user 99 as a result of HMD 100 according to this embodiment displaying the images using first display panel 39L and second display panel 39R HMD 100. The images are displayed by first display panel 39L and second display panel 39R after the angles and positions of the images, distortion caused by convex lenses 40, and zoom processing and the like are adjusted, corrected, and performed as described above by image outputter 38b.

Figure 36A:
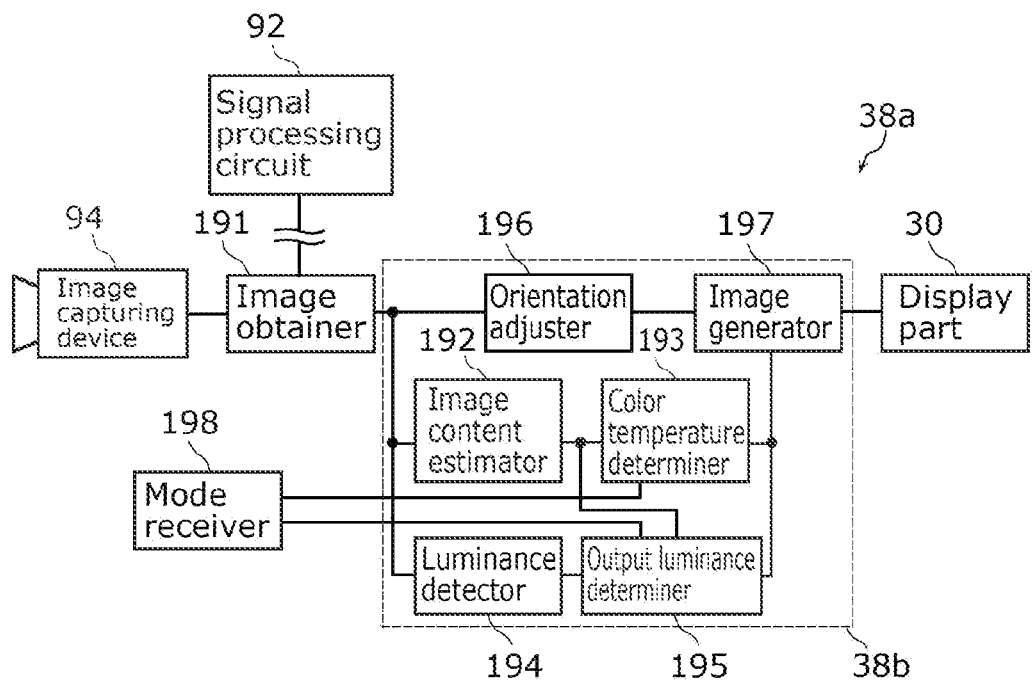
FIG. 36A is a block diagram of an image outputter and the like of the head-mounted display according to the embodiment.
Figure 36B:
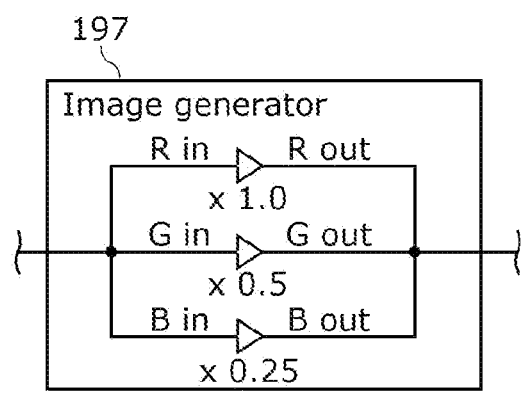
FIG. 36B illustrates an image generator included in the head-mounted display according to the embodiment in greater detail.

In addition to adjusting the orientations of images to suit HMD 100 configured in such a manner, image outputter 38b may correct the images in accordance with the visual capability of user 99 and the application of HMD 100. Hereinafter, correction of images by HMD 100 according to this embodiment will be described. FIG. 36A is a block diagram of an image outputter and the like of the head-mounted display according to the embodiment. FIG. 36B illustrates an image generator included in the head-mounted display according to the embodiment in greater detail.

As illustrated in FIG. 36A, processing unit 38a in HMD 100 includes image obtainer 191, image content estimator 192, color temperature determiner 193, luminance detector 194, output luminance determiner 195, orientation adjuster 196, image generator 197, and mode receiver 198. Each of these is implemented by a program for realizing the functions assigned to the functional blocks being executed by the processor and memory of processing unit 38a.

Image obtainer 191 is a functional block for obtaining images to be displayed on first display panel 39L and second display panel 39R. Image obtainer 191 obtains images from external signal processing circuit 92. Image obtainer 191 also obtains images from first camera 123L, second camera 123R, first side camera 181L, second side camera 181R, first rear camera 182L, second rear camera 182R, and image capturing device 94, which is an external camera or the like. Images obtained by image obtainer 191 are transmitted to orientation adjuster 196, image content estimator 192, and luminance detector 194.

As described above, orientation adjuster 196 is a functional block that performs processes such as the above-described adjustment of the angle and position of the images, correction of distortion caused by convex lenses 40, and the zoom processing. Orientation information for adjusting the orientation of the images is output as a result of the processing performed by orientation adjuster 196.

Image content estimator 192 is a functional block for estimating the content of obtained images. Estimating image content is, for example, estimating whether the subject of an image captured by image capturing device 94 is any one of candidates including a food, a person, a piece of art, scenery, etc. When the captured image is video such as moving images, estimating image content may be estimating the genre of the video, such as whether the video is a documentary, a drama, animation, news, sports, etc. Image content estimator 192 transmits content information indicating the image content to color temperature determiner 193 and output luminance determiner 195.

Luminance detector 194 is a functional block that detects the luminance of obtained images. The detection of luminance includes one or more of detection of the highest luminance value, detection of the lowest luminance value, detection of the average luminance value, and the detection of the median luminance value. The detected luminance is transmitted to output luminance determiner 195.

Color temperature determiner 193 is a functional block that determines the color temperature of the images to be displayed on first display panel 39L and the second display panel based on the content information received from image content estimator 192. For example, when the content information indicates food, i.e., that the user is eating food, the images are adjusted to a color temperature that makes the food appear more appetizing (for example, a color temperature corresponding to 6500K, which matches natural daylight). Color temperature determiner 193 determines the color temperature of the image to be displayed on first display panel 39L based on such processing.

Output luminance determiner 195 is a functional block that determines the luminance of the images to be displayed on first display panel 39L and the second display panel based on the content information received from the image content estimator 192 and the luminance detected by the luminance detector. For example, when the content information indicates food, i.e., that the user is eating food, output luminance determiner 195 sets the lowest detected luminance value to an output value of 0, and sets the highest detected luminance value to the maximum output value.

In this example, mode receiver 198 is a functional block that receives a change of the operation mode of HMD 100 by user 99 from, for example, an input terminal such as a smartphone, tablet, or personal computer (PC), or an operation panel (not illustrated in the drawings) provided on HMD 100. Mode information dependent on the operation mode of HMD 100 received by mode receiver 198 is input into color temperature determiner 193 and output luminance determiner 195.

Examples of HMD operation modes include, in addition to a night mode, a morning mode, a relax mode, etc., a cataracts mode and a color correction mode that are used when user 99 has cataracts or a color vision deficiency, which mitigate the symptoms.

In the morning mode, color temperature determiner 193 and output luminance determiner 195 perform correction that increases the color temperature and the luminance. In the night mode and the relax mode, color temperature determiner 193 and output luminance determiner 195 perform correction that decreases the color temperature and the luminance.

Figure 37:
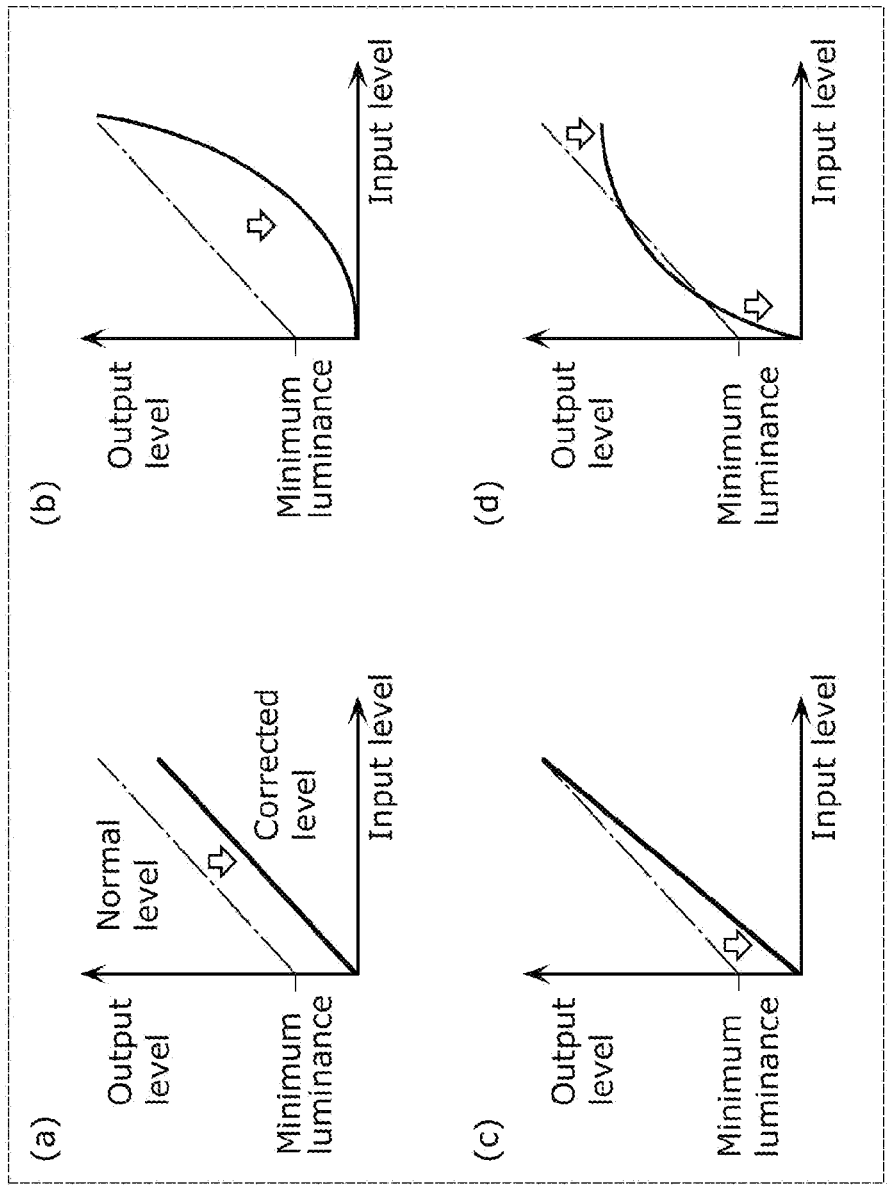
FIG. 37 is a first figure for illustrating processes performed by an image generator in the head-mounted display according to the embodiment.

In the cataracts mode, output luminance determiner 195 corrects the luminance so that the black colors appear blacker. FIG. 37 is a first figure for illustrating processes performed by the image generator of the head-mounted display according to the embodiment. FIG. 37 illustrates luminance levels of output light relative to the luminance levels of input light when the cataracts mode described above is used.

As illustrated in (a) in FIG. 37, compared to the normal input/output relationship indicated by the dotted and dashed line, correction is performed to make the black colors at the low level end appear blacker by reducing the level overall. As illustrated in (b) in FIG. 37, correction that incrementally makes the black colors closer to black by adjusting the gradation characteristic may be performed. As illustrated in (c) in FIG. 37, only the black colors may be corrected to be blacker, and the levels of white colors at the high level end may be maintained. As illustrated in (d) in FIG. 37, correction that maintains the average luminance level by blackening by suppressing the black and white colors and increasing the brightness of the levels between the black and white colors may be performed.

Figure 38:
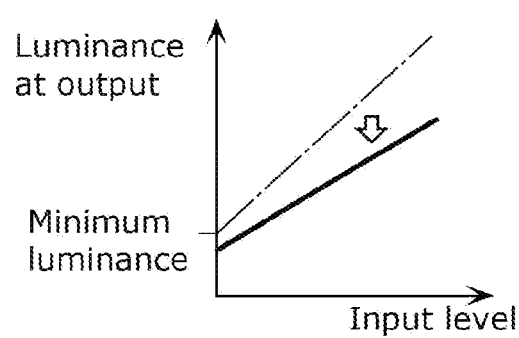
FIG. 38 is for illustrating display processing performed by the head-mounted display according to the embodiment.

Moreover, in the adjustment of the images, when display part 30 is configured to include a backlight for, for example, a liquid crystal panel, the luminance of the backlight may be adjusted. FIG. 38 is for illustrating display processing performed by the head-mounted display according to the embodiment. FIG. 38 illustrates the relationship between backlight luminance relative to input level. The black colors may be adjusted to appear blacker when displayed by dimming the backlight.

Figure 39A:
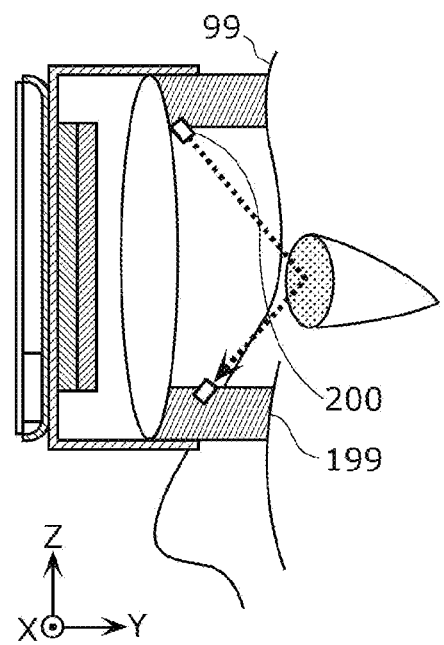
FIG. 39A is for illustrating detection of a point of gaze in the head-mounted display according to the embodiment.
Figure 39B:
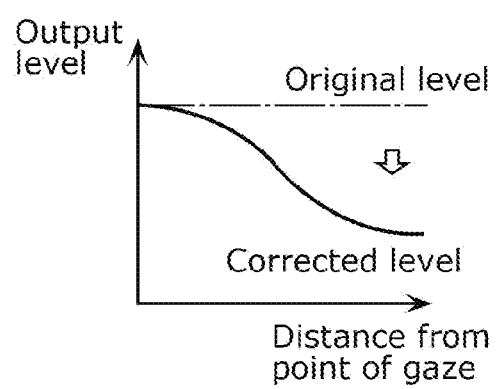
FIG. 39B is a second figure for illustrating processes performed by the image generator in the head-mounted display according to the embodiment.

When this sort of adjustment is performed across the entire display panel 39, user 99 may find that the images appear unnatural. Therefore, the correction may be bypassed at the point of gaze of user 99 and the correction may increase in strength with increasing distance from the point of gaze. FIG. 39A is for illustrating detection of a point of gaze in the head-mounted display according to the embodiment. FIG. 39B is a second figure for illustrating processes performed by the image generator of the head-mounted display according to the embodiment.

As illustrated in FIG. 39A, HMD 100 includes light source 200 and photoreceptor 199 for detecting the point of gaze of user 99. With this, the correction of the level is performed incrementally in accordance with distance from the point of gaze, as illustrated in FIG. 39B.

Returning to FIG. 36A, in the color correction mode, images having colors that appear more natural to user 99 can be displayed by suppressing colors other than those that are difficult for user 99 to see. In the color correction mode, when the crystalline lenses of the eyes of user 99 have changed to a yellow color causing user 99 to view everything with a yellow tint, images having colors that appear more natural to allow user 99 can be displayed by suppressing yellow colors.

Figure 40:
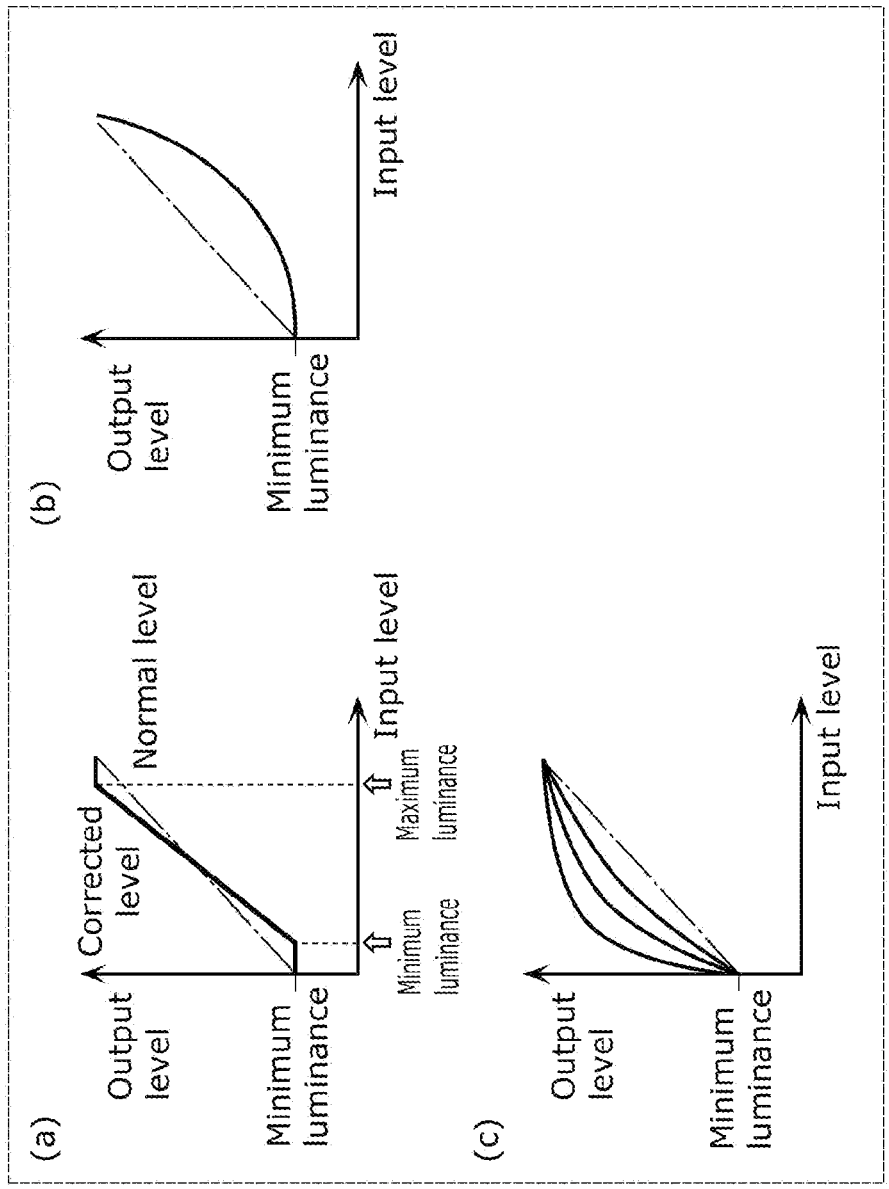
FIG. 40 is a third figure for illustrating processes performed by the image generator in the head-mounted display according to the embodiment.

FIG. 40 is a third figure for illustrating processes performed by the image generator of the head-mounted display according to the embodiment. FIG. 40 illustrates luminance levels of output light relative to luminance levels of input light, just like FIG. 37. For example, when HMD 100 is used in an environment in which objects are difficult to see, such as in heavy fog, heavy rain, or at night, correction that improves visibility may be performed. As illustrated in (a) in FIG. 40, correction that increases contrast may be performed by defining maximum and minimum luminances for the input level, and outputting values outside of the range defined thereby at a constant level.

When reducing the overall luminance, such as in the night mode, correction that incrementally reduces intermediate values without changing the maximum and minimum luminance values may be performed, as illustrated in (b) in FIG. 40.

As illustrated in (c) in FIG. 40, depending on the detected average luminance, the output level may be corrected so as to match the average luminance of the equivalent level.

Referring back to FIG. 36A, image generator 197 displays an image on display part 30 that satisfies the orientation, color temperature, and luminance determined as described above. As illustrated in FIG. 36B, image generator 197, for example, obtains an image whose orientation has been adjusted, and in order to adjust the color temperature and luminance, performs gain adjustment by multiplying correction values for the red, blue, and green values. An image generated in this manner is output to drive circuit 38, whereby an appropriate image is displayed on display panel 39 by the drive circuit.

Advantageous Effects, etc.

As described above, HMD 100 according to this embodiment includes: a closed-bottom first lens tube 10 including a first display panel 39L on the closed bottom for displaying first image 101L; a closed-bottom second lens tube 20 including second display panel 39R on the closed bottom for displaying second image 101R; a fourth adjustment mechanism including first rod 71 that extends from first lens tube 10 and second rod 72 that extends from second lens tube 20 and is rotatably connected relative to first rod 71; and an image angle maintainer that, in accordance with an angle of rotation of first rod 71 and second rod 72 of the fourth adjustment mechanism, rotates first display panel 39L relative to first lens tube 10 and rotates second display panel 39R relative to second lens tube 20 to bring horizontal directions of first display panel 39L and second display panel 39R closer to the arrangement direction of first lens tube 10 and second lens tube 20.

With this configuration, when second rod 72 is rotated relative to first rod 71, the orientation of the displayed image can be maintained by rotating first display panel 39L and second display panel 39R. Accordingly, HMD 100c can properly display images.

Moreover, for example, HMD 100 according to this embodiment may include a closed-bottomed first lens tube 10 including first display panel 39L on the closed bottom for displaying first image 101L; a closed-bottomed second lens tube 20 including second display panel 39R on the closed bottom for displaying second image 101R; and a first adjustment mechanism that couples first lens tube 10 and second lens tube 20 and is capable of adjusting the distance between first lens tube 10 and second lens tube 20. The first adjustment mechanism may include an operable part that adjusts the distance between first lens tube 10 and second lens tube 20.

With this configuration, since the distance between first lens tube 10 and second lens tube 20 is adjustable via the adjustment mechanism, even through first lens tube 10 and second lens tube 20 are provided as two lens tubes, it is possible to display images in an orientation that suits user 99. Accordingly, HMD 100 can properly display images.

Moreover, for example, the adjustment mechanism may include: screw hole 35 or 36 formed in one of first lens tube 10 and second lens tube 20; and as the operable part, adjustment screw 32 having one end on which screw part 33 or 34 that screws into screw hole 35 or 36 is formed and another end that is connected to the other of first lens tube 10 and second lens tube 20, and the adjustment mechanism may adjust the distance between first lens tube 10 and second lens tube 20 by adjustment of a depth that screw part 33 or 34 is screwed into screw hole 35 or 36.

With this configuration, the distance between first lens tube 10 and second lens tube 20 is adjustable by simply rotating adjustment screw 32 owing to the relationship between the screw and the screw ridges. Accordingly, HMD 100 can easily properly display images.

Moreover, for example, the first adjustment mechanism may include: first screw hole 36 formed in first lens tube 10; second screw hole 35 formed in second lens tube 20; and, as the operable part, adjustment screw 32 including, on respective ends, first screw part 34 that screws into first screw hole 36 and second screw part 33 that screws into second screw hole 35. Adjustment screw 32 may be connected to first lens tube 10 and second lens tube 20 via the respective ends. The first adjustment mechanism may adjust the distance between first lens tube 10 and second lens tube 20 by adjustment of a depth that first screw part 34 is screwed into first screw hole 36 and a depth that second screw part 33 is screwed into second screw hole 35.

With this configuration, the distance between first lens tube 10 and second lens tube 20 is adjustable by simply rotating adjustment screw 32 owing to the relationship between the screw and the screw ridges. It is possible to quickly adjust the distance between first lens tube 10 and second lens tube 20, owing to the adjustment of the depth that first screw part 34 is screwed into first screw hole 36 and the adjustment of the depth that second screw part 33 is screwed into second screw hole 35. Accordingly, HMD 100 can easily properly display images.

Moreover, for example, second screw hole 35 may include a helical structure wound in an opposite direction than the helical structure of first screw hole 36.

With this configuration, the depth that first screw part 34 is screwed into first screw hole 36 and the depth that second screw part 33 is screwed into second screw hole 35 can be adjusted simultaneously, simply by rotating adjustment screw 32 in one direction, owing to the relationship between the screw and the screw ridges. Accordingly, HMD 100 can easily properly display images.

Moreover, for example, the outer diameter of the center of adjustment screw 32 may be larger than the outer diameter of at least one of ends of adjustment screw 32.

This configuration improves the operability of adjustment screw 32 when adjusting the distance between first lens tube 10 and second lens tube 20. Accordingly, HMD 100 can easily properly display images.

Moreover, for example, the second adjustment mechanism may include: elongated first and second racks 54 and 55 each having an end connected to a respective one of first lens tube 10 and second lens tube 20 and respectively including teeth 54a and 55a; pinion gear 53 including outer teeth 53a that engage with teeth 54a and 55a; and case 51 that slidably holds first rack 54 and second rack 55 rotatably holds pinion gear 53 in an orientation that allows outer teeth 53a to engage with teeth 54a and 55a.

With this configuration, the distance between first lens tube 10 and second lens tube 20 is adjustable by simply rotating pinion gear 53. Accordingly, HMD 100a can easily properly display images.

Moreover, for example, the third adjustment mechanism may include: adjustment hole 63L or 63R formed in the side surface of at least one of first lens tube 10 or second lens tube 20; adjustment bar 61 connected to the other of first lens tube 10 and second lens tube 20 and having one end connected via insertion into adjustment hole 63L or 63R; and first lock bar 62L or second lock bar 62R that fixes adjustment bar 61 and adjustment hole 63L or 63R. The distance between first lens tube 10 and second lens tube 20 may be adjusted by changing the relative positions of adjustment hole 63L or 63R and adjustment bar 61 by unlocking first lock bar 62L or second lock bar 62R.

With this configuration, it is possible to adjust the distance between first lens tube 10 and second lens tube 20 simply by adjusting the depth of insertion of adjustment bar 61 into adjustment hole 63L or 63R. Accordingly, HMD 100b can easily properly display images.

Moreover, for example, the fourth adjustment mechanism may include first rod 71 that has one end connected to first lens tube 10 and another other end that extends in a direction away from first lens tube 10; second rod 72 that has one end connected to second lens tube 20 and another end that extends in a direction away from second lens tube 20; and rotation shaft part 73 that rotatably connects first rod 71 and second rod 72.

With this configuration, the distance between first lens tube 10 and second lens tube 20 is adjustable by simply second rod 72 relative to first rod 71. Accordingly, HMD 100c can easily properly display images.

Moreover, for example, HMD 100 may further include a connection part including a connection hole formed in the side surface of at least one of first lens tube 10 or second lens tube 20 and bar-shaped connector bar 31 having a smaller outer diameter than the inner diameter of the connection hole, and first lens tube 10 and second lens tube 20 may be connected via the connection part.

With this configuration, it is possible for adjustment screw 32 and the connection part to keep the central axis of first lens tube 10 and the central axis of second lens tube 20 parallel to one another. The central axes will not twist even if the distance between first lens tube 10 and second lens tube 20 is adjusted. Accordingly, HMD 100 can easily properly display images.

Moreover, for example, HMD 100 may further include a nose piece part that contacts nasal root 97 of user 99 wearing HMD 100. The nose piece part may include nose pad 152 that contacts nasal root 97 of user 99, mounting part 151 mounted to at least one of adjustment screw 32 or the connection part, and a coupling part that couples nose pad 152 and mounting part 151 at a given distance and a given angle. The coupling part may be made using a material capable of deformation by an outside force.

With this configuration, it is possible to support HMD 100 with nasal root 97 as well, thereby further stabilizing the orientation of HMD 100. Accordingly, wobbling of HMD 100 can be inhibited, and HMD 100 can properly display images.

Moreover, for example, HMD 100 may further include a nose piece part that contacts nasal root 97 of user 99 wearing HMD 100. The nose piece part may include nose pad 152 that contacts nasal root 97 of user 99, mounting part 151 mounted to at least one of adjustment screw 32 and the connection part, and a coupling part that couples nose pad 152 and mounting part 151 at a given distance and a given angle. The coupling part may include plate component 153 that is coupled to mounting part 151 and includes coupling hole 153*a*, rod component 154 that has a leading end coupled to nose pad 152 and is inserted through coupling hole 153*a*; and fixing component 155 that fixes the length of rod component 154 that is inserted into coupling hole 153*a*.

With this configuration, it is possible to support HMD 100 with nasal root 97 as well, thereby further stabilizing the orientation of HMD 100. Accordingly, wobbling of HMD 100 can be inhibited, and HMD 100 can properly display images.

Moreover, for example, HMD 100 may further include first arm part 15 and second arm part 25 each having one end that is connected to a respective one of first lens tube 10 and second lens tube 20 and the other end that extends to engage on the top of an ear of user 99.

With this configuration, user 99 can wear HMD 100 by engaging first arm part 15 and second arm part 25 on their ears. This improves the ease of use of HMD 100.

Moreover, for example, each of first arm part 15 and second arm part 25 may be detachable at the one end that is connected to first lens tube 10 or second lens tube 20.

With this configuration, first arm part 15 and second arm part 25 can be detached. For example, when different shaped arm parts are available, it is possible to exchange out the arm parts depending on application, for example. This broadens the applications that HMD 100 can be used in.

Moreover, for example, each of first arm part 15 and second arm part 25 may be curved inward at the other end opposite the one end that is connected to first lens tube 10 or second lens tube 20.

With this configuration, since the head of user 99 is held by first arm part 15 and second arm part 25 by compression, and first lens tube 10 and second lens tube 20 are pulled from the back of the head, the orientation of HMD 100 is more stable. Accordingly, wobbling of HMD 100 can be inhibited, and HMD 100 can properly display images.

Moreover, for example, at least one of first arm part 15 or second arm part 25 may include connector 37 to which cable 94 for at least one of communication or charging is connected. Connector 37 may be provided behind an ear of user 99 when HMD 100 is worn.

With this configuration, cable 94 is less likely to enter the field of view of user 99, reducing annoyance when using HMD 100. Moreover, since the weight of cable 94 places the center of gravity of HMD 100 further back, the positions of first lens tube 10 and second lens tube 20 are stable. Accordingly, wobbling of HMD 100 can be inhibited, and HMD 100 can properly display images.

Moreover, for example, HMD 100 may further include image outputter 38*b* that adjusts display positions of images to be displayed on first display panel 39L and second display panel 39R. Image outputter 38*b* may adjust the position of the image to be displayed on second display panel 39R so as to be symmetrical about the height direction and antisymmetrical about the arrangement direction relative to the center of second display panel 39R, in accordance with the position of the image to be displayed on first display panel 39L relative to the center of first display panel 39L.

With this configuration, it is possible to adjust the display positions of images based on the positions of both eyes of user 99. Accordingly, HMD 100 can properly display images.

Moreover, for example, image outputter 38*b* may perform distortion correction processing of correcting the lens distortion of first convex lens 40L according to the position of the image to be displayed on first display panel 39L relative to the center of first display panel 39L and correcting the lens distortion of second convex lens 40R according to the position of the image to be displayed on second display panel 39R relative to the center of second display panel 39R.

This configuration allows HMD 100 to properly display images regardless of lens distortion.

Moreover, for example, focal correction corresponding to the eyesight of user 99 may be performed by adjusting the distance between first convex lens 40L and first display panel 39L and adjusting the distance between second convex lens 40R and second display panel 39R, and image outputter 38*b* may perform zoom processing of changing the display size of the image to be displayed on first display panel 39L and the image to be displayed on second display panel 39R in accordance with the focal correction.

This configuration allows HMD 100 to properly display images regardless of changes in angle of view brought on by adjustments to optical systems.

Moreover, for example, HMD 100 may include: a closed-bottomed first lens tube 10 including first display panel 39L on the closed bottom for displaying first image 101L; a closed-bottomed second lens tube 20 including second display panel 39R on the closed bottom for displaying second image 101R; an adjustment mechanism including an operable part between first lens tube 10 and second lens tube 20 that adjusts a distance between first lens tube 10 and second lens tube 20; and first eye cup 14 and second eye cup 24 respectively provided for first lens tube 10 and second lens tube 20 that are tubular and detachably attached to the open end of first lens tube 10 and second lens tube 20. First eye cup 14 and second eye cup 24 may include: insertion part 14*a* and the like that is tubular and inserted inside first lens tube 10 or second lens tube 20; and cup part 14*b* and the like having a curved sheet shape that extends outside of first lens tube 10 or second lens tube 20.

With this configuration, first eye cup 14 and second eye cup 24 are interposed between the head of user 99 and first and second lens tubes 10 and 20, thereby keeping first lens tube 10 and second lens tube 20 sanitary. Since first eye cup 14 and second eye cup 24 can be detached, they can be replaced or cleaned, which allows for HMD 100 to be used cleanly over a long period of time. Accordingly, HMD 100 is difficult to become unsanitary, and thus suitable for use.

Moreover, for example, insertion part 14*a*, etc., includes recessed part 14*f*, etc., corresponding to protruding part 132, etc., formed on the inside of the tube, and cup part 14*b*, etc., may block external light by continuously covering the space between a contact end contoured to match the head of a person and a connection end that is connected to insertion part 14*a*, etc.

With this configuration, first eye cup 14 and second eye cup 24 can be easily connected and disconnected via engagement between a recessed and protruded structure. Accordingly, changing out first eye cup 14 and second eye cup 24 is less complex. Accordingly, HMD 100 can be kept sanitary easily, is difficult to become insanitary, and is suitable for use. Moreover, since the space between the head of user 99 and first lens tube 10 and second lens tube 20 is continuously covered, it is possible to maintain high light blocking characteristics. Accordingly, since the space inside HMD 100 can be darkened, the images can be displayed more clearly, and HMD 100 can properly display images.

Moreover, for example, protruding part 132, etc., may extend toward the open end of first lens tube 10 or second lens tube 20 from the end of extension part 131, etc., that extends from the inner wall surface on the inside of first lens tube 10 or second lens tube 20 toward the central axis of first lens tube 10 or second lens tube 20, and recessed part 14*f*, etc., may be inserted into protruding part 132, etc.

With this configuration, first eye cup 14 and second eye cup 24 can be easily connected and disconnected via engagement between a recessed and protruded structure. Accordingly, changing out first eye cup 14 and second eye cup 24 is less complex. Accordingly, HMD 100 can be kept sanitary easily, is difficult to become insanitary, and is suitable for use.

Moreover, for example, first protruding part 132 may further include first projecting part 133 that extends toward the inner surface of first lens tube 10 and is spaced a given distance from the inner surface of first lens tube 10, and the second protruding part may further include a second projecting part that extends toward the inner surface of second lens tube 20 and is spaced a given distance from the inner surface of second lens tube 20.

With this configuration, since projecting parts provide engagement, first eye cup 14 and second eye cup 24 can be inhibited from unintentionally falling off without affecting how easy it is to attach and remove first eye cup 14 and second eye cup 24. Accordingly, HMD 100 can be kept sanitary easily, is difficult to become insanitary, and is suitable for use.

Moreover, for example, first lens tube 10 may further include therein: first support ring 127 disposed closer to the bottom than first insertion part 14*a* is; and first correction lens 134 that is sandwiched by first insertion part 14*a* and first support ring 127 and adjusts the focal length of first convex lens 40L, and second lens tube 20 may further include therein: a second support ring disposed closer to the bottom than a second insertion part is; and second correction lens 134 that is sandwiched by the second insertion part and the second support ring and adjusts the focal length of second convex lens 40R.

With this configuration, it is possible to realize HMD 100 that is suitable for the eyesight of user 99 by using correction lenses 134. Moreover, since the correction lenses 134 can be exchanged by the exchanging of first eye cup 14 and second eye cup 24, it is possible to realize a single HMD 100 that is suitable for a plurality of users 99.

Moreover, for example, first eye cup 14 and second eye cup 24 may include: narrow part 14*c*, etc., that is disposed between insertion part 14*a*, etc., and cup part 14*b*, etc., and is formed around an entire circumference of an outer surface first eye cup 14 and second eye cup 24; and thick part 14*d*, etc., formed to fill in a space defined by narrow part 14*c*, etc., at an intersection of a line and narrow part 14*c*, etc., the line being parallel to the arrangement direction of first lens tube 10 and second lens tube 20 and passing through a center of narrow part 14*c*, etc., in a height direction perpendicular to the arrangement direction.

With this configuration, first narrow part 14*c*, the second narrow part, first thick part 14*d*, and the second thick part give first eye cup 14 and second eye cup 24 flexibility characterized in that the direction of deflection is controlled. Accordingly, the fit of HMD 100 is improved, and HMD 100 can properly display images.

Moreover, for example, first eye cup 14 may include, on the first cup part 14*b* end of first thick part 14*d*, first plate part 14*e* that expands horizontally relative to a plane intersecting the central axis of first lens tube 10, the outer circumference of first cup part 14*b* and the outer circumference of first plate part 14*e* may be connected, and second eye cup 24 may include, on a second cup part end of a second thick part, a second plate part that expands horizontally relative to a plane intersecting the central axis of second lens tube 20, and the outer circumference of the second cup part and the outer circumference of the second plate part may be connected.

With this configuration, first narrow part 14*c*, the second narrow part, first thick part 14*d*, the second thick part, first plate part 14*e*, and the second plate part give first eye cup 14 and second eye cup 24 flexibility characterized in that the direction of deflection is controlled. Accordingly, the fit of HMD 100 is improved, and HMD 100 can properly display images.

Moreover, for example, first thick part 14*d* may have a tapered shape that widens in diameter in a direction parallel to the central axis of first lens tube 10 and toward the bottom of first lens tube 10, and the second thick part may have a tapered shape that widens in diameter in a direction parallel to the central axis of second lens tube 20 and toward the bottom of second lens tube 20.

With this configuration, first narrow part 14*c*, the second narrow part, first thick part 14*d*, the second thick part, first plate part 14*e*, and the second plate part give first eye cup 14 and second eye cup 24 flexibility characterized in that the direction of deflection is controlled using the tip end of the taper as a fulcrum. Accordingly, the fit of HMD 100 is improved, and HMD 100 can properly display images.

Moreover, for example, the hardness of the top side of each of first eye cup 14 and second eye cup 24 in the height direction perpendicular to the arrangement plane including the central axis of first lens tube 10 and the central axis of second lens tube 20 may be harder than the hardness of the bottom side of each of first eye cup 14 and second eye cup 24 in the height direction.

With this configuration, first lens tube 10 and second lens tube 20 can be supported by the brow of user 99 mainly on the top side of each of first eye cup 14 and second eye cup 24. Accordingly, the fit of HMD 100 is improved, and HMD 100 can properly display images.

Moreover, for example, the material of the top sides of first eye cup 14 and second eye cup 24 in the height direction may be different than the material of the bottom sides of first eye cup 14 and second eye cup 24 in the height direction.

With this configuration, the difference in hardness is achieved via the difference in material, and first lens tube 10 and second lens tube 20 can be supported by the brow of user 99 mainly on the top side of each of first eye cup 14 and second eye cup 24. Accordingly, the fit of HMD 100 is improved, and HMD 100 can properly display images.

Moreover, for example, the surface area of contact of first eye cup 14 and second eye cup 24 with the head of user 99 may be larger on the top sides than on the bottom sides in the height direction perpendicular to the arrangement plane including the central axis of first lens tube 10 and the central axis of second lens tube 20.

With this configuration, first lens tube 10 and second lens tube 20 can be supported by the brow of user 99 mainly on the top side of each of first eye cup 14 and second eye cup 24. Accordingly, the fit of HMD 100 is improved, and HMD 100 can properly display images.

Moreover, for example, in a state in which first eye cup 14 and second eye cup 24 are removed, HMD 100 may further include pad 136 that is interposed between HMD 100 and the brow of user 99, is fittable to the top portion of HMD 100 in the height direction perpendicular to the arrangement plane including the central axis of first lens tube 10 and the central axis of second lens tube 20.

With this configuration, first lens tube 10 and second lens tube 20 can be supported by pad 136 instead of by first eye cup 14 and second eye cup 24.

Moreover, for example, the first eye cup and the second eye cup may be made using silicon rubber.

With this configuration, first eye cup 14 and second eye cup 24 made using silicon rubber can be interposed between the head of user 99 and first and second lens tubes 10 and 20, thereby making it possible to keep first lens tube 10 and second lens tube 20 sanitary.

Moreover, for example, the image angle maintainer may include: stator 111 that is provided on rotation shaft part 73 and does not rotate with first rod 71 and second rod 72; first rotor 112 that is coupled to first display panel 39L and rotates with first display panel 39L; first belt 114 that rotates first rotor 112 by half the amount of rotation of first rod 71 and second rod 72 relative to stator 111; second rotor 113 that is coupled to second display panel 39R and rotates with second display panel 39R; and second belt 115 that rotates second rotor 113 by half the amount of rotation of first rod 71 and second rod 72 relative to stator 111.

With this configuration, it is possible to maintain the orientation of the displayed image by rotating first display panel 39L and second display panel 39R via the rotation transferred by first belt 114 and second belt 115. Accordingly, HMD 100c can properly display images.

Moreover, for example, the image angle maintainer may include: fixed gear 84 that is provided on rotation shaft part 73 and does not rotate with first rod 71 and second rod 72; first rotary gear 85 that is coupled to first display panel 39L and rotates with first display panel 39L; and one or more first transfer gears 87 that rotate first rotary gear 85 by half the amount of rotation of first rod 71 and first rod 72 relative to fixed gear 84; second rotary gear 86 that is coupled to second display panel 39R and rotates with second display panel 39R; and one or more second transfer gears 88 that rotate second rotary gear 86 by half the amount of rotation of first rod 71 and second rod 72 relative to fixed gear 84.

With this configuration, it is possible to maintain the orientation of the displayed image by rotating first display panel 39L and second display panel 39R via the rotation transferred by the one or more first transfer gears 87 and the one or more second transfer gears 88. Accordingly, HMD 100c can properly display images.

Moreover, for example, the number of first transfer gears 87 and the number of second transfer gears 88 may be equal.

With this configuration, first transfer gear 87 and second transfer gear 88 may share the same basic design, making it easier to realize the above configuration. Accordingly, HMD 100c can properly display images.

Moreover, for example, HMD 100c that is worn on the head of user 99 may include: a closed-bottom first lens tube 10 including therein first display panel 39L for displaying an image corresponding to one eye of user 99 and first convex lens 40L that enlarges the image displayed on first display panel 39L; a closed-bottom second lens tube 20 including therein second display panel 39R for displaying an image corresponding to the other eye of user 99 and second convex lens 40R that enlarges the image displayed on second display panel 39R; and a fourth adjustment mechanism that is capable of adjusting the distance between first lens tube 10 and second lens tube 20. First display panel 39L may be provided so as to be rotatable around the central axis of first lens tube 10. Second display panel 39R may be provided so as to be rotatable around the central axis of second lens tube 20. The fourth adjustment mechanism may include: first rod 71 having one end that is connected to first lens tube 10 and another end that extends in a direction away from first lens tube 10; second rod 72 that has one end connected to second lens tube 20 and another end that extends in a direction away from second lens tube 20; rotation shaft part 73 that rotatably connects first rod 71 and second rod 72; and an image angle maintainer that, in accordance with the angle of rotation of first rod 71 and second rod 72, rotates first display panel 39L relative to first lens tube 10 and rotates second display panel 39R relative to second lens tube 20 in a direction opposite that of the direction of rotation of first display panel 39L. The image angle maintainer may include expandable rod 83 including inner tube 82 that is inserted in outer tube 81 and expands and collapses in an expansion direction in outer tube 81. Expandable rod 83 may connect first display panel 39L to the outer tube 81 side end so as to fix the angle of first display panel 39L relative to the expanding axis, and connect second display panel 39R to the inner tube 82 side end so as to fix the angle of second display panel 39R relative to the expanding axis.

With this configuration, expandable rod 83 can cancel the rotation of first display panel 39L and second display panel 39R that accompanies the rotational movement of other parts and thus maintain the orientation of images displayed on first display panel 39L and second display panel 39R. Accordingly, HMD 100c can properly display images.

Moreover, for example, HMD 100c may further include a nose piece part including nose pad 152 that contacts nasal root 97 of user 99 wearing HMD 100c, mounting part 151 mounted to expandable rod 83, and a coupling part that couples nose pad 152 and mounting part 151 at a given distance and a given angle. The coupling part may be made using a material capable of deformation by an outside force.

With this configuration, it is possible to support HMD 100c with nasal root 97 as well, thereby further stabilizing the orientation of HMD 100c. Accordingly, wobbling of HMD 100c can be inhibited, and HMD 100 can properly display images.

Moreover, for example, HMD 100c may further include a nose piece part including nose pad 152 that contacts nasal root 97 of user 99 wearing HMD 100c, mounting part 151 mounted to expandable rod 83, and a coupling part that couples nose pad 152 and mounting part 151 at a given distance and a given angle. The coupling part may include plate component 153 that is coupled to mounting part 151 and includes coupling hole 153a, rod component 154 that has a leading end coupled to nose pad 152 and is inserted through coupling hole 153a; and fixing component 155 that fixes the length of rod component 154 that is inserted into coupling hole 153a.

With this configuration, it is possible to support HMD 100c with nasal root 97 as well, thereby further stabilizing the orientation of HMD 100c. Accordingly, wobbling of HMD 100c can be inhibited, and HMD 100 can properly display images.

Moreover, for example, HMD 100 may further include image outputter 38b that adjusts display positions of images to be displayed on first display panel 39L and second display panel 39R. Image outputter 38b may adjust the position of the image to be displayed on second display panel 39R so as to be symmetrical about the height direction perpendicular to the arrangement direction of first lens tube 10 and second lens tube 20 and antisymmetrical about the arrangement direction relative to the center of second display panel 39R, in accordance with the position of the image to be displayed on first display panel 39L relative to the center of first display panel 39L.

With this configuration, it is possible to adjust the display positions of images based on the positions of both eyes of user 99. Accordingly, HMD 100c can properly display images.

Moreover, for example, image outputter 38b may perform distortion correction processing of correcting the lens distortion of first convex lens 40L according to the position of the image to be displayed on first display panel 39L relative to the center of first display panel 39L and correcting the lens distortion of second convex lens 40R according to the position of the image to be displayed on second display panel 39R relative to the center of second display panel 39R.

This configuration allows HMD 100c to properly display images regardless of lens distortion.

Moreover, for example, focal correction corresponding to the eyesight of user 99 may be performed by adjusting the distance between first convex lens 40L and first display panel 39L and adjusting the distance between second convex lens 40R and second display panel 39R, and image outputter 38b may perform zoom processing of changing the display size of the image to be displayed on first display panel 39L and the image to be displayed on second display panel 39R in accordance with the focal correction.

This configuration allows HMD 100c to properly display images regardless of changes in angle of view resulting from optical system adjustments.

Moreover, for example, HMD 100c may include: a closed-bottom first lens tube 10 including first display panel 39L on the closed bottom for displaying first image 101L; a closed-bottom second lens tube 20 including second display panel 39R on the closed bottom for displaying second image 101R; a fourth adjustment mechanism including first rod 71 that extends from first lens tube 10 and second rod 72 that extends from second lens tube 20 and is rotatably connected relative to first rod 10; and image outputter 38b that outputs first image 101L and second image 101R to first display panel 39L and second display panel 39R, respectively. Image outputter 38b may, in accordance with the angle of rotation of first rod 71 and second rod 72 included in the fourth adjustment mechanism, perform address conversion on and output first image 101L and second image 101R to bring the horizontal directions of first image 101L and second image 101R closer to the arrangement direction of first lens tube 10 and second lens tube 20.

With this configuration, when second rod 72 is rotated relative to first rod 71, the orientation of the images from the perspective of user 99 can be maintained by rotating the images displayed by first display panel 39L and second display panel 39R. Accordingly, HMD 100c can properly display images.

Moreover, for example, in accordance with the angle of rotation of first rod 71 and second rod 72, image outputter 38b may: (1) perform a first process of displaying, as first image 101L to be displayed on first display panel 39L, first rotated image 102L generated by changing the display angle of first image 101L; and (2) perform a second process of displaying, as second image 101R to be displayed on second display panel 39R, second rotated image 102R generated by changing the display angle of second image 101R.

With this configuration, when second rod 72 is rotated relative to first rod 71, first rotated image 102L and second rotated image 102R are generated by rotating the images displayed by first display panel 39L and second display panel 39R. The orientation of the images from the viewpoint of user 99 can be maintained by displaying first rotated image 102L and second rotated image 102R on first display panel 39L and second display panel 39R, respectively. Accordingly, HMD 100c can properly display images.

Moreover, for example, the fourth adjustment mechanism may include an angle detector that detects the angle of rotation of first rod 71 and second rod 72, and the image outputter may perform at least one of the first process and the second process based on the angle of rotation of first rod 71 and second rod 72 detected by the angle detector.

With this configuration, when second rod 72 is rotated relative to first rod 71, the orientation of the images from the perspective of user 99 can be maintained by rotating the images displayed by first display panel 39L and second display panel 39R in accordance with the detected angle of rotation. Accordingly, HMD 100c can properly display images.

Moreover, for example, the angle detector may detect the angle of rotation of first rod 71 and second rod 72 by estimating the angle of rotation based on a measured resistance value of resistance element 116 provided on the axis of rotation of first rod 71 and second rod 72. The resistance value of resistance element 116 changes in accordance with the angle of rotation of first rod 71 and second rod 72.

With this configuration, when second rod 72 is rotated relative to first rod 71, the angle of rotation can be detected using the resistance value measured in resistance element 116. With this configuration, the orientation of the images from the perspective of user 99 can be maintained by rotating the images displayed by first display panel 39L and second display panel 39R in accordance with the detected angle of rotation. Accordingly, HMD 100c can properly display images.

Moreover, for example, the angle detector may calculate first angle difference θ3 relative to a reference orientation in first gyrosensor 117 provided in or on first lens tube 10, calculate second angle difference 84 relative to a reference orientation in second gyrosensor 118 provided in or on second lens tube 20, and detect the sum of the absolute value of first angle difference θ3 and second angle difference θ4 as the angle of rotation of first rod 71 and second rod 72.

With this configuration, when second rod 72 is rotated relative to first rod 71, it is possible to detect the angle of rotation from angle differences 83 and 84 relative to a reference orientation calculated using first gyrosensor 117 and second gyrosensor 118. With this configuration, the orientation of the images from the perspective of user 99 can be maintained by rotating the images displayed by first display panel 39L and second display panel 39R in accordance with the detected angle of rotation. Accordingly, HMD 100c can properly display images.

Moreover, for example, at least one of first lens tube 10 and second lens tube 20 may further include measurement device 121 or 122 that measures the distance between first lens tube 10 and second lens tube 20, and angle detector may detect the angle of rotation of first rod 71 and second rod 72 using the length from the axis of rotation of first rod 71 and second rod 72 to first lens tube 10 or second lens tube 20 and the distance between first lens tube 10 and second lens tube 20 measured by measurement device 121 or 122.

With this configuration, when second rod 72 is rotated relative to first rod 71, it is possible to detect the angle of rotation with, for example, a sine function, using the distance between first lens tube 10 and second lens tube 20 measured using measurement device 121 or 122. With this configuration, the orientation of the images from the perspective of user 99 can be maintained by rotating the images displayed by first display panel 39L and second display panel 39R in accordance with the detected angle of rotation. Accordingly, HMD 100c can properly display images.

Moreover, for example, in the first process, first rotated image 102L may be generated by rotating first image 101L by an angle half the angle of rotation of first rod 71 and second rod 72 detected by the angle detector and in a direction opposite the direction of rotation of first rod 71, and in the second process second rotated image 102R may be generated by rotating second image 101R by an angle half the angle of rotation of first rod 71 and second rod 72 detected by the angle detector and in a direction opposite the direction of rotation of second rod 72.

With this configuration, first rotated image 102L rotated half the amount of rotation is generated via the first process, and second rotated image 102R rotated half the amount of the angle of rotation is generated via the second process. First rotated image 102L is rotated in one direction relative to the original image, and second rotated image 102R is rotated in the other direction relative to the original image. The orientation of the images from the viewpoint of user 99 can be maintained by displaying first rotated image 102L and second rotated image 102R generated in this manner on first display panel 39L and second display panel 39R, respectively. Accordingly, HMD 100c can properly display images.

Moreover, for example, first lens tube 10 may include first camera 123L that is provided on the bottom of first lens tube 10 and captures images in a direction parallel to the central axis of first lens tube 10 and opposite the direction toward the opening of first lens tube 10, second lens tube 20 may include second camera 123R that is provided on the bottom of second lens tube 20 and captures images in a direction parallel to the central axis of second lens tube 20 and opposite the direction toward the opening of second lens tube 20, and image outputter 38b may rotate the images captured by first camera 123L and second camera 123R in accordance with the angle of rotation of first rod 71 and second rod 72 detected by the angle detector.

With this configuration, when first lens tube 10 and second lens tube 20 of HMD 100c are provided with first camera 123L and second camera 123R, respectively, the orientations of images captured by first camera 123L and second camera 123R can be properly maintained regardless of the angle of rotation. Accordingly, HMD 100c properly displays images when images that are captured by first camera 123L and second camera 123R and properly maintained are displayed.

Moreover, for example, HMD 100 may include first camera 123L that captures images in a direction parallel to the central axis of first lens tube 10 and opposite the direction toward the opening of first lens tube 10, second camera 123R that captures images in a direction parallel to the central axis of second lens tube 20 and opposite the direction toward the opening of second lens tube 20, and a camera holding mechanism that holds first camera 123L and second camera so as to maintain a given distance between first camera 123L and second camera 123R.

With this configuration, the camera holding mechanism properly maintains the parallax between the images captured by first camera 123L and second camera 123R regardless of the angle of rotation. Accordingly, HMD 100c properly displays images when displaying three-dimensional images using images captured by first camera 123L and second camera 123R. HMD 100c can perform proper measurement when measuring the distance to an object using images captured by first camera 123L and second camera 123R.

Moreover, for example, image outputter 38b may adjust the position of the image to be displayed on second display panel 39R so as to be symmetrical about the height direction perpendicular to the arrangement direction of first lens tube 10 and second lens tube 20 and antisymmetrical about the arrangement direction relative to the center of second display panel 39R, in accordance with the position of the image to be displayed on first display panel 39L relative to the center of first display panel 39L.

With this configuration, it is possible to adjust the display positions of images based on the positions of both eyes of user 99. Accordingly, HMD 100c can properly display images.

Moreover, for example, image outputter 38b may perform distortion correction processing of correcting the lens distortion of first convex lens 40L according to the position of the image to be displayed on first display panel 39L relative to the center of first display panel 39L and correcting the lens distortion of second convex lens 40R according to the position of the image to be displayed on second display panel 39R relative to the center of second display panel 39R.

This configuration allows HMD 100c to properly display images regardless of lens distortion.

Moreover, for example, focal correction corresponding to the eyesight of user 99 may be performed by adjusting the distance between first convex lens 40L and first display panel 39L and adjusting the distance between second convex lens 40R and second display panel 39R, and image outputter 38b may perform zoom processing of changing the display size of the image to be displayed on first display panel 39L and the image to be displayed on second display panel 39R in accordance with the focal correction.

This configuration allows HMD 100c to properly display images regardless of changes in angle of view resulting from optical system adjustments.

Other Embodiments

Although embodiments have been described above, the present disclosure is not limited to the above embodiments.

Although the elements included in the HMD have been described in the above embodiments, the functions performed by the elements included in the HMD may be divided between various parts of the HMD in any manner.

Those skilled in the art will readily appreciate that various modifications may be made in these embodiments and that other embodiments may be obtained by arbitrarily combining the elements and functions of the embodiments without materially departing from the novel teachings and advantages of the present disclosure. Accordingly, all such modifications and other embodiments are included in the present disclosure.

INDUSTRIAL APPLICABILITY

The present disclosure is applicable as a wearable display device such as a head-mounted display.

The invention claimed is:
1. A display device, comprising:
a first lens tube including a closed bottom and a first display part on the closed bottom, the first display part being for displaying a first image;

a second lens tube including a closed bottom and a second display part on the closed bottom, the second display part being for displaying a second image;

an adjustment mechanism including a first rod that extends from the first lens tube and a second rod that extends from the second lens tube and is rotatably connected relative to the first rod; and an image angle maintainer that, in accordance with an angle of rotation of the first rod and the second rod of the adjustment mechanism, rotates the first display part relative to the first lens tube and rotates the second display part relative to the second lens tube to bring horizontal directions of the first display part and the second display part closer to an arrangement direction of the first lens tube and the second lens tube, wherein the image angle maintainer includes:

a stator provided on an axis of rotation of the first rod and the second rod that does not rotate with the first rod and the second rod;

a first rotor provided on the first display part that rotates with the first display part;

a first belt that rotates the first rotor according to an amount of rotation of the first rod relative to the stator;

a second rotor provided on the second display part that rotates with the second display part; and a second belt that rotates the second rotor according to an amount of rotation of the second rod relative to the stator.

2. A display device, comprising:

a first lens tube including a closed bottom and a first display part on the closed bottom, the first display part being for displaying a first image;

a second lens tube including a closed bottom and a second display part on the closed bottom, the second display part being for displaying a second image;

an adjustment mechanism including a first rod that extends from the first lens tube and a second rod that extends from the second lens tube and is rotatably connected relative to the first rod; and an image angle maintainer that, in accordance with an angle of rotation of the first rod and the second rod of the adjustment mechanism, rotates the first display part relative to the first lens tube and rotates the second display part relative to the second lens tube to bring horizontal directions of the first display part and the second display part closer to an arrangement direction of the first lens tube and the second lens tube, wherein the image angle maintainer includes:

a fixed gear provided on an axis of rotation of the first rod and the second rod that does not rotate with the first rod and the second rod;

a first rotary gear provided on the first display part that rotates with the first display part;

one or more first transfer gears that rotate the first rotary gear according to an amount of rotation of the first rod relative to the fixed gear;

a second rotary gear provided on the second display part that rotates with the second display part; and a second transfer gear that rotates the second rotary gear according to an amount of rotation of the second rod relative to the fixed gear.

\* \* \* \* \*